United States Patent
Zudaire Ubani et al.

(10) Patent No.: US 12,522,645 B2
(45) Date of Patent: Jan. 13, 2026

(54) BCMA-TARGETED CAR-T CELL THERAPY OF MULTIPLE MYELOMA

(71) Applicants: JANSSEN BIOTECH, INC., Horsham, PA (US); LEGEND BIOTECH USA INC., Somerset, NJ (US)

(72) Inventors: Enrique Zudaire Ubani, Ambler, PA (US); Xiaohu Fan, Edmonton (CA); Dong Geng, Somerset, NJ (US); Jordan Mark Schecter, Livingston, NJ (US)

(73) Assignees: JANSSEN BIOTECH, INC., Horsham, PA (US); LEGEND BIOTECH USA INC., Somerset, NJ (US)

( * ) Notice: Subject to any disclaimer, the term of this patent is extended or adjusted under 35 U.S.C. 154(b) by 0 days.

(21) Appl. No.: 17/088,845

(22) Filed: Nov. 4, 2020

(65) Prior Publication Data

US 2021/0128618 A1    May 6, 2021

Related U.S. Application Data

(60) Provisional application No. 62/943,627, filed on Dec. 4, 2019, provisional application No. 62/931,065, filed on Nov. 5, 2019.

(51) Int. Cl.

| | | |
|---|---|---|
| *A61K 35/17* | (2025.01) | |
| *A61K 38/17* | (2006.01) | |
| *A61K 40/11* | (2025.01) | |
| *A61K 40/31* | (2025.01) | |
| *A61K 40/42* | (2025.01) | |
| *A61P 35/00* | (2006.01) | |
| *C07K 14/705* | (2006.01) | |
| *C12N 5/0783* | (2010.01) | |

(52) U.S. Cl.
CPC ...... *C07K 14/70517* (2013.01); *A61K 38/177* (2013.01); *A61K 40/11* (2025.01); *A61K 40/31* (2025.01); *A61K 40/4215* (2025.01); *A61P 35/00* (2018.01); *C12N 5/0636* (2013.01); *A61K 2239/38* (2023.05); *A61K 2239/48* (2023.05)

(58) Field of Classification Search
CPC ....... A61K 35/17; A61K 38/177; A61P 35/00; C07K 14/70517
See application file for complete search history.

(56) References Cited

U.S. PATENT DOCUMENTS

| | | | |
|---|---|---|---|
| 10,934,363 | B2 | 3/2021 | Fan et al. |
| 11,186,647 | B2 | 11/2021 | Fan et al. |
| 11,535,677 | B2 | 12/2022 | Fan et al. |
| 12,351,638 | B2 | 7/2025 | Fan et al. |
| 2018/0230225 | A1 | 8/2018 | Fan et al. |
| 2021/0261675 | A1 | 8/2021 | Fan et al. |
| 2022/0265710 | A1 | 8/2022 | Schecter et al. |
| 2023/0039487 | A1 | 2/2023 | Ye et al. |
| 2023/0061503 | A1 | 3/2023 | Akram et al. |
| 2023/0270786 | A1 | 8/2023 | Fan et al. |
| 2023/0277589 | A1 | 9/2023 | Akram et al. |
| 2024/0000836 | A1 | 1/2024 | Schecter et al. |
| 2024/0156962 | A1 | 5/2024 | Pacaud et al. |
| 2024/0358754 | A1 | 10/2024 | Patel et al. |
| 2024/0409654 | A1 | 12/2024 | Fan et al. |
| 2025/0000977 | A1 | 1/2025 | Patel et al. |

FOREIGN PATENT DOCUMENTS

| | | | |
|---|---|---|---|
| CN | 105837693 | A | 8/2016 |
| CN | 107109368 | A | 8/2017 |
| CN | 109311999 | A | 2/2019 |
| CN | 109328230 | A | 2/2019 |
| JP | 2019527557 | A | 10/2019 |
| WO | WO 2016055551 | A1 | 4/2016 |
| WO | WO 2017025038 | A1 | 2/2017 |
| WO | WO 2017172981 | A2 | 10/2017 |
| WO | WO 2017181101 | A1 | 10/2017 |
| WO | 2018028647 | A1 | 2/2018 |
| WO | WO 2022116086 | A1 | 6/2022 |
| WO | WO 2022117068 | A1 | 6/2022 |
| WO | WO 2022238901 | A1 | 11/2022 |
| WO | WO 2023077343 | A1 | 5/2023 |
| WO | WO 2023081752 | A1 | 5/2023 |
| WO | WO 2023164695 | A2 | 8/2023 |

(Continued)

OTHER PUBLICATIONS

Xu et al. Exploratory trial of a biepitopic CAR T-targeting B cell maturation antigen in relapsed/refractory multiple myeloma. PNAS, May 7, 2019, 116( 19): 9543-9551. Supplemental Material Table S2 (Year: 2019).*

Turtle et al. CD19 CAR-T cells of defined CD4+:CD8+ composition in adult B cell ALL patients. J Clin Invest. 2016; 126(6): 2123-2138. doi:10.1172/JCI85309 (Year: 2016).*

The American Cancer Society medical and editorial content team. CAR T-Cell Therapies. (retrieved from https://www.cancer.org/treatment/treatments-and-side-effects/treatment-types/immunotherapy/car-t-cell1.html, retrieved on Sep. 1, 2022. Dated on Oct. 31, 2017 by Wayback Machine. (Year: 2017).*

Khattar et al. B-Cell Maturation Antigen Is Exclusively Expressed in a Wide Range of B-Cell and Plasma Cell Neoplasm and in a Potential Therapeutic Target for Bcma Directed Therapies. Blood (2017) 130 (Suppl_1) : 2755 (Year: 2017).*

(Continued)

*Primary Examiner* — James D Schultz
*Assistant Examiner* — Jianjian Zhu
(74) *Attorney, Agent, or Firm* — JONES DAY

(57) ABSTRACT

Provided herein is a method of treating a subject who has a cancer. At least one dose of chimeric antigen receptor (CAR)-T cells comprising a CAR comprising a polypeptide is administered to the subject. The peptide comprises an extracellular antigen binding domain with at least two BCMA-binding moieties, a transmembrane domain, and an intracellular signaling domain. The dose of CAR-T cells administered to the subject is from $4.0 \times 10^5$ to $1.0 \times 10^6$ of CAR-T cells per kilogram of the subject's mass. Alternatively, the dose comprises $1 \times 10^6$ to $1 \times 10^8$ of the CAR-T cells.

62 Claims, 56 Drawing Sheets

Specification includes a Sequence Listing.

(56) References Cited

FOREIGN PATENT DOCUMENTS

| WO | WO 2024097738 A1 | 5/2024 |
|---|---|---|
| WO | WO 2024220099 A1 | 10/2024 |
| WO | WO 2024220152 A1 | 10/2024 |
| WO | WO 2024220613 A1 | 10/2024 |

OTHER PUBLICATIONS

Turtle et al. CD19 CAR-T cells of defined CD4+:CD8+ composition in adult B cell ALL patients. J Clin Invest. 2016; 126(6): 2123-2138 and supplemental material. (Year: 2016).*

Cohen, A.D., et al., "B cell maturation antigen-specific CAR T cells are clinically active in multiple myeloma," The Journal of Clinical Investigation (2019) vol. 129, No. 6, pp. 2210-2221.

Cohen, A.D., et al., "CASRT-BCMA for Refractory MM (supplementary information)," The Journal of Clinical Investigation (2019) 32 pages total.

Communication (International Search Report) issued by the International Searching Authority in International Application No. PCT/US2020/058788, mailed Feb. 5, 2021, 7 pages total.

Communication (Written Opinion) issued by the International Searching Authority in International Application No. PCT/US2020/058788, mailed Feb. 5, 2021, 10 pages total.

Fan, X. et al., "Preclinical assessment of LCAR-B38M, a novel BCMA-targeting chimeric antigen receptor (CAR)-T cell therapy in relapsed/refractory multiple myeloma," Clinical Lymphoma and Leukemia (2019) 1 page total.

Fraietta, J.A. et al., "Determinants of Response and Resistance to CD19 Chimeric Antigen Receptor (CAR) T Cell Therapy of Chronic Lymphocytic Leukemia" National Medicine (2018) vol. 24, No. 5, pp. 567-571.

Green, D.J., et al., "Fully Human Berna Targeted Chimeric Antigen Receptor T Cells Administered in a Defined Composition Demonstrate Potency at Low Doses in Advanced Stage High Risk Multiple Myeloma," BLOOD (2018) vol. 132, No. Supplement 1, 7 pages total.

Kishton, R.J. et al., Metabolic Regulation of T Cell Longevity and Function in Tumor Immunotherapy: Cell Metab. (2017) vol. 26, No. 1, pp. 94-109.

Raje, N. et al., "Anti-BCMA CAR T-Cell Therapy bb2121 in Relapsed or Refractroy Multiple Myeloma" The New England Journal of Medicine (2019) vol. 380, No. 18, pp. 1726-1737.

Stock, S. et al., "Idelalisib for Optimized CD19-Specific Chimeric Antigen Receptor T Cells in Chronic Lymphocytic Leukemia Pateints" International Journal of Cancer (2019) vol. 145, pp. 1312-1324.

Xu, J. et al., "Exploratory trial of a biepitopic CAR T-targeting B cell maturation antigen in relapsed/refractory multiple myeloma," Proceedings of the National Academy of Sciences (2019) vol. 116, No. 19, pp. 9543-9551.

Zhao, W-H., et al., "A phase 1, open-label study of LCAR-B38M, a chimeric antigen receptor T cell therapy directed against B cell maturation antigen, in patients with relapsed or refractory multiple myeloma," Journal of Hematology & Oncology (2018) vol. 11, No. 141, pp. 1-8.

ClinicalTrial NCT03090659 (v1), "A Clinical Study of Legend Biotech BCMA-chimeric Antigen Receptor Technology in Treating Relapsed/Refractory (R/R) Multiple Myeloma Patients," first posted Mar. 27, 2017, last update posted Mar. 27, 2017 (10 pages).

ClinicalTrial NCT03090659 (v2), "A Clinical Study of Legend Biotech BCMA-chimeric Antigen Receptor Technology in Treating Relapsed/Refractory (R/R) Multiple Myeloma Patients," first posted Mar. 27, 2017, last update posted Jul. 7, 2017 (10 pages).

ClinicalTrial NCT03090659 (v3), "A Clinical Study of Legend Biotech BCMA-chimeric Antigen Receptor Technology in Treating Relapsed/Refractory (R/R) Multiple Myeloma Patients," first posted Mar. 27, 2017, last update posted Jan. 24, 2018 (10 pages).

ClinicalTrial NCT03090659 (v4), "A Clinical Study of Legend Biotech BCMA-chimeric Antigen Receptor Technology in Treating Relapsed/Refractory (R/R) Multiple Myeloma Patients," first posted Mar. 27, 2017, last update posted Aug. 14, 2019 (10 pages).

ClinicalTrial NCT03090659 (v5), "A Clinical Study of Legend Biotech BCMA-chimeric Antigen Receptor Technology in Treating Relapsed/Refractory (R/R) Multiple Myeloma Patients," first posted Mar. 27, 2017, last update posted Oct. 31, 2019 (10 pages).

ClinicalTrial NCT03090659 (v6), "A Clinical Study of Legend Biotech BCMA-chimeric Antigen Receptor Technology in Treating Relapsed/Refractory (R/R) Multiple Myeloma Patients," first posted Mar. 27, 2017, last update posted Jul. 8, 2020 (10 pages).

Clinical Protocol 68284528MMY2001, JNJ-68284528 Relapsed or Refractory Multiple Myeloma, approved Apr. 11, 2018, pp. 27-28.

Zhao et al., 2022, "Four-year follow-up of LCAR-B38M in relapsed or refractory multiple myeloma: a phase 1, single-arm, open-label, multicenter study in China (LEGEND-2)," J. Hematol. Oncol., 15(1):86 (12 pages).

Agha et al., 2021, "Efficacy and Safety of the BCMA Directed CAR T-Cell Therapy, Ciltacabtagene Autoleucel, in Patients with Progressive Multiple Myeloma After 1-3 Prior Lines of Therapy: Initial Results From Cartitude-2," European Hematology Association (EHA) 2021 Virtual (14 pages).

Agha et al., 2021, "CARTITUDE-2: Efficacy and Safety of Ciltacabtagene Autoleucel, a BCMA-Directed CAR T-Cell Therapy, in Patients With Progressive Multiple Myeloma After 1-3 Prior Lines of Therapy," presented at the Annual Meeting of the American Society of Clinical Oncology (ASCO), Jun. 4-8, 2021, Virtual (6 pages).

Agha et al., 2021, "Efficacy and Safety of Ciltacabtagene Autoleucel (Cilta-Cel), a BCMA-Directed CAR-T Cell Therapy, in Patients With Progressive Multiple Myeloma (MM) After 1-3 Prior Lines of Therapy: CARTITUDE-2 Phase 2 Study," presented at Brazilian Congress of Hematology, Hemotherapy and Cell Therapy (HEMO), Oct. 27-30, 2021, Virtual (1 page).

Agha et al., 2022, "CARTITUDE-5: A Randomized, Phase 3 Study of Bortezomib, Lenalidomide and Dexamethasone (VRd) Followed by Ciltacabtagene Autoleucel Versus VRd Followed by Lenalidomide and Dexamethasone (Rd) Maintenance in Patients with Newly Diagnosed Multiple Myeloma (NDMM) Not Intended for Transplant," presented at the 2022 Tandem Meetings Transplantation & Cellular Therapy Meetings of ASTCT and CIBMTR, Apr. 23-26, 2022, Salt Lake City, UT (1 page).

Agha et al., 2022, "CARTITUDE 2, Cohort B: Updated Clinical Data and Biological Correlative Analyses of Ciltacabtagene Autoleucel, a BCMA-Directed CAR T-Cell Therapy, in Patients With Multiple Myeloma and Early Relapse After Initial Therapy, " presented at the European Hematology Association (EHA) 2022 Hybrid Congress, Jun. 9-12, 2022, Vienna, Austria (12 pages).

Agha et al., 2022, "Ciltacabtagene Autoleucel (Cilta-cel) in Patients With Multiple Myeloma and Early Relapse After Initial Therapy: Biological Correlative Analyses and Updated Clinical Results From CARTITUDE-2 Cohort B," presented at the International Myeloma Society (IMS) Annual Meeting, Aug. 25-27, 2022, Los Angeles, CA (13 pages).

Agha et al., 2022, "Phase 2 CARTITUDE-2 Study (Cohort B): Updated Clinical Data and Biological Correlative Analyses of CiltacabtageneAutoleucel (Cilta-Cel), a BCMA-Directed CAR-T Cell Therapy, in Patients With Multiple Myeloma (MM) and Early Relapse After Initial Therapy," presented at the Society of Hematologic Oncology (SOHO) Annual Meeting, Sep. 28-Oct. 1, 2022, Houston, TX (8 pages).

Arnulf et al., 2022, "Updated Clinical Data and Biological Correlative Analyses of Ciltacabtagene Autoleucel (Cilta-cel) in Lenalidomide-refractory Multiple Myeloma After 1-3 Prior Lines of Therapy: CARTITUDE-2 Cohort A," the French Society of Hematology (SFH), previously presented at the 2022 European Hematology Association (EHA) Hybrid Congress, Jun. 9-12, 2022, Wien, Austria (13 pages).

Berdeja et al., 2020, "Update of CARTITUDE-1: A Phase 1b/2 Study Of JNJ-68284528, A B-cell Maturation Antigen-Directed Chimeric Antigen Receptor T Cell Therapy, in Relapsed/Refractory Multiple Myeloma," Brazilian Congress of Hematology, Hemotherapy and Cell Therapy (HEMO), Nov. 3-8, 2020 (1 page).

(56) References Cited

OTHER PUBLICATIONS

Berdeja et al., 2020, "Update of CARTITUDE-1: A Phase 1b/2 Study of JNJ-4528, a B-Cell Maturation Antigen (BCMA)-Directed CAR-T Cell Therapy, in Relapsed/Refractory Multiple Myeloma," presented at American Society of Clinical Oncology (ASCO) Annual Meeting, May 29-31, 2020, Virtual (12 pages).

Bittrich et al., 2022, "Patients With Relapsed/Refractory Multiple Myeloma Receiving Real-life Current Standard of Care: A Subgroup Analysis of the LocoMMotion Study," presented at Deutsche Gesellschaft für Hämatologie und Medizinische Onkologie (DGHO), Oct. 7-10, 2022, Vienna, Austria (1 page).

Boccadoro et al., 2022, "DVRd Followed by Ciltacabtagene Autoleucel Versus DVRd Followed by ASCT in Patients With Newly Diagnosed Multiple Myeloma Who are Transplant Eligible: A Randomized Phase 3 Study (EMagine/CARTITUDE-6)," presented at the 64th American Society of Hematology (ASH) Annual Meeting & Exposition, Dec. 10-13, 2022, New Orleans, LA (1 page).

Broijl et al., 2023, "EMagine/CARTITUDE-6: A Randomized Phase 3 Study of DVRd Followed by Ciltacabtagene Autoleucel Versus DVRd Followed by ASCT in Transplant-Eligible Patients With Newly Diagnosed Multiple Myeloma," presented at the 4th European Myeloma Network (EMN) Annual Meeting, Apr. 20-22, 2023, Amsterdam, Netherlands (1 page).

Cohen et al., 2020, "Patient Expectations and Perceptions of Treatment in CARTITUDE 1: Phase 1b/2 Study of Ciltacabtagene Autoleucel in Relapsed/Refractory Multiple Myeloma," presented at the 62nd American Society of Hematology (ASH) Annual Meeting & Exposition, Dec. 5-8, 2020, Virtual (11 pages).

Cohen et al., 2021, "Patient Expectations and Perceptions of Treatment in CARTITUDE-1: Phase 1b/2 Study of Ciltacabtagene Autoleucel in Relapsed/Refractory Multiple Myeloma," presented at the 3rd European CAR T-Cell Meeting Virtual, Feb. 4-6, 2021 (1 page).

Cohen et al., 2021, "Patient Expectations and Perceptions of Treatment in CARTITUDE-1: Phase 1b/2 Study of CiltacabtageneAutoleucelin Relapsed/Refractory Multiple Myeloma," presented at the Transplantation & Cellular Therapy (TCT) Meetings Digital Experience, Feb. 8-11, 2021 (2 pages).

Cohen et al., 2021, "Patient Expectations and Perceptions of Treatment in CARTITUDE-1: Phase 1b/2 Study of Ciltacabtagene Autoleucelin Relapsed/Refractory Multiple Myeloma," presented at the 47th Annual Meeting of the EBMT, Mar. 14-17, 2021 (1 page).

Cohen et al., 2021, "Patient Expectations and Perceptions of Treatment in the Phase 1b/2 CARTITUDE- 1 Study of Ciltacabtagene Autoleucel in Relapsed/Refractory Multiple Myeloma," presented at European School of Haematology (ESH) 3rd How to Diagnose and Treat Multiple Myeloma, Apr. 15-18, 2021 (1 page).

Cohen et al., 2021, "Patient Expectations and Perceptions of Treatment in CARTITUDE-1: Phase 1b/2 Study of Ciltacabtagene Autoleucel (Cilta-Cel) BCMA-Directed CAR-T Cell Therapy, in Relapsed/Refractory Multiple Myeloma (RRMM)," presented at The 7th World Congress on Controversies in Multiple Myeloma (COMy), May 7-9, 2021, Virtual (1 page).

Cohen et al., 2021, "Efficacy and Safety of Ciltacabtagene Autoleucel, a BCMA-Directed CAR-T Cell Therapy, in Patients With Progressive Multiple Myeloma After 1-3 Prior Lines of Therapy: Initial Results From CARTITUDE-2," presented at 18th International Myeloma Workshop (IMW), Sep. 8-11, 2021, Vienna, Austria (13 pages).

Cohen et al., 2021, "Efficacy and Safety of Ciltacabtagene Autoleucel, a B-cell Maturation Antigen- Directed Chimeric Antigen Receptor T-cell Therapy, in Lenalidomide-Refractory Patients With Progressive Multiple Myeloma After 1-3 Prior Lines of Therapy: Updated Results From CARTITUDE-2," presented at the 63rd American Society of Hematology (ASH) Annual Meeting & Exposition, Dec. 11-14, 2021, Atlanta, GA (6 page).

Cohen et al., 2022, "Ciltacabtagene Autoleucel, a B-Cell Maturation Antigen-Directed Chimeric Antigen Receptor T-Cell Therapy in Lenalidomide Refractory Patients With Progressive Multiple Myeloma After 1-3 Prior Lines of Therapy: Updated Results From CARTITUDE-2 Cohort A," presented at the 62nd British Society for Haematology (BSH) Annual Meeting, Apr. 3-5, 2022, Manchester, United Kingdom (9 pages).

Cohen et al., 2022, "Safety and Efficacy of Ciltacabtagene Autoleucel (Cilta Cel), a Chimeric Antigen Receptor T Cell (CAR-T) Therapy Directed Against B-Cell Maturation Antigen (BCMA) in Patients with Multiple Myeloma (MM) and Early Relapse after Initial Therapy: Results from CARTITUDE 2," presented at the 2022 Tandem Meetings Transplantation & Cellular Therapy Meetings of ASTCT and CIBMTR, Apr. 23-26, 2022, Salt Lake City, UT (11 pages).

Cohen et al., 2022,"Cilta-cel, a BCMA Directed CAR-T, in MM Patients After 1-3 Prior Lines of Therapy (CARTITUDE-2)," presented at the 44th Annual Meeting of the Japanese Society for Transplantation and Cellular Therapy, May 12-14, 2022, Yokohama, Japan (10 pages).

Cohen et al., 2022, "Cilta-cel, a BCMA-Directed CAR-T, in MM Patients With Early Relapse After Initial Therapy (CARTITUDE-2 Cohort B) (Encore)," presented at the 47th Annual Meeting of the Japanese Society of Melanoma (JSM), May 20-22, 2022, Fukushima City, Fukushima Prefecture, Japan (1 page).

Cohen et al., 2022, "Efficacy and Safety of Cilta-cel in Patients With Progressive Multiple Myeloma After Exposure to Other BCMA Targeting Agents," presented at the 19th International Myeloma Society (IMS) Annual Meeting, Aug. 25-27, 2022, Los Angeles, CA (20 pages).

Cohen et al., 2022, "Updated Clinical Data and Biological Correlative Analyses of Ciltacabtagene Autoleucel (Cilta-cel) in Lenalidomide refractory Multiple Myeloma After 1-3 Prior Lines of Therapy: CARTITUDE-2 Cohort A," presented at the International Myeloma Society (IMS) Annual Meeting, Aug. 25-27, 2022, Los Angeles, CA (13 pages).

Cohen et al., 2022, "Efficacy and Safety of Cilta-Cel in Patients With Progressive Multiple Myeloma after Exposure to Non-cellular Anti-BCMA Immunotherapy," presented at the 64th American Society of Hematology (ASH) Annual Meeting & Exposition, Dec. 10-13, 2022, New Orleans, LA (7 pages).

Cohen et al., 2023, "Efficacy and Safety of Cilta-Cel and T-Cell Phenotype Analyses in Patients With Relapsed/Refractory Multiple Myeloma and Prior Non-Cellular Anti-BCMA Therapy: Phase 2 CARTITUDE-2 Cohort C," presented at the 20th International Myeloma Society (IMS) Annual Meeting and Exposition, Sep. 27-30, 2023, Athens, Greece (1 page).

Cook et al., 2023, "EMagine/CARTITUDE-6: DVRd Followed by Ciltacabtagene Autoleucel Versus DVRd Followed by ASCT in Newly Diagnosed Multiple Myeloma," presented at the 2023 British Society for Haematology Annual Meeting, Apr. 23-25, 2023, Birmingham, United Kingdom (1 page).

Costa et al., 2021, "Ciltacabtagene Autoleucel Versus Conventional Treatment in Patients With Relapsed/Refractory Multiple Myeloma," presented at the Annual Meeting of the American Society of Clinical Oncology (ASCO), Jun. 4-8, 2021, Virtual (3 pages).

Costa et al., 2021, "Comparison of Ciltacabtagene Autoleucel Versus Conventional Treatment in Patients With Relapsed/Refractory Multiple Myeloma," presented at the Annual Meeting of the European Hematology Association (EHA), Jun. 9-17, 2021 (3 pages).

De Larrea et al., 2023, "Pharmacokinetic and Correlative Analysis of Ciltacabtagene Autoleucel in Patients With Lenalidomide-Refractory Multiple Myeloma in the CARTITUDE-4 Trial," presented at the 20th International Myeloma Society (IMS) Annual Meeting and Exposition, Sep. 27-30, 2023, Athens, Greece (19 pages).

Decaux et al., 2022, "Ciltacabtagene autoleucel versus treatments from real-world clinical practice for triple class exposed patients with multiple myeloma: adjusted comparisons based on CARTITUDE-1 and the EMMY French cohort," presented at European Hematology Association Congress, Jun. 9 to 17, 2022, Vienna, Austria (1 page).

Delforge, et al., 2021, "CARTITUDE-2: Efficacy and Safety of Ciltacabtagene Autoleucel (Cilta-Cel), a B-Cell Maturation Antigen (BCMA)-Directed Chimeric Antigen Receptor T (Car-T) Cell Therapy,

(56) References Cited

OTHER PUBLICATIONS in Patients With Progressive Multiple Myeloma After 1-3 Prior Lines of Therapy," presented at European School of Haematology (ESH) (5 pages).

Delforge et al., 2021, "Real-World Outcomes for Standard-Of-Care Treatments in Patients with Relapsed/Refractory Multiple Myeloma," presented at the 63rd American Society of Hematology (ASH) Annual Meeting & Exposition, Dec. 11-14, 2021, Atlanta, GA (1 page).

Delforge et al., 2022, "Treatment Landscape in Relapsed/Refractory Multiple Myeloma (RRMM): Real World Outcomes for Standard-of-Care," presented at the 48th Annual Meeting of the European Society for Blood and Marrow Transplantation (EBMT), Mar. 19-23, 2022 Czech Republic (1 page).

Delforge et al., 2022, "Treatments in Patients with Relapsed/Refractory Multiple Myeloma (RRMM): Real-World Outcomes for Standard of Care (SOC)," presented at the 2022 Tandem Meetings Transplantation & Cellular Therapy Meetings of ASTCT and CIBMTR, Apr. 23-26, 2022, Salt Lake City, UT (9 pages).

Delforge et al., 2022, "Health-Related Quality of Life in Patients With Relapsed/Refractory Multiple Myeloma Receiving Real-Life Current Standard of Care in the LocoMMotion Study," presented at the 2022 American Society of Clinical Oncology (ASCO) Annual Meeting, Jun. 3-7, 2022, Chicago, IL (1 page).

Delforge et al., 2022, "Health-Related Quality of Life in the LocoMMotion Study of Real-Life Current Standard of Care in Patients With Relapsed/Refractory Multiple Myeloma," presented at the European Hematology Association (EHA) 2022 Hybrid Congress, Jun. 9-12, 2022, Vienna, Austria (1 page).

Delforge et al., 2022, "Health-related quality of life (HRQOL) in patients with relapsed/refractory multiple myeloma (RRMM) receiving real-life standard of care (SOC) treatments: Results from the LocoMMotion study," presented at the International Myeloma Society (IMS) Annual Meeting, Aug. 25- 27, 2022, Los Angeles, CA (1 page).

Dhakal et al., 2022, "Real-world Assessment of Treatment Patterns and Outcomes in Patients With Lenalidomide-Refractory Relapsed/Refractory Multiple Myeloma From the Optum Database, " presented at the European Hematology Association (EHA) 2022 Hybrid Congress, Jun. 9-12, 2022, Vienna, Austria (1 page).

Dhakal et al., 2022, "Real-world Assessment of Treatment Patterns and Outcomes in Patients With Lenalidomide-Refractory RelapsedMultiple Myeloma From the Flatiron Database," presented at the 19th International Myeloma Society (IMS) Annual Meeting, Aug. 25-27, 2022, Los Angeles, CA (1 page).

Dhakal et al., 2022, "Real-world Treatments and Outcomes in Patients With Lenalidomide-Refractory Relapsed Multiple Myeloma Treated With 1-3 Prior Lines of Therapy, Including a PI and IMiD, From the SEER-Medicare Database," presented at the 19th International Myeloma Society (IMS) Annual Meeting, Aug. 25-27, 2022, Los Angeles, CA (1 page).

Dhakal et al., 2022, "Characteristics and Outcomes in Patients with Lenalidomide-Refractory Relapsed/Refractory Multiple Myeloma Treated with 1-3 Prior Lines of Therapy: Analysis of the Individual Patient-level Data from Daratumumab Clinical Trials," presented at the 64th American Society of Hematology (ASH) Annual Meeting & Exposition, Dec. 10-13, 2022, New Orleans, LA (1 page).

Dhakal et al., 2023, "Phase 3 Results From CARTITUDE-4: Cilta-Cel Versus Standard of Care (PVd or DPd) in Lenalidomide-Refractory Multiple Myeloma," presented at the Annual Meeting of the American Society of Clinical Oncology (ASCO), Jun. 2-6, 2023, Chicago, IL (17 pages).

Dhakal et al., 2023, "Real-World Attrition Rates After Second-Line Therapy or Later in Patients From the Flatiron Database With Relapsed/Refractory Multiple Myeloma Refractory to Lenalidomide," presented at the 20th International Myeloma Society (IMS) Annual Meeting and Exposition, Sep. 27-30, 2023, Athens, Greece (1 page).,.

Dhakal et al., 2023, "First Phase 3 Results From CARTITUDE-4: Cilta-cel Versus Standard of Care (PVd or DPd) in Lenalidomide Refractory Multiple Myeloma," presented at the 2023 German Society for Hematology and Medical Oncology (DGHO) Annual Meeting, Oct. 13-16, 2023, Hamburg, Germany (18 pages).

Dytfeld et al., 2021, "Bortezomib, Lenalidomide, and Dexamethasone (VRd) Followed by Ciltacabtagene Autoleucel Versus VRd Followed by Lenalidomide and Dexamethasone (Rd) Maintenance in Patients with Newly Diagnosed Multiple Myeloma Not Intended for Transplant: A Randomized, Phase 3 Study (CARTITUDE-5)," presented at the 63rd American Society of Hematology (ASH) Annual Meeting & Exposition, Dec. 11-14, 2021, Atlanta, GA (1 page).

Dytfeld et al., 2022, "Randomized, Phase 3 Study of Bortezomib, Lenalidomide and Dexamethasone Followed by Ciltacabtagene Autoleucel Versus Bortezomib, Lenalidomide and Dexamethasone Followed by Lenalidomide and Dexamethasone Maintenance in Patients With Newly Diagnosed Multiple Myeloma Not Intended for Transplant: CARTITUDE-5," presented at the 62nd British Society for Haematology (BSH) Annual Meeting, Apr. 3-5, 2022, Manchester (1 page).

Einsele et al., 2021, "CARTITUDE-2: Phase 2 Multicohort Study of Ciltacabtagene Autoleucel, a B- Cell Maturation Antigen-Directed Chimeric Antigen Receptor T-Cell Therapy, in Patients With Multiple Myeloma," presented at the Transplantation & Cellular Therapy (TCT) Meetings Digital Experience, Feb. 8-11, 2021 (1 page).

Einsele et al., 2021, "CARTITUDE-2: Phase 2 Multicohort Study of Ciltacabtagene Autoleucel (Cilta- Cel), a B-Cell Maturation Antigen (BCMA)-Directed Chimeric Antigen Receptor T (Car-T) Cell Therapy, in Patients With Multiple Myeloma (MM)," presented at The 7th World Congress on Controversies in Multiple Myeloma (COMy), May 7-9, 2021, Virtual (1 page).

Einsele et al., 2021, "Incidence, Mitigation, and Management of Neurologic Adverse Events in Patients With Multiple Myeloma Treated With Ciltacabtagene Autoleucel in CARTITUDE-2," presented at the Annual Meeting of the American Society of Clinical Oncology (ASCO), Jun. 4-8, 2021, Virtual (7 pages).

Einsele et al., 2021, "Incidence, Mitigation, and Management of Neurologic Adverse Events in the Phase 2 CARTITUDE-2 Study of Ciltacabtagene Autoleucelin Patients With Multiple Myeloma," presented at the Annual Meeting of the European Hematology Association (EHA), Jun. 9-17, 2021 (7 pages).

Einsele et al., 2021, "Incidence, Mitigation, and Management of Neurologic Adverse Events in CARTITUDE-2, a Phase 2 Study of Ciltacabtagene Autoleucel (Cilta-Cel) in Patients with Multiple Myeloma," presented at 18th International Myeloma Workshop (IMW), Sep. 8-11, 2021, Vienna, Austria (1 page).

Einsele et al., 2021, "Incidence, Mitigation, And Management Of Neurologic Adverse Events In Patients With Multiple Myeloma Treated With Ciltacabtagene Autoleucel (Cilta-Cel) In CARTITUDE-2," presented at Brazilian Congress of Hematology, Hemotherapy and Cell Therapy (HEMO), Oct. 27-30, 2021, Virtual (1 page).

Einsele et al., 2022, "Cartitude-2 Update: Ciltacabtagene Autoleucel, a B-Cell Maturation Antigen- Directed Chimeric Antigen Receptor T-Cell Therapy, in Lenalidomide Refractory Patients with Progressive Multiple Myeloma After 1-3 Prior Lines of Therapy," presented at the 3rd European Myeloma Network Meeting, Apr. 6-9, 2022 (5 pages).

Einsele et al., 2022, "Efficacy and Safety of Ciltacabtagene Autoleucel (Cilta-Cel) in Lenalidomide- Refractory Patients (PTS) with Progressive Multiple Myeloma (MM) After 1-3 Prior Lines of Therapy (LOT):Cartitude-2 Updated Results," the 8th World Congress on Controversies in Multiple Myeloma (COMy), May 12, 2022 (3 pages).

Einsele et al., 2022, "Mitigation and Management of Neurologic AEs in Multiple Myeloma Patients Treated with Cilta-cel in CARTITUDE-2," presented at the 44th Annual Meeting of the Japanese Society for Transplantation and Cellular Therapy, May 12-14, 2022, Yokohama (9 pages).

Einsele et al., 2022, "Efficacy and Safety of Cilta-cel, a BCMA-Directed CAR-T cell Therapy, in Patients With Multiple Myeloma After 1-3 Prior Lines of Therapy (Encore)," presented at the 47th Annual Meeting of the Japanese Society of Melanoma (JSM), May 20-22, 2022, Fukushima City, Fukushima Prefecture, Japan (1 page).

(56) References Cited

OTHER PUBLICATIONS

Einsele et al., 2022, "Biological Correlative Analyses and Updated Clinical Data of Ciltacabtagene Autoleucel, a BCMA-Directed CAR-T Cell Therapy, in Lenalidomide-Refractory Patients With Progressive Multiple Myeloma After 1-3 Prior Lines of Therapy: CARTITUDE-2, Cohort A," presented at the 2022 American Society of Clinical Oncology (ASCO) Annual Meeting, Jun. 3-7, 2022, Chicago, IL (8 pages).

Einsele et al., 2022, "Subgroup Analyses in Patients With Relapsed/RefractoryMultiple Myeloma Receiving Real-Life Current Standard of Carein the LocoMMotion Study," presented at the 2022 American Society of Clinical Oncology (ASCO) Annual Meeting, Jun. 3-7, 2022, Chicago, IL (1 page).

Einsele et al., 2022, "Real-Life Current Standard of Care in Patients With Relapsed/Refractory Multiple Myeloma: Subgroup Analyses From the LocoMMotion Study," presented at the European Hematology Association (EHA) 2022 Hybrid Congress, Jun. 9-12, 2022, Vienna, Austria (1 page).

Einsele et al., 2022, "Subgroup analyses from the LocoMMotion study of real-life current standard of care (SOC) in patients with relapsed/refractory multiple myeloma (RRMM)," presented at the International Myeloma Society (IMS) Annual Meeting, Aug. 25-27, 2022, Los Angeles, CA (1 page).

Einsele et al., 2022, "Phase 2 CARTITUDE-2 Study (Cohort A): Biological Correlative Analyses and Updated Clinical Data of Cilta-cel, a BCMA directed CAR-T Cell Therapy, in Lenalidomide refractory Patients With Progressive Multiple Myeloma After 1-3 Prior Lines of Therapy," presented at the DGHO Annual Meeting, Oct. 7-10, 2022, Vienna, Austria (13 pages).

Einsele et al., 2023, "Analysis of Daratumumab Clinical Trials: Characteristics and Outcomes in Patients With Lenalidomide-Refractory Relapsed/Refractory Multiple Myeloma Treated With 1-3 Prior Lines of Therapy," presented at the 4th European Myeloma Network (EMN) Annual Meeting, Apr. 20-22, 2023, Amsterdam, Netherlands (1 page).

Einsele et al., 2023, "SEER-Medicare Database: Real-world Treatments and Outcomes in Patients With Lenalidomide-Refractory Relapsed Multiple Myeloma Treated With 1-3 Prior Lines of Therapy, Including a PI and IMiD," presented at the 4th European Myeloma Network (EMN) Annual Meeting, Apr. 20-22, 2023, Amsterdam, Netherlands (1 page).

Einsele et al., 2023, "Characteristics and Outcomes in Patients With Lenalidomide-Refractory Relapsed/Refractory Multiple Myeloma Treated With 1-3 Prior Lot: Analysis of the Individual Patient-Level Data From Daratumumab Clinical Trials," presented at The 9th World Congress on Controversies in Multiple Myeloma (COMy), May 11-14, 2023, Paris, France (1 page).

Einsele et al., 2023, "Real-World Treatments and Outcomes in Patients With Lenalidomide-Refractory Relapsed Multiple Myeloma Treated With 1-3 Prior Lines of Therapy, Including a PI and IMID, From the Seer-Medicare Database," presented at The 9th World Congress on Controversies in Multiple Myeloma (COMy), May 11-14, 2023, Paris, France (1 page).

Florendo et al., 2021, "Safety and Management of Adverse Events With Ciltacabtagene Autoleucel, a Chimeric Antigen Receptor T-Cell Therapy, in Patients With Relapsed/Refractory Multiple Myeloma: Initial Results From CARTITUDE-1," presented at 46th Annual ONS Congress, Apr. 20-29, 2021 (1 page).

Goldschmidt et al., 2021, "Adjusted Comparison of Outcomes Between Patients From CARTITUDE- 1 Versus Multiple Myeloma Patients With Prior Exposure to PI, IMiD and Anti-CD-38 From a German Registry," presented at the EHA 2021, Jun. 9-17, 2021, Virtual (1 page).

Hajek et al., 2022, "Patient Characteristics and Survival Outcomes of Lenalidomide Exposed Non- Refractory vs Lenalidomide Refractory Multiple Myeloma Patients in the HONEUR Federated Data Network," presented at the 64th American Society of Hematology (ASH) Annual Meeting & Exposition, Dec. 10-13, 2022, New Orleans, LA (1 page).

Hari et al., 2021, "Meta-analysis of Ciltacabtagene Autoleucel versus Physician's Choice in the Treatment of Patients with Relapsed or Refractory Multiple Myeloma," presented at the 63rd American Society of Hematology (ASH) Annual Meeting & Exposition, Dec. 11-14, 2021, Atlanta, GA (1 page).

Hari et al., 2022, "Results from a Meta Analysis of Ciltacabtagene Autoleucel Compared to Physician's Choice in Patients with Relapsed or Refractory Multiple Myeloma," presented at the 2022 Tandem Meetings - Transplantation & Cellular Therapy Meetings of ASTCT and CIBMTR (Virtual), Apr. 23- 26, 2022, Salt Lake City, UT (1 page).

Hillengass et al., 2022, "Updated Results of CARTITUDE-2: Ciltacabtagene Autoleucel cilta-cel), a B-Cell Maturation Antigen (Directed Chimeric Antigen Receptor T Cell (CAR-T) Therapy, in Lenalidomide Refractory Patients with Progressive Multiple Myeloma (MM) After 1-3 Prior Lines of Therapy," presented at the 2022 Tandem Meetings - Transplantation & Cellular Therapy Meetings of ASTCT and CIBMTR, Apr. 23-26, 2022, Salt Lake City, UT (10 pages).

Hillengass et al., 2022, "Ciltacabtagene Autoleucelin Lenalidomide-Refractory Patients With Progressive Multiple Myeloma After 1-3 Prior Lines of Therapy: CARTITUDE-2 Biological Correlative Analyses and Updated Clinical Data," presented at the European Hematology Association (EHA) 2022 Hybrid Congress, Jun. 9-12, 2022, Vienna, Austria (8 pages).

Hillengass et al., 2022, "CARTITUDE-2 Cohort A: Updated Clinical Data and Biological Correlative Analyses of Ciltacabtagene Autoleucel (cilta-cel) in Lenalidomide-Refractory Patients with Progressive Multiple Myeloma (MM) After 1-3 Prior Lines of Therapy (LOT)," presented at the Society of Hematologic Oncology (SOHO) Annual Meeting Virtual, Sep. 28-Oct. 1, 2022, Houston, TX (8 pages).

Hillengass et al., 2023, "The Phase 2 CARTITUDE-2 Trial: Updated Efficacy and Safety of Ciltacabtagene Autoleucel in Patients With Multiple Myeloma and 1-3 Prior Lines of Therapy (Cohort A) and With Early Relapse After First Line Treatment (Cohort B)," presented at the 65th American Society of Hematology (ASH) Annual Meeting & Exposition, Dec. 9-12, 2023, San Diego, CA (13 pages).

Hillengass et al., 2024, "The Phase 2 CARTITUDE-2 Update: Ciltacabtagene Autoleucel in Multiple Myeloma and 1-3 Prior Lines (Cohort A) and With Early Relapse After First Line Treatment (Cohort B)," presented at the 50th Annual Meeting of the European Society for Bone and Marrow Transplantation (EBMT), Apr. 14-17, 2024, Glasgow, Scotland (13 pages).

Hillengass et al., 2024, "Phase 2 CARTITUDE-2 Update: Ciltacabtagene Autoleucel in Multiple Myeloma and 1-3 Prior Lines (Cohort A) and With Early Relapse After First Line Treatment (Cohort B)," presented by NWCJ van de Donk at the 5th European Myeloma Network (EMN) Meeting, Apr. 18-20, 2024, Torino, Italy (1 page).

Hoda et al., 2021, "Considerations for Optimal Administration of Chimeric Antigen Receptor T-Cell Therapy Programs: A Multi-Stakeholder Qualitative Analysis," presented at the 63rd American Society of Hematology (ASH) Annual Meeting & Exposition, Dec. 11-14, 2021, Atlanta, GA (1 page).

Hoda et al., 2022, "Considerations for Optimal Administration of Chimeric Antigen Receptor T-Cell Therapy Programs: A Multi-Stakeholder Qualitative Analysis," presented at the 2022 Tandem Meetings - Transplantation & Cellular Therapy Meetings of ASTCT and CIBMTR Virtual, Apr. 23-26, 2022, Salt Lake City, UT (1 page).

Iida et al., 2021, "The Result of CARTITUDE-1 Phase II Part of Cilta-cel in Relapsed/Refractory Multiple Myeloma Japanese Patients," presented at the 83rd Annual Meeting of the Japanese Society of Hematology (JSH) Sendai International Center, Sendai, Miyagi, Japan, Sep. 23-25, 2021 (13 pages).

Iida et al., 2022, "Efficacy and Safety of Cilta-cel in Relapsed/Refractory Multiple Myeloma Japanese Patients (CARTITUDE-1 Phase 2)," presented at the 84th Annual Meeting of the Japanese Society of Hematology, Oct. 14-16, 2022, Fukuoka, Japan (13 pages).

Jagannath et al., 2021, "Total Car-T Cost of Care Beyond the Price of Car-T Cell Therapy in Patients with Multiple Myeloma," Blood, 138(Supplement 1):4964, Nov. 5, 2021, [retrieved on Jan. 12, 2022].

(56) References Cited

OTHER PUBLICATIONS

Retrieved from the Internet <URL: https://ashpublications.org/blood/article/138/Supplement%201/4964/482027/Total-Car-T-Cost-of-Care-Beyond-the-Price-of-Car-T> (7 pages).

Jagannath et al., 2021, "Updated Results From Certitude-1: Ciltacabtageneautoleucel, a B-Cell Maturation Antigen-Directed Chimeric Antigenreceptor T (Car-T) Cell Therapy, in Relapsed/Refractory Multiple Myeloma (RRMM)," presented at 18th International Myeloma Workshop (IMW), Sep. 8- 11, 2021, Vienna, Austria (13 pages).

Jagannath et al., 2022, "CAR-T Treatment Costs Beyond Therapy Acquisition Costs in Multiple Myeloma Patients," poster EE70, May 2022 (1 page).

Jagannath et al., 2022, "Healthcare Resource Utilization and Costs in Patients with Multiple Myeloma who Received 1 to 3 Prior Lines of Therapy, Including a Proteasome Inhibitor, an Immunomodulatory Drug, and Exposed to (and Discontinued) Lenalidomide in the United States," presented at the ISPOR 2022, May 15-18, 2022, Washington, DC (1 page).

Jagannath et al., 2023, "CARTITUDE-1 Final Results: Phase 1b/2 Study of Ciltacabtagene Autoleucel in Heavily Pretreated Patients With Relapsed/Refractory Multiple Myeloma," presented at the 20th International Myeloma Society (IMS) Annual Meeting and Exposition, Sep. 27-30, 2023, Athens, Greece (1 page).

Jakubowiak et al., 2021, "Cytokine Release Syndrome in Patients With Relapsed/Refractory Multiple Myeloma Treated With Ciltacabtagene Autoleucel in the Phase 1b/2 CARTITUDE-1 Study," presented at the 47th Annual Meeting of the European Society of Blood and Marrow Transplantation (EBMT), Mar. 14-17, 2021 (10 pages).

Jakubowiak et al., 2021, "CARTITUDE-1: Phase 1b/2 Study Of Ciltacabtagene Autoleucel (Cilta- Cel) In Relapsed/Refractory Multiple Myeloma (RRMM)," presented at The 7th World Congress on Controversies in Multiple Myeloma (COMy), May 7-9, 2021, Virtual (1 page).

Jakubowiak et al., 2021, "Incidence, Mitigation, and Management of Neurologic Adverse Events in the CARTITUDE-2 Study of Patients with Multiple Myeloma Treated with Ciltacabtagene Autoleuce (Cilta-Cel)," presented at Society of Hematologic Oncology (SOHO) 2021 Annual Meeting, Sep. 8- 11, 2021, Houston, TX (1 page).

Jakubowiak et al., 2021, "Efficacy and Safety of Ciltacabtagene Autoleucel (Cilta-Cel) in Patients With Relapsed/Refractory Multiple Myeloma: CARTITUDE-1 Subgroup Analysis," presented at the 63rd American Society of Hematology (ASH) Annual Meeting & Exposition, Dec. 11-14, 2021, Atlanta, GA (1 page).

Kerre et al., 2022, "Ciltacabtagene Autoleucel (cilta-cel) B-cell Maturation Antigen (BCMA)—Directed Chimeric Antigen Receptor T Cell (CAR-T) Therapy in Patients With Early Relapse After Initial Multiple Myeloma (MM) Therapy," presented at the 48th Annual Meeting of the European Society for Blood and Marrow Transplantation, Mar. 19-23, 2022, Prague (1 page).

Lin et al., 2020, "Cytokine Release Syndrome in Patients With Relapsed/Refractory Multiple Myeloma Treated With Ciltacabtagene Autoleucel in the Phase 1b/2 CARTITUDE 1 Study," presented at the 62nd American Society of Hematology (ASH) Annual Meeting & Exposition, Dec. 5-8, 2020, Virtual (9 pages).

Lin et al., 2021, "Cytokine Release Syndrome in Patients With Relapsed/Refractory Multiple Myeloma Treated With Ciltacabtagene Autoleucel in the Phase 1b/2 CARTITUDE-1 Study," presented at the Transplantation & Cellular Therapy (TCT) Meetings of ASTCT and CIBMTR the 2021 TCT Meetings Digital Experience, Feb. 8-12, 2021 (9 pages).

Lin et al., 2021, "Cytokine Release Syndrome (CRS) in Patients With Relapsed/Refractory Multiple Myeloma (RRMM) Treated With Ciltacabtagene Autoleucel (Cilta-Cel) in the Phase 1b/2 CARTITUDE-1 Study," presented at The 7th World Congress on Controversies in Multiple Myeloma (COMy), May 7-9, 2021, Virtual (1 page).

Lin et al., 2022, "Meta-analysis of Ciltacabtagene Autoleucel versus Physician's Choice in the Treatment of Patients with Relapsed or Refractory MM (Encore)," presented at the 47th Annual Meeting of the Japanese Society of Melanoma (JSM), May 20-22, 2022, Fukushima City, Fukushima Prefecture, Japan (1 page).

Lin et al., 2022, "Ciltacabtagene Autoleucel, a BCMA-Directed CAR-T Cell Therapy, in Patients With Relapsed/Refractory Multiple Myeloma: 2-Year Post LPI Results From the Phase 1b/2 CARTITUDE-1 Study," presented at the European Hematology Association (EHA) 2022 Hybrid Congress, Jun. 9-12, 2022, Vienna, Austria (1 page).

Lin et al., 2023, "CARTITUDE-2 Final Results: Phase 1b/2 Study of Ciltacabtagene Autoleucel in Heavily Pretreated Patients With Relapsed/Refractory Multiple Myeloma," presented at the Annual Meeting of the American Society of Clinical Oncology (ASCO), Jun. 2-6, 2023, Chicago, IL (1 page).

Madduri et al., 2020, "Update of CARTITUDE 1: A Phase 1b/2 Study of JNJ-68284528 (JNJ-4528), a B-Cell Maturation Antigen (BCMA)-Directed Chimeric Antigen Receptor T (Car-T) Cell Therapy, in Relapsed/Refractory Multiple Myeloma (MM)," European School of Haematology (ESH) 5th Translational Research Conference: Multiple Myeloma, Oct. 8-11, 2020, Abstract (12 pages).

Madduri et al., 2020, "CARTITUDE-1: Phase 1b/2 Study of Ciltacabtagene Autoleucel, a B-Cell Maturation Antigen-Directed Chimeric Antigen Receptor T-Cell Therapy, in Relapsed/Refractory Multiple Myeloma," presented at the 62nd American Society of Hematology (ASH) Annual Meeting & Exposition, Dec. 5-8, 2020, Virtual (14 pages).

Madduri et al., 2021, "CARTITUDE-1: Phase 1b/2 Study of Ciltacabtagene Autoleucel, a B-cell Maturation Antigen-Directed Chimeric Antigen Receptor T-Cell Therapy, in Relapsed/Refractory Multiple Myeloma," presented at the 3rd European CAR T-Cell Meeting Virtual, Feb. 4-6, 2021 (1 page).

Madduri et al., 2021, "CARTITUDE-1: Phase 1B/2 Study of Ciltacabtagene Autoleucel in Relapsed/Refractory Multiple Myeloma (RRMM)," 2nd Meeting European Myeloma Network, Mar. 3- 6, 2021, Virtual (15 pages).

Madduri et al., 2021, "CARTITUDE-1: Phase 1b/2 Study of Ciltacabtagene Autoleucel, a B-Cell Maturation Antigen-Directed Chimeric Antigen Receptor T-Cell Therapy, in Relapsed/Refractory Multiple Myeloma," presented at the 47th Annual Meeting of the European Society of Blood and Marrow Transplantation (EBMT), Mar. 14-17, 2021 (15 pages).

Madduri et al., 2021, "CARTITUDE-1: Phase 1B/2 Study of Ciltacabtagene Autoleucel in Relapsed/Refractory Multiple Myeloma," ICKSH 2021: Korean Society of Hematology International Conference & 62nd Annual Meeting, Apr. 1-3, 2021, Virtual (15 pages).

Madduri et al., 2021, "CARTITUDE-1: Phase 1b/2 Study of Ciltacabtagene Autoleucel in Relapsed/Refractory Multiple Myeloma (RRMM)," presented at ESH 3rd How to Diagnose and Treat Multiple Myeloma, Apr. 15-18, 2021, Virtual (8 pages).

Madduri et al., 2021, "CARTITUDE-1: Phase 1b/2 Study of Ciltacabtagene Autoleucel in Relapsed/Refractory Multiple Myeloma," presented at British Society for Haematology (BSH) 2021 Virtual Annual Scientific Meeting (ASM), Apr. 25-28, 2021, Virtual (14 pages).

Mancia et al., 2022, "Clinical Strategies for Mitigation of Cytokine Release Syndrome and Neurotoxicity With Chimeric Antigen Receptor T Cell Therapy Ciltacabtagene Autoleucel in Multiple Myeloma," presented at the Oncology Nursing Society 2022 Congress, April 27-May 1, 2022, Anaheim, CA (1 page).

Mancia et al., 2022, "Patient Identification for Chimeric Antigen Receptor T-Cell Therapy: Initial Insights From the CARTITUDE Program in Multiple Myeloma," presented at the Oncology Nursing Society 2022 Congress, April 27-May 1, 2022, Anaheim, CA (1 page).

Manier et al., 2023, "EMagine/CARTITUDE-6: Randomized Phase 3 Study Comparing DVRd Followed by Ciltacabtagene Autoleucel Versus DVRd Followed by ASCT in Transplant-Eligible Patients With Newly Diagnosed Multiple Myeloma," presented at the 49th Annual Meeting of the European Society for Blood and Marrow Transplantation (EBMT), Apr. 23-26, 2023, Paris, France (1 page).

Manier et al., 2023, "Additional Analysis of CARTITUDE-4: Cilta-Cel vs Standard of Care (PVd or DPd) in Lenalidomide Refractory Patients With Multiple Myeloma and 1-3 Prior Lines of Therapy,"

(56) References Cited

OTHER PUBLICATIONS presented by S. Manier at the 20th International Myeloma Society (IMS) Annual Meeting and Exposition, Sep. 27-30, 2023, Athens, Greece (17 pages).
Martin et al., 2020, "Health-Related Quality of Life in the CARTITUDE-1 Study of Ciltacabtagene Autoleucel for Relapsed/ Refractory Multiple Myeloma," poster P45 (1 page).
Martin et al., 2020, "Health-Related Quality of Life in the CARTITUDE-1 Study of Ciltacabtagene Autoleucel for Relapsed/ Refractory Multiple Myeloma," presented at the 62nd American Society of Hematology (ASH) Annual Meeting & Exposition, Dec. 5-8, 2020, Virtual (10 pages).
Martin et al., 2021, "Cost per Responder Analysis to Assess the Value of CAR-T Therapy for Relapsed or Refractory Multiple Myeloma," Blood, 138(Supplement 1):4961, Nov. 5, 2021, [retrieved on Jan. 3, 2022]. Retrieved from the Internet <URL: https:// ashpublications.org/blood/article/138/Supplement%201/4961/481989/ Cost-per-Responder-Analysis-to-Assess-the-Value-of> (7 pages).
Martin et al., 2021, "Ciltacabtagene Autoleucel Versus Selinexor+ Dexamethasone in Triple-Class Exposed Patients With Relapsed/ Refractory Multiple Myeloma: A Matching-Adjusted Indirect Comparison," European Hematology Association (EHA), Jun. 9-17, 2021 (1 page).
Martin et al., 2021, "Health Related Quality of Life in the CARTITUDE-1 Study of Ciltacabtagene Autoleucel for Relapsed/ Refractory Multiple Myeloma," presented at the 3rd European CAR-T Cell Meeting Virtual, Feb. 4-6, 2021 (1 page).
Martin et al., 2021, "Health-Related Quality of Life in the CARTITUDE-1 Study of Ciltacabtagene Autoleucel for Relapsed/ Refractory Multiple Myeloma," presented at the Transplantation & Cellular Therapy (TCT) Meetings Digital Experience, Feb. 8-11, 2021 (1 page).
Martin et al., 2021, "Health-Related Quality of Life in the CARTITUDE-1 Study of Ciltacabtagene Autoleucel for Relapsed/ Refractory Multiple Myeloma," presented at the 47th Annual Meeting of the EBMT, Mar. 14-17, 2021 (1 page).
Martin et al., 2021, "Assessment of Health-Related Quality of Life in the CARTITUDE-1 Study of Ciltacabtagene Autoleucel in Relapsed/ Refractory Multiple Myeloma," presented at European School of Haematology (ESH) 3rd How to Diagnose and Treat Multiple Myeloma, Apr. 15-18, 2021, Virtual (1 page).
Martin et al., 2021, "Health-Related Quality of Life in the CARTITUDE-1 Study of Ciltacabtagene Autoleucel (Cilta-Cel) in Patients With Relapsed/Refractory Multiple Myeloma (RRMM)," presented at The 7th World Congress on Controversies in Multiple Myeloma (COMy), May 7-9, 2021, Virtual (1 page).
Martin et al., 2021, "Comparison of Ciltacabtageneautoleucel (Cilta-cel) in CARTITUDE-1 vs Real-World Standard of Care for Patients With Triple-Class Exposed Relapsed/Refractory Multiple Myeloma," presented at the Annual Meeting of the American Society of Clinical Oncology (ASCO), Jun. 4-8, 2021, Virtual (2 pages).
Martin et al., 2021, "Updated Results From CARTITUDE-1: Phase 1b/2 Study of Ciltacabtagene Autoleucel, a B cell Maturation Antigen Directed Chimeric Antigen Receptor T Cell Therapy, in Patients With Relapsed/Refractory Multiple Myeloma," presented at the 63rd American Society of Hematology (ASH) Annual Meeting & Exposition, Dec. 11-14, 2021, Atlanta, GA (10 pages).
Martin et al., 2022, "Use of Cost per Responder Models for CAR-T Therapies in Relapsed or Refractory Multiple Myeloma," poster EE167, May 2022 (1 page).
Martin et al., 2022, "Ciltacabtagene Autoleucel (Cilta-cel), a B-cell Maturation Antigen-directed Chimeric Antigen Receptor T (Car-T) Cell Therapy, in Relapsed/Refractory Multiple Myeloma (Rrmm): CARTITUDE-1 Results 2 Years Post Last Patient In (LPI)," presented at BLOOD, Sep. 11-14, 2022, Sydney, Australia (11 pages).
Mateos et al., 2021, "LocoMMotion: A Prospective, Non-interventional, Multinational Study of Real- life Current Standards of Care in Patients With Relapsed/Refractory Multiple Myeloma Receiving 3 Prior Lines of Therapy," presented at the Annual Meeting of the American Society of Clinical Oncology (ASCO), Jun. 4-8, 2021, Virtual (1 page).
Mateos et al., 2021, "A Prospective, Non-interventional, Multinational Study of Real-life Standard of Care in Patients With Relapsed/ Refractory Multiple Myeloma With >3 Prior Lines of Therapy: Interim Data from LocoMMotion," European Hematology Association (EHA), Jun. 9-17, 2021 (1 page).
Mateos et al., 2021, "Ciltacabtagene Autoleucel for Triple Class Exposed Multiple Myeloma: Adjusted Comparison of CARTITUDE-1 Outcomes Versus Real World Clinical Practice Observed from the LocoMMotion Prospective Study," presented at the 63rd American Society of Hematology (ASH) Annual Meeting & Exposition, Dec. 11-14, 2021, Atlanta, GA (13 pages).
Mateos et al., 2022, "Treatment Comparison of Ciltacabtagene Autoleucel Versus Physician's Choice in Patients with Relapsed or Refractory Multiple Myeloma: A Meta Analysis," presented at the 48th Annual Meeting of the European Society for Blood and Marrow Transplantation (EBMT), Mar. 19-23, 2022, Czech Republic (1 page).
Mateos et al., 2022, "Ciltacabtagene autoleucel (cilta-cel) versus real world clinical practice in triple- class exposed multiple myeloma: Adjusted comparison of patient reported outcomes from CARTITUDE-1 and LocoMMotion," presented at the International Myeloma Society (IMS) Annual Meeting, Aug. 25-27, 2022, Los Angeles, CA (1 page).
Mateos et al., 2023, "Cilta-cel Efficacy And Safety In Patients With Progressive Multiple Myeloma After Noncellular Anti-BCMA Immunotherapy," presented at the 49th European Society for Blood and Marrow Transplantation (EMBT) Annual Meeting, Apr. 23-26, 2023, Paris, France (9 pages).
Mateos et al., 2023, "Adjusted Comparisons of Ciltacabtagene Autoleucel With Therapies From Real-World Clinical Practice: Two-Year Follow-Up Analyses From CARTITUDE-1 and the Prospective LocoMMotion Study," presented at the European Hematology Association (EHA) 2023 Hybrid Congress, Jun. 8-11, 2023, Frankfurt, Germany (1 page).
Mehra et al., 2020, "Patient Characteristics, Treatment Patterns, and Outcomes in Patients With Triple- Class-Refractory Multiple Myeloma," presented at the 25th European Hematology Association (EHA) Annual Congress, Jun. 11-14, 2020 (1 page).
Mi et al., 2022, "Phase 2, Open-label Study of Ciltacabtagene Autoleucel, an Anti-BCMA CAR-T Cell Therapy, in Chinese Patients With Relapsed/Refractory Multiple Myeloma (CARTIFAN-1): 26-month Median Follow-up," presented at the 64th American Society of Hematology (ASH) Annual Meeting & Exposition, Dec. 10-13, 2022, New Orleans, LA (3 pages).
Mi et al., 2023, "Phase 2 Study of Ciltacabtagene Autoleucel in Chinese Patients With Relapsed/Refractory Multiple Myeloma (CARTIFAN-1): 26 Month Median Follow up (Encore)," presented at the 48th Japanese Society of Myeloma (JSM) Annual Meeting, May 26-28, 2023, Tokyo, Japan (10 pages).
Mi et al., 2023, "Long-Term Remission and Survival in Patients With Relapsed or Refractory Multiple Myeloma After Treatment With LCAR-B38M Car-T: >5-Year Follow-Up in LEGEND-2," presented at the Annual Meeting of the American Society of Clinical Oncology (ASCO), Jun. 2-6, 2023, Chicago, IL (1 page).
Mi et al., 2023, "Long-Term Remission and Survival in Patients With Relapsed or Refractory Multiple Myeloma After Treatment With LCAR-B38M Car-T: >5-Year Follow-Up in LEGEND-2," presented at the European Hematology Association (EHA) 2023 Hybrid Congress, Jun. 8-11, 2023, Frankfurt, Germany (1 page).
Mina et al., 2023, "Patient-Reported Outcomes in the Phase 3 CARTITUDE-4 Study of Ciltacabtagene Autoleucel vs Standard of Care in Patients With Lenalidomide-Refractory Multiple Myeloma After 1-3 Lines of Therapy," presented at the 65th American Society of Hematology (ASH) Annual Meeting & Exposition, Dec. 9-12, 2023, San Diego, CA (14 pages).
Mina et al., 2024, "Patient Reported Outcomes CARTITUDE-4 Study (Phase 3) of Ciltacabtagene Autoleucel vs Standard of Care in Patients with Lenalidomide Refractory Multiple Myeloma After 1-3 Lines of Therapy," presented at the 50th Annual Meeting of the

(56) References Cited

OTHER PUBLICATIONS

European Society for Bone and Marrow Transplantation (EBMT), Apr. 14-17, 2024, Glasgow, Scotland (14 pages).

Mina et al., 2024, "CARTITUDE-4 Study (Phase 3) Patient-Reported Outcomes of Ciltacabtagene Autoleucel vs Standard of Care in Patients With Lenalidomide-Refractory Multiple Myeloma After 1-3 Lines of Therapy," Presented by R Mina at the 5th European Myeloma Network (EMN) Meeting, Apr. 18-20, 2024, Torino, Italy (1 page).

Moreau et al., 2021, "LocoMMotion: A Prospective, Non-interventional, Multinational Study of Real- life Current Standards of Care in Patients With Relapsed/Refractory Multiple Myeloma Who Received 3 Prior Lines of Therapy," presented at the 63rd American Society of Hematology (ASH) Annual Meeting & Exposition, Dec. 11-14, 2021, Atlanta, GA (1 page).

Moreau et al., 2022, "Characterization and outcomes of spanish patients with relapsed/refractory multiple myeloma (RRMM) receiving 3 prior lines of therapy included in the prospective locommotion study," poster (1 page).

Moreau et al., 2022, "Adjusted Comparison of Patient Reported Outcomes From CARTITUDE-1 and LocoMMotion Comparing Ciltacabtagene Autoleucel Versus Real World Clinical Practice in Triple-Class Exposed Multiple Myeloma," presented at the annual congress of the French Society of Hematology (SFH), Mar. 29-31, 2022, Paris, France (1 page).

Moreau et al., 2022, "Adjusted Comparisons of Outcomes in Patients with Triple class exposed Multiple Myeloma: Ciltacabtagene Autoleucel (Cilta-Cel) from the CARTITUDE-1 Study Compared with Therapies in Real-world Clinical Practice from the LocoMMotion Prospective Study," presented at the French Society of Hematology (SFH) Annual Congress, Mar. 30, 2022-Apr. 1, 2022, Paris, France (13 pages).

Moreau et al., 2022, "Ciltacabtagene Autoleucel versus Physician's Choice in the Treatment of Patients with Relapsed or Refractory Multiple Myeloma: Results from Meta-analyses," presented at the French Society of Hematology (SFH) Annual Congress, Mar. 30 to Apr. 1, 2022, Paris, France (11 pages).

Moreau et al., 2022, "Updated Results From LocoMMotion: A Prospective, Noninterventional, Multinational Study of Real-life Current Standards of Care in Heavily Pretreated Patients With Relapsed/Refractory Multiple Myeloma," presented at the 19th International Myeloma Society (IMS) Annual Meeting, Aug. 25-27, 2022, Los Angeles, CA (3 pages).

Moreau et al., 2023, "LocoMMotion: A Prospective, Observational, Multinational Study of Real-Life Current Standards of Care in Patients With Relapsed/Refractory Multiple Myeloma-Final Analysis at 2- Year Follow-Up," presented at the European Hematology Association (EHA) 2023 Hybrid Congress, Jun. 8-11, 2023, Frankfurt, Germany (1 page).

Moreau et al., 2024, "LocoMMotion: A Prospective, Observational, Multinational Study of Real-Life Current Standards of Care in Patients With Relapsed/Refractory Multiple Myeloma - Final Analysis at 2-Year Follow-Up," presented at the 50th Annual Meeting of the European Society for Bone and Marrow Transplantation (EMBT), Apr. 14-17, 2024, Glasgow, Scotland (1 page).

Moreau et al., 2024, "LocoMMotion: A Prospective, Observational, Multinational Study of Real-Life Current Standards of Care in Patients With Relapsed/Refractory Multiple Myeloma - Final Analysis at 2-Year Follow-Up," presented by K Weisel at the 5th European Myeloma Network (EMN) Meeting, Apr. 18-20, 2024, Torino, Italy (1 page).

Munshi et al., 2022, "Efficacy Outcomes and Characteristics of Patients With Multiple Myeloma Who Achieved Sustained Minimal Residual Disease Negativity After Treatment With Ciltacabtagene Autoleucel in CARTITUDE-1," presented at the 64th American Society of Hematology (ASH) Annual Meeting & Exposition, Dec. 10-13, 2022, New Orleans, LA (2 pages).

Munshi et al., 2023, "CARTITUDE 1 Final Results: Phase 1b/2 Study of Ciltacabtagene Autoleucel in Heavily Pretreated Patients With Relapsed/Refractory Multiple Myeloma, " presented at the European Hematology Association (EHA) 2023 Hybrid Congress, Jun. 8-11, 2023, Frankfurt, Germany (14 pages).

Perrot et al., 2022, "Real life Standard of care Therapies for Patients With Relapsed/Refractory Multiple Myeloma Who Received >3 Prior Lines of Therapy: The Prospective, Non interventional, Multinational LocoMMotion Study," presented at Société Française d'Hématologie (SFH), 42nd congress, Mar. 30 to Apr. 1, 2022, Paris, France, poster (1 page).

Perrot et al., 2022, "Real life Standard of care Therapies for Patients With Relapsed/Refractory Multiple Myeloma Who Received >3 Prior Lines of Therapy: The Prospective, Non interventional, Multinational LocoMMotion Study," presented at Société Française d'Hématologie (SFH), 42nd congress, Mar. 30 to Apr. 1, 2022, Paris, France, slides (2 pages).

Raghunandan et al., 2022, "Bcma Car-T after Allogeneic HCT Induces Remission in Refractory Plasmablastic Lymphoma," Children's Healthcare of Atlanta Inc., poster (1 page).

Rodriguez-Otero, et al., 2023, "Cilta-Cel Efficacy and Safety in Patients With Progressive Multiple Myeloma After Noncellular Anti-BCMA Immunotherapy," presented at The 9th World Congress on Controversies in Multiple Myeloma (COMy), May 11-14, 2023, Paris, France (10 pages).

Sidiqi et al., 2023, "Efficacy and Safety in Patients With Lenalidomide-Refractory Multiple Myeloma and 1-3 Prior Lines Who Received a Single Infusion of Ciltacabtagene Autoleucel as Study Treatment in the Phase 3 CARTITUDE-4 Trial," presented at the 65th American Society of Hematology (ASH) Annual Meeting & Exposition, Dec. 9-12, 2023, San Diego, CA (1 page).

Sidiqi et al., 2024, "Efficacy and Safety in Patients With Lenalidomide-Refractory Multiple Myeloma and 1-3 Prior Lines Who Received Ciltacabtagene Autoleucel as Study Treatment CARTITUDE-4 Trial (Phase 3)," presented at the 50th Annual Meeting of the European Society for Bone and Marrow Transplantation (EBMT), Apr. 14-17, 2024, Glasgow, Scotland (1 page).

Sidiqi et al., 2024, "Efficacy and Safety in Patients With Lenalidomide-Refractory Multiple Myeloma and 1-3 Prior Lines Who Received Ciltacabtagene Autoleucel As Study Treatment CARTITUDE-4 Trial (Phase 3)," presented by P Corradiniat the 5th European Myeloma Network (EMN) Meeting, Apr. 18-20, 2024, Torino, Italy (1 page).

Singh et al., 2020, "Preliminary Clinical Pharmacokinetic Analysis of CARTITUDE-1, a Phase 1b/2 Study of JNJ-4528 (Bcma Car-T) Cell Therapy in Patients with Relapsed and/or Refractory Multiple Myeloma," presented at 2020 American College of Clinical Pharmacology (ACCP 2020) Annual Meeting, Sep. 21-23, 2020, Virtual (1 page).

Sonneveld et al., 2023, "DVRd Followed by Ciltacabtagene Autoleucel Versus DVRd Followed by ASCT in Patients With Newly Diagnosed Multiple Myeloma Who Are Transplant Eligible: A Randomized Phase 3 Study (EMagine/CARTITUDE-6)," presented at The 9th World Congress on Controversies in Multiple Myeloma (COMy), May 11-14, 2023, Paris, France (1 page).

Sonneveld, et al., 2023, "Ciltacabtagene Autoleucel (Cilt- Cel), a BCMA-Directed CAR-T Cell Therapy, in Patients With Multiple Myeloma (MM) and Early Relapse After Initial Therapy: CARTITUDE-2 Cohort B 18-Month Follow-Up," presented at The 9th World Congress on Controversies in Multiple Myeloma (COMy), May 11-14, 2023, Paris, France (10 pages).

Suvannasankha et al., 2023, "Cilta-Cel Efficacy and Safety in Patients with Progressive Multiple Myeloma after Exposure to Non-cellular Anti-BCMA Immunotherapy," presented at the 2023 Tandem Meetings Transplantation & Cellular Therapy Meetings of ASTCT and CIBMTR, Feb. 15-19, 2023, Orlando, FL (7 pages).

Sweiss et al., 2022, "Effect of Predicted Fludarabine Lymphodepletion Exposure on Clinical Outcomes in Myeloma Patients Undergoing BCMA-CAR-T: An Exploratory Analysis from CARTITUDE-1," presented at the 64th American Society of Hematology (ASH) Annual Meeting & Exposition, Dec. 10-13, 2022, New Orleans, LA (1 page).

Sweiss et al., 2023, "An Exploratory Analysis on the Effect of Predicted Fludarabine Lymphodepletion Exposure on Clinical Outcomes in Patients with Relapsed and Refractory Multiple Myeloma (RRMM) Who Received BCMA CAR-T Therapy in the

(56) References Cited

OTHER PUBLICATIONS

CARTITUDE-1 Study," presented at the 2023 Tandem Meetings Transplantation & Cellular Therapy Meetings of ASTCT and CIBMTR, Feb. 15-19, 2023, Orlando, FL (1 page).

Usmani et al., 2021, "Updated Results of Ciltacabtagene Autoleucel (Cilta-Cel), a B-Cell Maturation Antigen (BCMA)-Directed Chimeric Antigen Receptor T (Car-T) Cell Therapy, in Relapsed/Refractory Multiple Myeloma (RRMM)," Blood, previously presented at the ASCO 2021 Annual Meeting (12 pages).

Usmani et al., 2021, "Ciltacabtagene Autoleucel , A B-Cell Maturation Antigen (BCMA)-Directed Chimeric Antigen Receptor T-Cell (CAR-T) Therapy, In Relapsed/Refractory Multiple Myeloma (R/R MM): Updated Results From CARTITUDE-1," European School of Haematology (ESH) (10 pages).

Usmani et al., 2021, "Cytokine Release Syndrome in Patients With Relapsed/Refractory Multiple Myeloma Treated With Ciltacabtagene Autoleucelin the Phase 1b/2 CARTITUDE-1 Study," presented at the 3rd European CAR T-Cell Meeting (Virtual), Feb. 4-6, 2021 (1 page).

Usmani et al., 2021, "Ciltacabtagene Autoleucel, a B-Cell Maturation Antigen (BCMA)-Directed Chimeric Antigen Receptor T-Cell (CAR-T) Therapy, in Relapsed/Refractory Multiple Myeloma (R/R Mm): Updated Results From CARTITUDE-1," presented at the Annual Meeting of the American Society of Clinical Oncology (ASCO), Jun. 4-8, 2021, Virtual (12 pages).

Usmani et al., 2021, "Updated CARTITUDE-1 Results of Ciltacabtagene Autoleucel, a B-Cell Maturation Antigen-Directed Chimeric Antigen Receptor T Cell Therapy, in Relapsed/Refractory Multiple Myeloma," presented at the Annual Meeting of the European Hematology Association (EHA), Jun. 9-17, 2021 (3 pages).

Usmani et al., 2021, "Updated results of ciltacabtagene autoleucel (Cilta-Cel),a B-cell maturation antigen (BCMA)-directed chimeric antigen receptor T (CAR-T) cell therapy, in relapsed/refractory multiple myeloma (RRMM)," presented at Society of Hematologic Oncology (SOHO) 2021 Annual Meeting, Sep. 8-11, 2021, Houston, TX, poster (1 page).

Usmani et al., 2021, "Updated Results of Ciltacabtagene Autoleucel (Cilta-Cel), a B-Cell Maturation Antigen (BCMA)-Directed Chimeric Antigen Receptor T (CAR-T) Cell Therapy, in Relapsed/Refractory Multiple Myeloma (RRMM)," presented at Society of Hematologic Oncology (SOHO) 2021 Annual Meeting, Sep. 8-11, 2021, Houston, TX, slides (13 pages).

Usmani et al., 2021, "Updated Results From the CARTITUDE-1 Study of Ciltacabtagene Autoleucel, a B-Cell Maturation Antigen-Directed Chimeric Antigen Receptor T Cell Therapy, in Relapsed/Refractory Multiple Myeloma," presented at Brazilian Congress of Hematology, Hemotherapy and Cell Therapy (HEMO), Oct. 27-30, 2021, Virtual (1 page).

Usmani et al., 2022, "Ciltacabtagene Autoleucel Efficacy and Safety in Patients With Rrmm: CARTITUDE-1 Subgroup Analysis," presented at the 44th Annual Meeting of the Japanese Society for Transplantation and Cellular Therapy, May 12-14, 2022, Yokohama, Japan (8 pages).

Usmani et al., 2022, "Ciltacabtagene Autoleucel Efficacy and Safety in Patients With Rrmm: CARTITUDE-1 Subgroup Analysis (Encore)," presented at the 47th Annual Meeting of the Japanese Society of Melanoma (JSM), May 20-22, 2022, Fukushima City, Fukushima Prefecture, Japan (8 pages).

Usmani et al., 2022, "Phase 1b/2 Study of Ciltacabtagene Autoleucel, a BCMA-Directed CAR-T Cell Therapy, in Patients With Relapsed/Refractory Multiple Myeloma (CARTITUDE-1): 2 Years Post LPI," presented at the 2022 American Society of Clinical Oncology (ASCO) Annual Meeting, Jun. 3-7, 2022, Chicago, IL (1 page).

Usmani et al., 2022, "CARTITUDE-1: Two-year Post Last Patient In (LPI) Results from the Phase 1b/2 Study of CiltacabtageneAutoleucel(Cilta-cel), a B-cell Maturation Antigen (BCMA)-Directed Chimeric Antigen Receptor T (CAR-T) Cell Therapy, in Patients with Relapsed/Refractory Multiple Myeloma (RRMM)," presented at the Society of Hematologic Oncology (SOHO) Annual Meeting, Sep. 28 to Oct. 1, 2022, Houston, TX (1 page).

Usmani et al., 2022, "CARTITUDE 1-2 Year Update: Cilta-cel Efficacy and Safety in Patients With Relapsed/Refractory Multiple Myeloma," presented at the 84th Annual Meeting of the Japanese Society of Hematology, Oct. 14-16, 2022, Fukuoka, Japan (15 pages).

Usmani et al., 2023, "Characteristics of Patients With Sustained Minimal Residual Disease Negativity in CARTITUDE-1," presented at the 45th Annual Meeting of the Japanese Society for Transplantation and Cellular Therapy, Feb. 10-12, 2023, Nagoya, Japan (10 pages).

Van De Donk et al., 2021, "Incidence, Mitigation, and Management of Neurologic Adverse Events in the CARTITUDE-2 Study of Ciltacabtagene Autoleucel," presented at European School of Haematology (ESH) (5 pages).

Van De Donk et al., 2021, "CARTITUDE-2: Efficacy and Safety of Ciltacabtagene Autoleucel, a B- cell Maturation Antigen-Directed Chimeric Antigen Receptor T cell Therapy, in Patients With Multiple Myeloma and Early Relapse After Initial Therapy," presented at the 63rd American Society of Hematology (ASH) Annual Meeting & Exposition, Dec. 11-14, 2021, Atlanta, GA (6 pages).

Van De Donk et al., 2022, "CARTITUDE- 2 Cohort B: Efficacy and Safety of Ciltacabtagene Autoleucel, a Chimeric Antigen Receptor T-Cell Therapy Directed Against B-Cell Maturation Antigen, in Patients With Multiple Myeloma and Early Relapse After Initial Treatment," presented at the 62nd British Society for Haematology (BSH) Annual Meeting, Apr. 3-5, 2022, Manchester (1 page).

Van De Donk et al., 2022, "Safety and Efficacy of Ciltacabtagene Autoleucel, aChimeric Antigen Receptor T-Cell Therapy Directed Against B-Cell Maturation Antigen in Patients with Multiple Myeloma and Early Relapse After Initial Therapy: Cartitude-2 Results," presented at the 3rd European Myeloma Network (EMN) Meeting, Apr. 6-9, 2022 (9 pages).

Van De Donk et al., 2022, "Ciltacabtagene Autoleucel (Cilta-Cel), a B-Cell Maturation Antigen (BCMA) Directed Chimeric Antigen Receptor (CAR) T-Cell Therapy, in Patients (PTS) with Multiple Myeloma (MM) and Early Relapse After Initial Therapy: Cartitude-2 Cohort B," presented at the 8th World Congress on Controversies in Multiple Myeloma (COMy), May 12-15, 2022, Paris, France (9 pages).

Van De Donk et al., 2022, "Cilta-cel, a BCMA Directed CAR-T, in MM Patients with Early Relapse After Initial Therapy (CARTITUDE-2)," presented at the 44th Annual Meeting of the Japanese Society for Transplantation and Cellular Therapy, May 12-14, 2022, Yokohama, Japan (10 pages).

Van De Donk et al., 2022, "Biological Correlative Analyses and Updated Clinical Data of Ciltacabtagene Autoleucel, a BCMA-Directed CAR-T Cell Therapy, in Patients With Multiple Myeloma and Early Relapse After Initial Therapy: CARTITUDE-2, Cohort B," presented at the 2022 American Society of Clinical Oncology (ASCO) Annual Meeting, Jun. 3-7, 2022, Chicago, IL (8 pages).

Van De Donk et al., 2022, "Ciltacabtagene Autoleucel (Cilta-Cel), a BCMA-directed CAR-T Cell Therapy, in Patients With Multiple Myeloma (MM) and Early Relapse After Initial Therapy: CARTITUDE-2 Cohort B 18-Month Follow-up," presented at the 64th American Society of Hematology (ASH) Annual Meeting & Exposition, Dec. 10-13, 2022, New Orleans, LA (5 pages).

Van De Donk et al., 2023, "Cilta-cel Efficacy and Safety in Anti-BCMA Exposed Multiple Myeloma Patients: CARTITUDE-2 Cohort C," presented at the 45th Annual Meeting of the Japanese Society for Transplantation and Cellular Therapy, Feb. 10-12, 2023, Nagoya, Japan (11 pages).

Van De Donk et al., 2023, "Efficacy and Safety of Cilta-cel in Patients With Progressive Multiple Myeloma After Exposure to Non-cellular Anti-BCMA Immunotherapy," presented at the 4th European Myeloma Network (EMN) Annual Meeting, Apr. 20-22, 2023, Amsterdam, Netherlands (1 page).

Van De Donk et al., 2023, "CARTITUDE-2 Cohort B 18-Month Follow-up: Ciltacabtagene Autoleucel Cilta-cel), a BCMA-directed CAR T-Cell Therapy, in Patients With Multiple Myeloma (MM) and Early Relapse After Initial Therapy," presented at the 49th European

(56) References Cited

OTHER PUBLICATIONS

Society for Blood and Marrow Transplantation (EMBT) Annual Meeting, Apr. 23-26, 2023, Paris, France (11 pages).
Van De Donk et al., 2023, "Ciltacabtagene Autoleucel in Patients With Multiple Myeloma With Early Relapse After Initial Therapy: CARTITUDE 2 Cohort B 18 Month Follow up (Encore)," presented at the 48th Japanese Society of Myeloma (JSM) Annual Meeting, May 26-28, 2023, Tokyo, Japan (11 pages).
Vekemans et al., 2022, "Ciltacabtagene Autoleucel for Patients With Triple-Class Exposed Multiple Myeloma: Adjusted Comparison of CARTITUDE-1 Patient Outcomes Versus Real-world Clinical Practice in Belgium," presented at the 37rd General Annual Meeting of the Belgian Hematology Society, Feb. 4-5, 2022, La Hulpe, Belgium (1 page).
Vekemans et al., 2022, "Treatments in Patients with Relapsed/Refractory Multiple Myeloma: Retrospective Chart Review of Real World Outcomes for Standard of Care," presented at the 3rd European Myeloma Network Meeting, Apr. 6-9, 2022 (1 page).
Vekemans et al., 2022, "Real-World Outcomes (RWO) for Standard of Care (SOC) Treatments in Patients with Relapsed or Refractory Multiple Myeloma (RRMM)," The 8th World Congress on Controversies in Multiple Myeloma (COMy), May 12, 2022 (1 page).
Weisel et al., 2021, "Characteristics and Treatment Patterns of Triple-Class Exposed Patients With Relapsed/Refractory Multiple Myeloma Who Participated in Clinical Trials of Daratumumab," presented at the 47th Annual Meeting of the European Society of Blood and Marrow Transplantation (EBMT), Mar. 14-17, 2021 (12 pages).
Weisel et al., 2021, "Comparison of Ciltacabtagene Autoleucel (Cilta-cel) in CARTITUDE-1 Versus Standard of Care in Triple-Class Exposed Multiple Myeloma Patients in Clinical Trials of Daratumumab," European Hematology Association (EHA), Jun. 9-17, 2021 (1 page).
Weisel et al., 2021, "Matching-Adjusted Indirect Comparison of Ciltacabtagene Autoleucel Versus Belantamab Mafodotin in Patients With Triple-Class Exposed Relapsed/Refractory Multiple Myeloma," European Hematology Association (EHA), Jun. 9-17, 2021 (1 page).
Weisel et al., 2022, "Updated Results of Ciltacabtagene Autoleucel (Cilta-cel), Chimeric Antigen Receptor T Cell (CAR-T) Therapy in Lenalidomide Refractory Multiple Myeloma (MM) After 1-3 Prior Lines of Therapy," presented at the 48th Annual Meeting of the European Society for Blood and Marrow Transplantation, Mar. 19-23, 2022, Prague (1 page).
Weisel et al., 2022, "Ciltacabtagene Autoleucel (Cilta-Cel) Versus Physician's Choice of Treatment (PCT): A Meta Analysis in Patients with Relapsed or Refractory Multiple Myeloma (RRMM)," presented at the 8th World Congress on Controversies in Multiple Myeloma (COMy), May 12-15, 2022, Paris, France (8 pages).
Weisel et al., 2022, "Adjusted Comparison of Patient Reported Outcomes From CARTITUDE-1 and LocoMMotion Comparing Ciltacabtagene Autoleucel Versus Real World Clinical Practice in Triple-Class Exposed Multiple Myeloma," presented at the European Hematology Association (EHA) 2022 Hybrid Congress, Jun. 9-12, 2022, Vienna, Austria (1 page).
Weisel et al., 2022, "Ciltacabtagene Autoleucel (Cilta-cel) vs Real-world Clinical Practice (RWCP) in Triple-class Exposed Multiple Myeloma (TCEMM): Adjusted Comparison of Patient-reported Outcomes (PROs) From CARTITUDE-1 and LocoMMotion," presented at Deutsche Gesellschaft für Hämatologie und Medizinische Onkologie (DGHO), Oct. 7-10, 2022, Vienna, Austria (1 page).
Weisel et al., 2023, "LocoMMotion: A Prospective, Observational, Multinational Study of Real-Life Current Standards of Care in Patients With Relapsed/RefractoryMultiple Myeloma - Final Analysis at 2- Year Follow-Up," presented at the 20th International Myeloma Society (IMS) Annual Meeting and Exposition, Sep. 27-30, 2023, Athens, Greece (1 page).
Wong et al., 2021, "Anakinra Targeting Cytokine Release Syndrome Associated With Chimeric Antigen Receptor T-cell Therapies," presented at the 63rd American Society of Hematology (ASH) Annual Meeting & Exposition, Dec. 11-14, 2021, Atlanta, GA (2 pages).
Wong et al., 2022, "Anakinra Targeting Cytokine Release Syndrome (CRS) Associated With Chimeric Antigen Receptor T cell (CAR-T) Therapies," presented at the 2022 Tandem Meetings Transplantation & Cellular Therapy Meetings of ASTCT and CIBMTR, Apr. 23-26, 2022, Salt Lake City, UT (2 pages).
Wu et al., 2022, "Population Pharmacokinetic Modeling of Ciltacabtagene autoleucel in Subjects with Relapsed or Refractory Multiple Myeloma," presented at the American Association for Cancer Research (AACR) Annual Meeting 2022, Apr. 8-13, 2022, New Orleans, LA (1 page).
Wu et al., 2022, "CAR-T Cell Therapy PopPK and E-R Using Ciltacabtagene Autoleucel as Example," presented at the American Conference on Pharmacometrics, Oct. 30 to Nov. 2, 2022, Aurora, CO (17 pages).
Yong et al., 2023, "Daratumumab Clinical Trial Analysis: Outcomes in Patients With Lenalidomide- Refractory Relapsed/Refractory Multiple Myeloma, 1-3 Prior Lines of Therapy," presented at the 2023 British Society for Haematology Annual Meeting, Apr. 23-25, 2023, Birmingham, United Kingdom (1 page).
Zweegman et al., 2023, "CARTITUDE-2 Cohort B 18-Month Follow-up: Ciltacabtagene Autoleucel Cilta-cel), a BCMA-directed CAR-T Cell Therapy, in Patients With Multiple Myeloma (MM) and Early Relapse After Initial Therapy," presented at the 4th European Myeloma Network (EMN) Annual Meeting, Apr. 20-22, 2023, Amsterdam, Netherlands (8 pages).
Berdeja et al., 2021, "Ciltacabtagene autoleucel, a B-cell maturation antigen-directed chimeric antigen receptor T-cell therapy in patients with relapsed or refractory multiple myeloma (CARTITUDE-1): a phase 1b/2 open-label study," Lancet, 398(10297):314-324 and supplementary material (288 pages).
Jagannath et al., 2025, "Long-Term (>5-Year) Remission and Survival After Treatment With Ciltacabtagene Autoleucel in CARTITUDE-1 Patients With Relapsed/Refractory Multiple Myeloma," J. Clin. Oncol., JCO2500760 (8 pages).
Berdeja et al., 2020, "Update of CARTITUDE-1: A phase Ib/II study of JNJ-4528, a B-cell maturation antigen (BCMA)-directed CAR-T-cell therapy, in relapsed/refractory multiple myeloma," 2020 ASCO Annual Meeting I, May 25, 2020, J. Clin. Oncol., 38(Supplement_15), Abstract 8505 (3 pages).
Fan et al., 2017, "Durable remissions with BCMA-specific chimeric antigen receptor (CAR)-modified T cells in patients with refractory/relapsed multiple myeloma," J. Clin. Oncol. 35(Supplement_18):LBA3001 (2 pages).
Madduri et al., 2019, "Results from CARTITUDE-1: A Phase 1b/2 Study of JNJ-4528, a CAR-T Cell Therapy Directed Against B-Cell Maturation Antigen (BCMA), in Patients with Relapsed and/or Refractory Multiple Myeloma (R/R Mm), " Blood, 134(Supplement_1):577 (4 pages).
Zudaire et al., 2019, "Translational Analysis from CARTITUDE-1, an Ongoing Phase 1b/2 Study of JNJ-4528 BCMA-targeted CAR-T Cell Therapy in Relapsed and/or Refractory Multiple Myeloma (R/R MM), Indicates Preferential Expansion of CD8+ T Cell Central Memory Cell Subset," Blood, 134(Supplement 1):928 (3 pages).
ClinicalTrial NCT03548207 (v5), "A Phase 1b-2, Open-Label Study of JNJ-68284528, A Chimeric Antigen Receptor T-Cell (CAR-T) Therapy Directed Against BCMA in Subjects With Relapsed or Refractory Multiple Myeloma," first posted Jun. 7, 2018, last update posted Oct. 15, 2018 (19 pages).
ClinicalTrial NCT03548207 (v17), "A Phase 1b-2, Open-Label Study of JNJ-68284528, A Chimeric Antigen Receptor T-Cell (CAR-T) Therapy Directed Against BCMA in Subjects With Relapsed or Refractory Multiple Myeloma," first posted Jun. 7, 2018, last update posted Oct. 11, 2019 (22 pages).
ClinicalTrial NCT03548207 (v23), "A Phase 1b-2, Open-Label Study of JNJ-68284528, A Chimeric Antigen Receptor T-Cell (CAR-T) Therapy Directed Against BCMA in Subjects With Relapsed or Refractory Multiple Myeloma," first posted Jun. 7, 2018, last update posted Oct. 9, 2020 (20 pages).

(56) References Cited

OTHER PUBLICATIONS

Madduri et al., 2020, "Phase 1b results from CARTITUDE-1: A phase 1b/2 study of JNJ-4528, a chimeric antigen receptor T (CAR-T) cell therapy directed against B-cell maturation antigen (BCMA), in patients with relapsed and/or refractory multiple myeloma (R/R MM)," 2nd European CAR T Cell Meeting, Jan. 30, 2020 to Feb. 1, 2020 (previously presented at ASH 2019 (Abstract #577)) (8 pages).
Blaeschke et al., 2018, "Induction of a central memory and stem cell memory phenotype in functionally active CD4+ and CD8+ CAR T cells produced in an automated good manufacturing practice system for the treatment of CD19+ acute lymphoblastic leukemia," Cancer Immunol. Immunother, 67(7):1053-1066.
Sommermeyer et al., 2016, "Chimeric antigen receptor-modified T cells derived from defined CD8+ and CD4+ subsets confer superior antitumor reactivity in vivo," Leukemia, 30(2):492-500 (Epub 2015).

\* cited by examiner

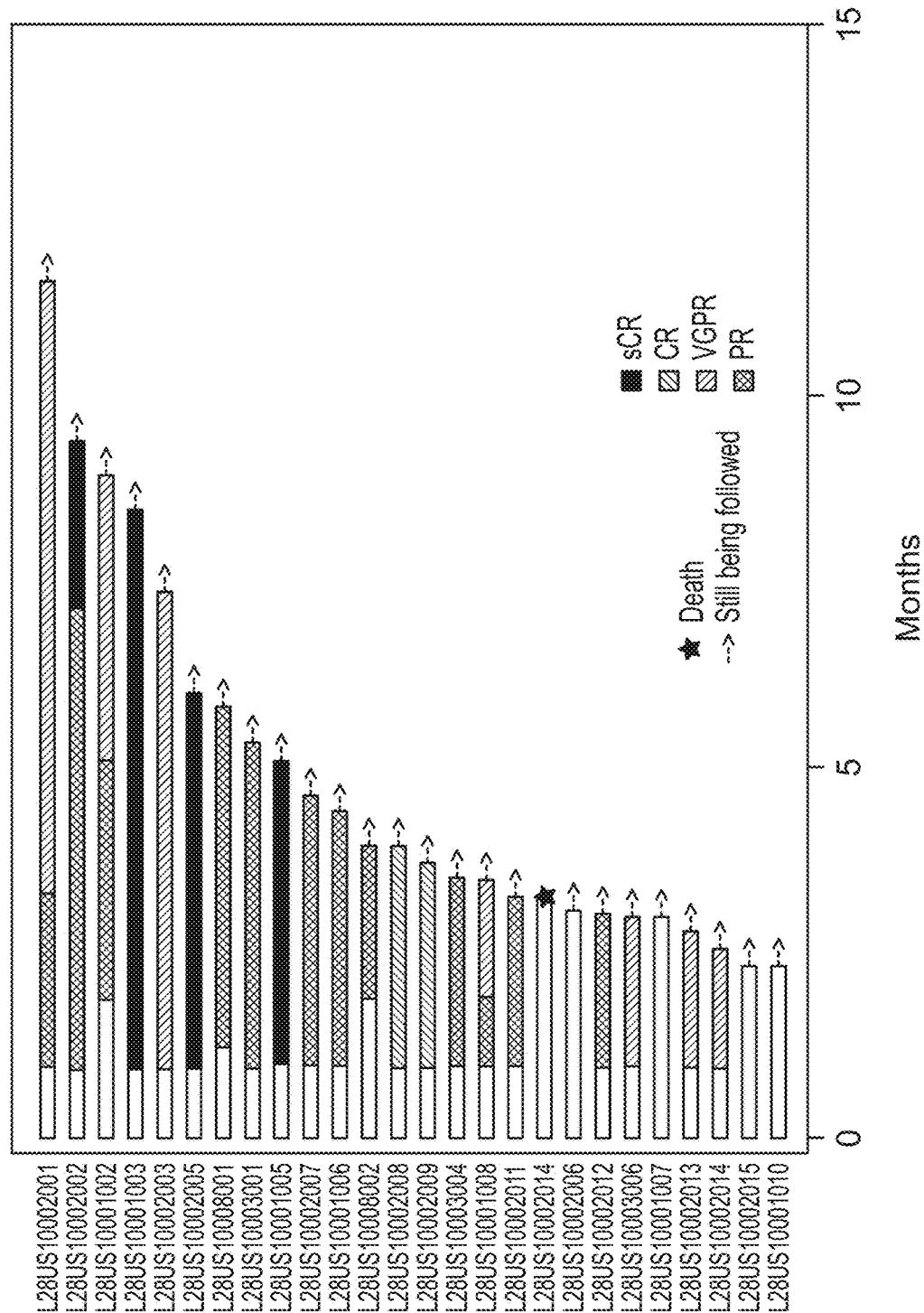

FIG. 5A

| Subject Id | D28 | | | D56 | | | D184 | | | D365 | | |
|---|---|---|---|---|---|---|---|---|---|---|---|---|
| Subject Id | $10^{-4}$ | $10^{-5}$ | $10^{-6}$ | $10^{-4}$ | $10^{-5}$ | $10^{-6}$ | $10^{-4}$ | $10^{-5}$ | $10^{-6}$ | $10^{-4}$ | $10^{-5}$ | $10^{-6}$ |
| L28US10002001 | | F- | | | | | | | | | | |
| L28US10002002 | NGS- | NGS-/F- | NGS+ | | | | NGS- | NGS-/F- | Indet. | NGS- | NGS- | NGS- |
| L28US10001002 | NGS- | Indet. | Indet. | | | | | | | | | |
| L28US10001003 | NGS- | Indet. | Indet. | | | | | | | | | |
| L28US10002004 | Sample not collected | | | | | | | | | | | |
| L28US10002003 | NGS- | NGS-/F- | NGS- | | | | NGS- | NGS-/F- | Indet. | | | |
| L28US10002005 | Cal. Fail. | F- | | | | | Sent | Sent | Sent | | | |
| L28US10008001 | | Cal. Fail. | | | | | | | | | | |
| L28US10003001 | NGS- | NGS-/F- | NGS- | | | | | | | | | |
| L28US10001005 | | Cal. Fail. | | | | | | | | | | |
| L28US10002007 | NGS- | NGS-/F- | NGS- | | | | | | | | | |
| L28US10001006 | NGS- | NGS- | Indet. | | | | | | | | | |
| L28US10002008 | NGS- | NGS-/F- | NGS- | | | | | | | | | |
| L28US10008002 | | Cal. Fail. | | | | | | | | | | |
| L28US10002009 | NGS- | NGS-/F- | NGS- | NGS- | /F- | NGS- | | | | | | |
| L28US10003004 | NGS- | NGS- | Indet. | | NGS- | NGS- | | | | | | |
| L28US10001008 | NGS- | NGS- | Indet. | | | | | | | | | |
| L28US10002011 | NGS- | NGS-/F- | NGS- | | | | | | | | | |
| L28US10002006 | NGS- | NGS-/F- | NGS- | | | | | | | | | |
| L28US10002012 | NGS- | NGS-/F- | Indet. | | | | | | | | | |

F = Flow cytometry
NGS = ClonoSeq

XXX = negative
XXX = positive
Indet. = Indeterminate

FIG. 5B

| Subject Id | D28 | | | D56 | | | D184 | | | D365 | | |
|---|---|---|---|---|---|---|---|---|---|---|---|---|
| | $10^{-4}$ | $10^{-5}$ | $10^{-6}$ | $10^{-4}$ | $10^{-5}$ | $10^{-6}$ | $10^{-4}$ | $10^{-5}$ | $10^{-6}$ | $10^{-4}$ | $10^{-5}$ | $10^{-6}$ |
| L28US10001007 | Sent | Sent /F- | Sent | | | | | | | | | |
| L28US10001010 | NGS- | Indet. | Indet. | | | | | | | | | |
| L28US10002013 | NGS- | NGS-/F- | NGS- | | | | | | | | | |
| L28US10002014 | | /F- | | | /F- | | | | | | | |
| L28US10002015 | NGS- | NGS- | NGS- | | | NGS- | | | | | | |
| L28US10003006 | Sent | Sent | Sent | NGS- | NGS- | NGS- | | | | | | |
| L28US10003010 | NGS- | Indet. | Indet. | | | | | | | | | |
| L28US10004001 | NGS- | NGS- | Indet. | | | | | | | | | |
| L28US10008004 | NGS- | NGS- | Indet. | | | | | | | | | |
| L28US10008005 | NGS- | NGS- | NGS- | | | | | | | | | |

F = Flow cytometry
NGS = ClonoSeq

XXX = negative
[XXX] = positive
Indet. = Indeterminate

FIG. 12
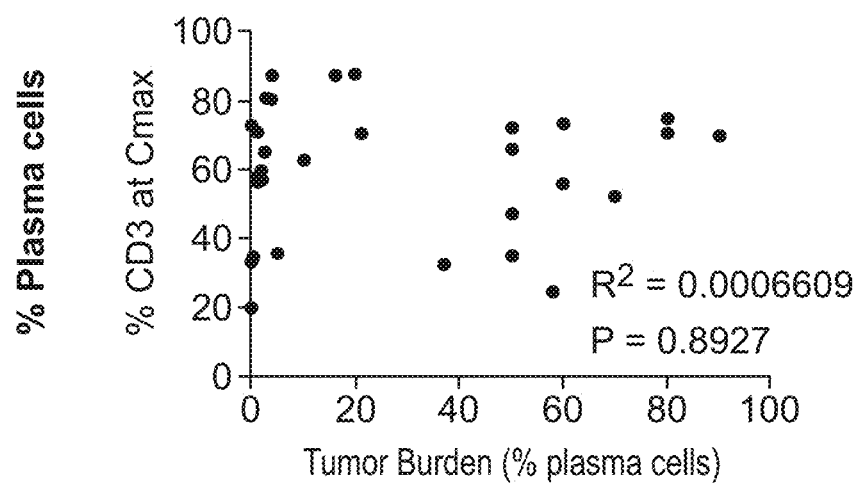
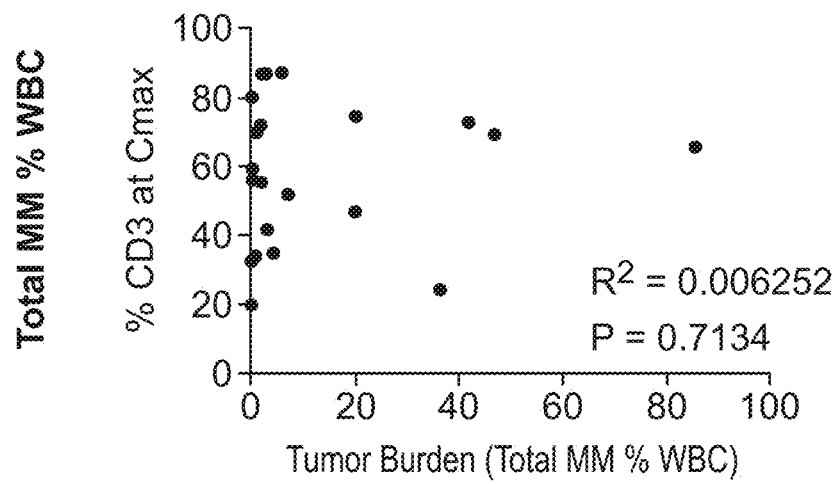

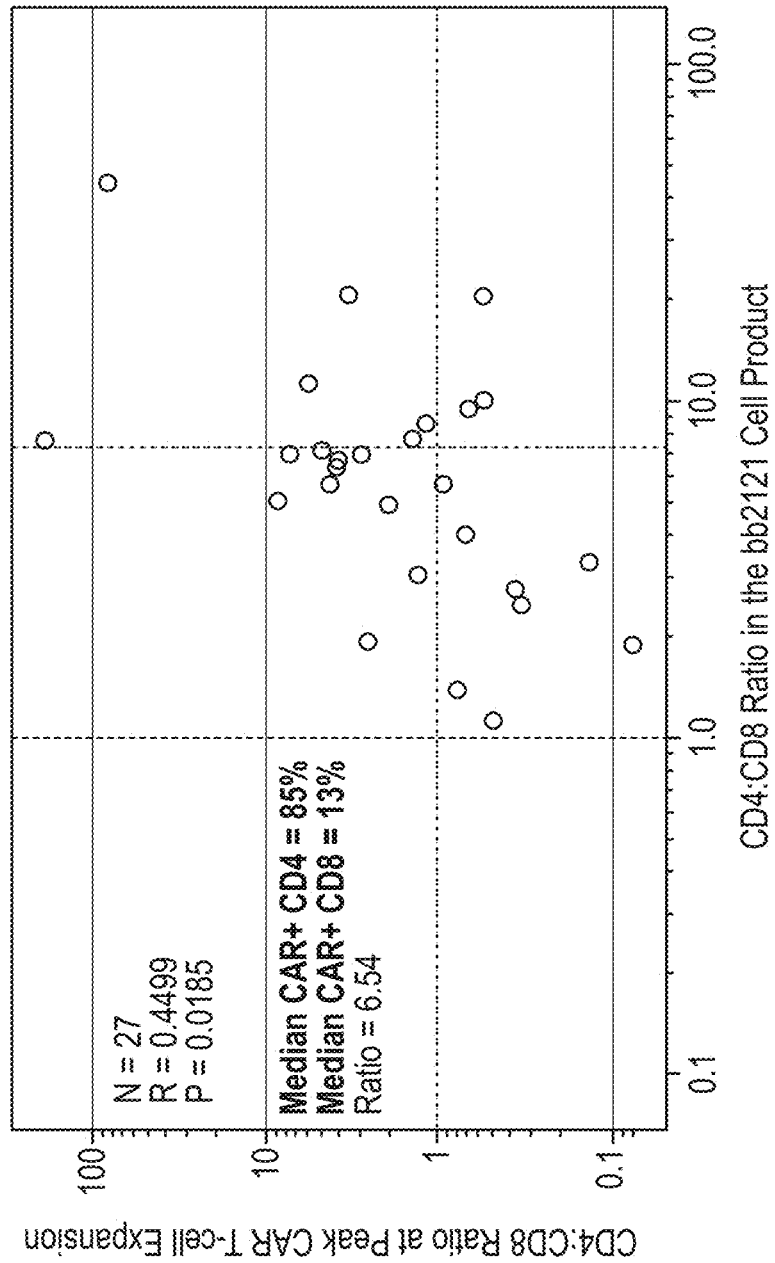

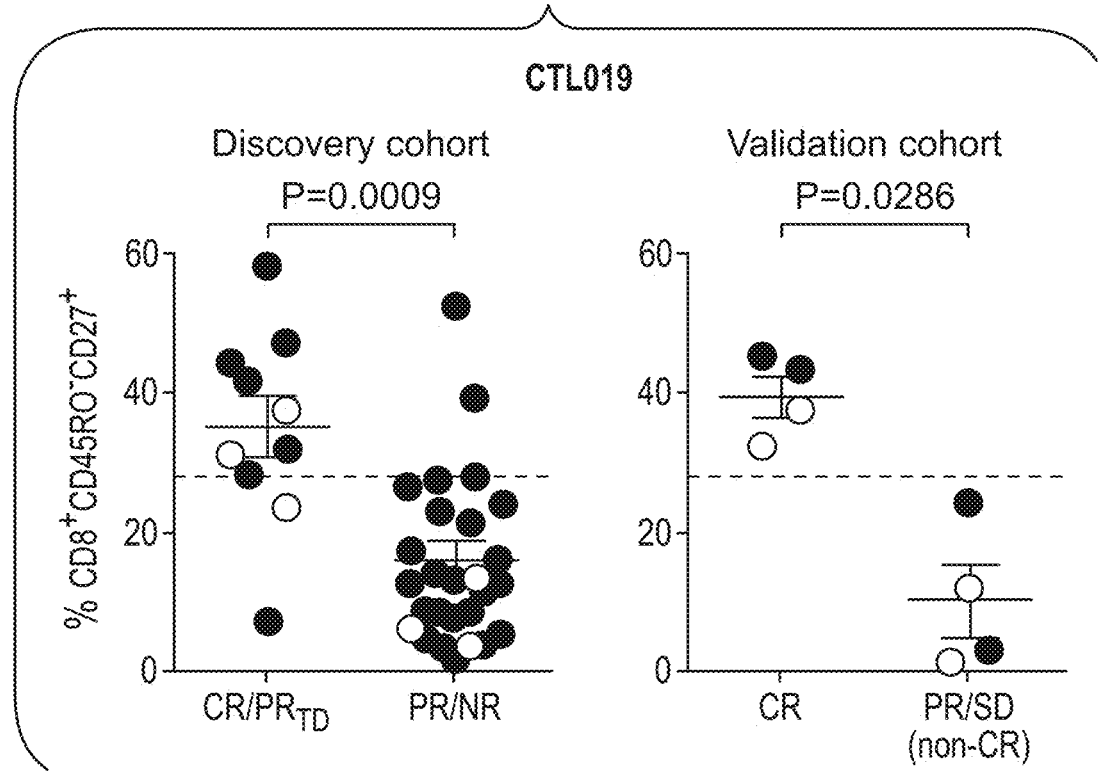

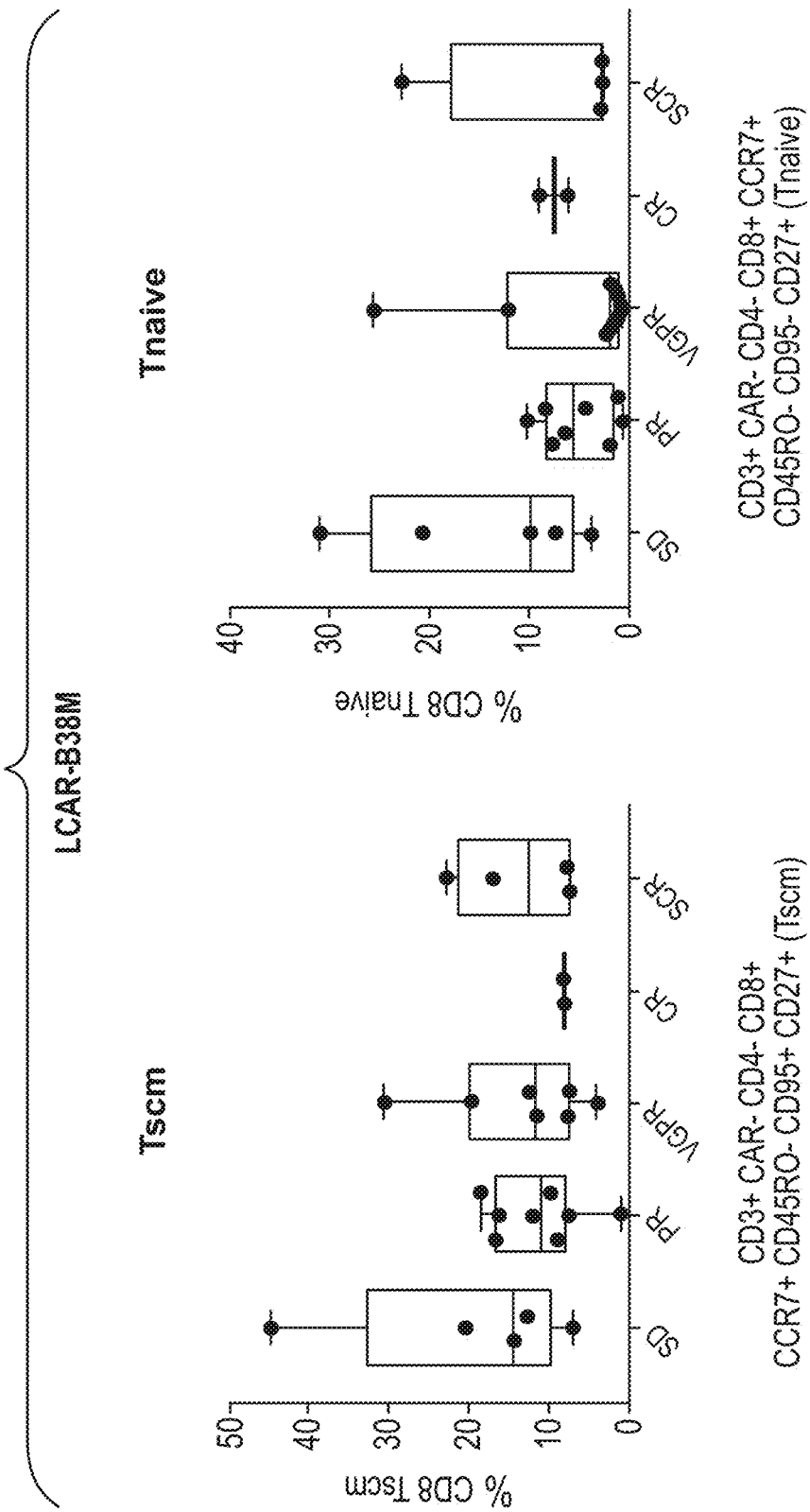

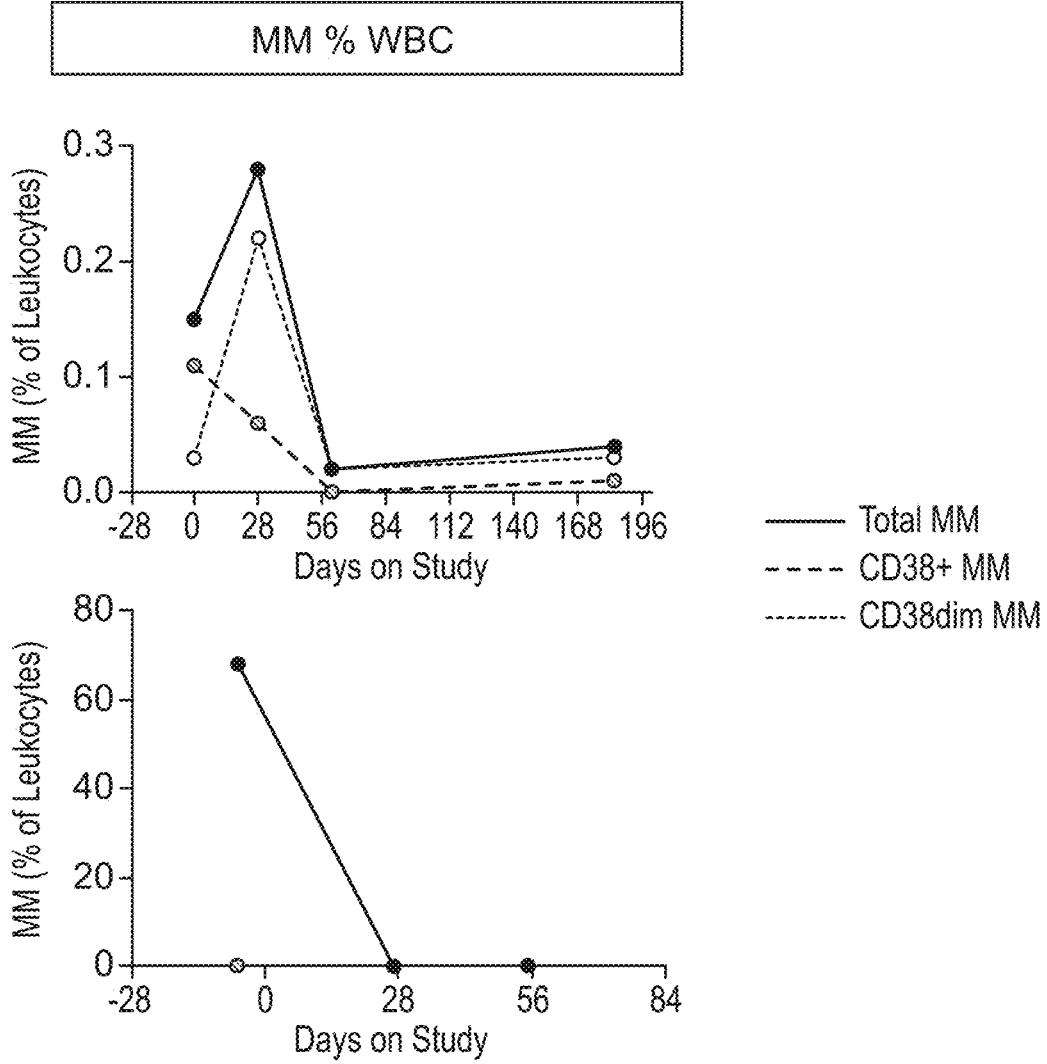

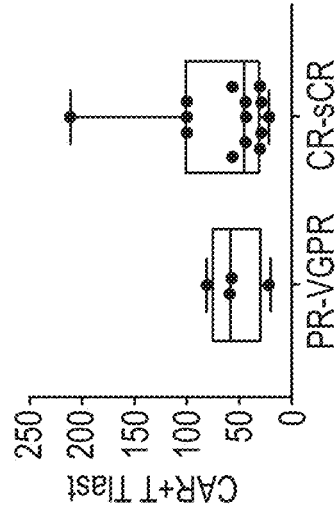
*FIG. 35*
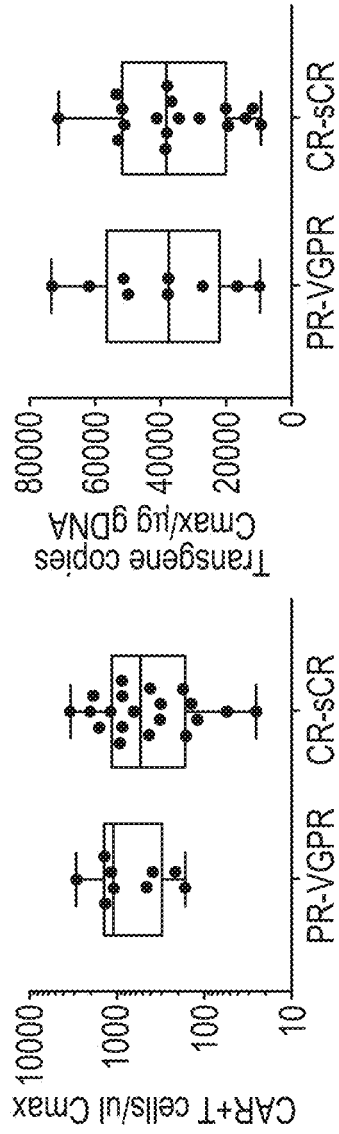

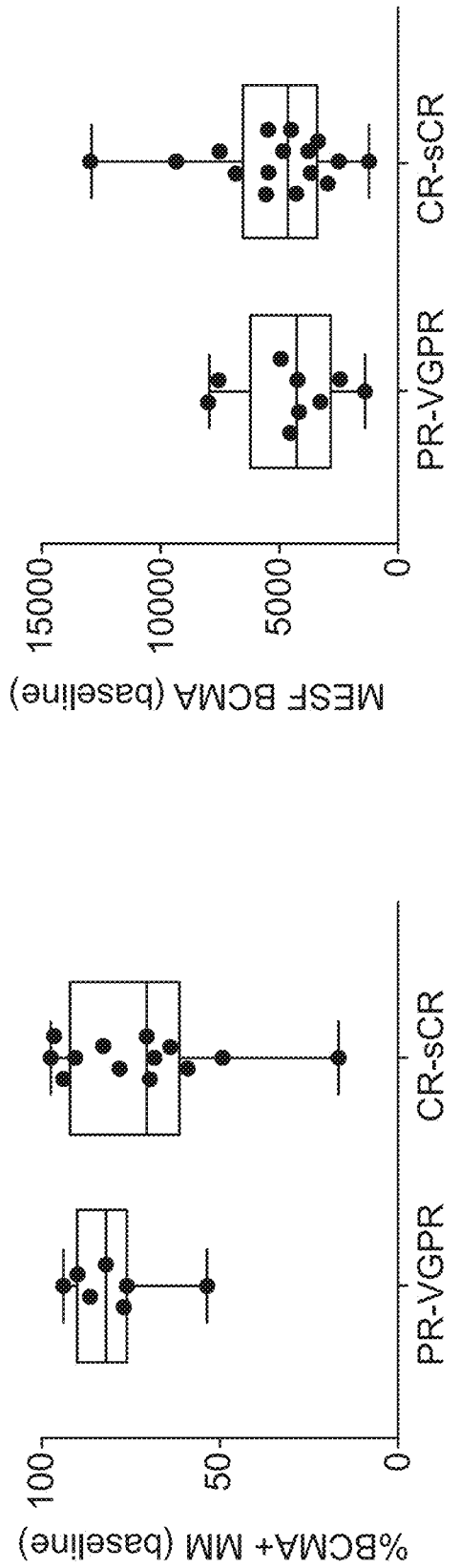

*FIG. 40*

Conclusions for LCAR-B38M

- Post-infusion expansion of LCAR-B38M CAR-T cells ($C_{max}$) is highly variable and consistently peaks ($T_{max}$) around day 10-14
- In 18/28 patients, the number of CAR+ T cells/µl are <LOQ (2 cells/µl) at 3 months of follow-up
- Best responses are independent of CD3 CAR-T peak expansion and persistence in the periphery at the time of data cut-off
- Best responses are independent of level of BCMA expression in MM cells
- LCAR-B38M is a differentiated CAR-t cell therapy that is highly active at a relatively low dose, potentially related to a preferential and consistent *in vivo* expansion of CAR+ CD8 T cells displaying a central memory phenotype.

SEQUENCE LISTING

<160> NUMBER OF SEQ ID NOS: 16

<210> SEQ ID NO 1
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1

Gln Val Lys Leu Glu Glu Ser Gly Gly Gly Leu Val Gln Ala Gly Arg
1               5                   10                  15

Ser Leu Arg Leu Ser Cys Ala Ala Ser Glu His Thr Phe Ser Ser His
            20                  25                  30

Val Met Gly Trp Phe Arg Gln Ala Pro Gly Lys Glu Arg Glu Ser Val
        35                  40                  45

Ala Val Ile Gly Trp Arg Asp Ile Ser Thr Ser Tyr Ala Asp Ser Val
    50                  55                  60

Lys Gly Arg Phe Thr Ile Ser Arg Asp Asn Ala Lys Lys Thr Leu Tyr
65                  70                  75                  80

Leu Gln Met Asn Ser Leu Lys Pro Glu Asp Thr Ala Val Tyr Tyr Cys
                85                  90                  95

Ala Ala Arg Arg Ile Asp Ala Ala Asp Phe Asp Ser Trp Gly Gln Gly
            100                 105                 110

Thr Gln Val Thr Val Ser Ser
        115

<210> SEQ ID NO 2
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 2

```
caggtcaaac tggaagaatc tggcggaggc ctggtgcagg caggacggag cctgcgcctg    60
agctgcgcag catccgagca caccttcagc tcccacgtga tgggctggtt tcggcaggcc   120
ccaggcaagg agagagagag cgtggccgtg atcggctgga gggacatctc cacatcttac   180
gccgattccg tgaagggccg gttcaccatc agccgggaca acgccaagaa gacactgtat   240
ctgcagatga acagcctgaa gcccgaggac accgccgtgt actattgcgc agcaaggaga   300
atcgacgcag cagactttga ttcctggggc caggcaccc aggtgacagt gtctagc       357
```

<210> SEQ ID NO 3
<211> LENGTH: 118
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 3

```
Glu Val Gln Leu Val Glu Ser Gly Gly Gly Leu Val Gln Ala Gly Gly
1               5                   10                  15

Ser Leu Arg Leu Ser Cys Ala Ala Ser Gly Arg Thr Phe Thr Met Gly
            20                  25                  30

Trp Phe Arg Gln Ala Pro Gly Lys Glu Arg Glu Phe Val Ala Ala Ile
        35                  40                  45

Ser Leu Ser Pro Thr Leu Ala Tyr Tyr Ala Glu Ser Val Lys Gly Arg
    50                  55                  60

Phe Thr Ile Ser Arg Asp Asn Ala Lys Asn Thr Val Val Leu Gln Met
65                  70                  75                  80

Asn Ser Leu Lys Pro Glu Asp Thr Ala Leu Tyr Tyr Cys Ala Ala Asp
                85                  90                  95

Arg Lys Ser Val Met Ser Ile Arg Pro Asp Tyr Trp Gly Gln Gly Thr
            100                 105                 110

Gln Val Thr Val Ser Ser
        115
```

<210> SEQ ID NO 4
<211> LENGTH: 354
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 4

```
gaggtgcagc tggtggagag cggaggcggc ctggtgcagg ccggaggctc tctgaggctg    60
agctgtgcag catccggaag aaccttcaca atgggctggt ttaggcaggc accaggaaag   120
gagagggagt tcgtggcagc aatcagcctg tcccctaccc tggcctacta tgccgagagc   180
gtgaagggca ggtttaccat ctcccgcgat aacgccaaga atacagtggt gctgcagatg   240
aactccctga aacctgagga cacagccctg tactattgtg ccgccgatcg gaagagcgtg   300
atgagcatta gccagacta ttgggggcag ggaacacagg tgaccgtgag cagc          354
```

<210> SEQ ID NO 5
<211> LENGTH: 5
<212> TYPE: PRT
<213> ORGANISM: Artificial Sequence
<220> FEATURE:

```
<223> OTHER INFORMATION: Description of Artificial Sequence: Synthetic
      peptide

<400> SEQUENCE: 5

Gly Gly Gly Gly Ser
1               5

<210> SEQ ID NO 6
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Met Ala Leu Pro Val Thr Ala Leu Leu Leu Pro Leu Ala Leu Leu Leu
1               5                   10                  15

His Ala Ala Arg Pro
            20

<210> SEQ ID NO 7
<211> LENGTH: 63
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
atggctctgc ccgtcaccgc tctgctgctg cctctggctc tgctgctgca cgctgctcgc    60
cct                                                                  63

<210> SEQ ID NO 8
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 9
<211> LENGTH: 72
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
atctacatct gggcgccctt ggccgggact tgtggggtcc ttctcctgtc actggttatc    60 acccttact gc                                                         72

<210> SEQ ID NO 10
<211> LENGTH: 112
<212> TYPE: PRT
<213> ORGANISM: Artificial Sequence
<220> FEATURE:
<223> OTHER INFORMATION: Description of Artificial Sequence: Synthetic
```

-continued polypeptide

<400> SEQUENCE: 10

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 11
<211> LENGTH: 339
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 11
agagtgaagt tcagcaggag cgcagacgcc cccgcgtacc agcagggcca gaaccagctc      60
tataacgagc tcaatctagg acgaagagag gagtacgatg ttttggacaa gagacgtggc     120
cgggaccctg agatggggggg aaagccgaga aggaagaacc ctcaggaagg cctgtacaat    180
gaactgcaga agataagat ggcggaggcc tacagtgaga ttgggatgaa aggcgagcgc      240
cggaggggca aggggcacga tggcctttac cagggtctca gtacagccac caaggacacc    300
tacgacgccc ttcacatgca ggccctgccc cctcgctaa                           339

<210> SEQ ID NO 12
<211> LENGTH: 42
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 12

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 13
<211> LENGTH: 126
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 13

```
aaacggggca gaaagaaact cctgtatata ttcaaacaac catttatgag accagtacaa    60
actactcaag aggaagatgg ctgtagctgc cgatttccag aagaagaaga aggaggatgt   120
gaactg                                                              126

<210> SEQ ID NO 14
<211> LENGTH: 135
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 14
accacgacgc cagcgccgcg accaccaaca ccggcgccca ccatcgcgtc gcagcccctg    60
tccctgcgcc cagaggcgtg ccggccagcg gcggggggcg cagtgcacac gaggggggctg  120 gacttcgcct gtgat                                                    135

<210> SEQ ID NO 15
<211> LENGTH: 45
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 16
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 16
ggaggaggag gatct                                                     15
```

BCMA-TARGETED CAR-T CELL THERAPY OF MULTIPLE MYELOMA

CROSS-REFERENCE TO RELATED APPLICATIONS

This application claims priority to U.S. Provisional Applications No. 62/931,065, filed Nov. 5, 2019, and 62/943,627, filed Dec. 4, 2019, both of which are incorporated herein by reference in their entirety.

SEQUENCE LISTING

The instant application contains a Sequence Listing which has been submitted electronically in ASCII format and is hereby incorporated by reference in its entirety. Said ASCII copy, created on Oct. 30, 2020, is named 253505_000092_SL.txt and is 9,164 bytes in size.

BACKGROUND

Multiple myeloma is a neoplasm of plasma cells that is aggressive. Multiple myeloma is considered to be a B-cell neoplasm that proliferates uncontrollably in the bone marrow. Symptoms include one or more of hypercalcemia, renal insufficiency, anemia, bony lesions, bacterial infections, hyperviscosity and amyloidosis. Multiple myeloma is still an incurable disease, despite new therapies that include proteasome inhibitors, immunomodulatory drugs, and monoclonal antibodies that have significantly improved patient outcomes. Because most patients will either relapse or become refractory to treatment, there is an ongoing need for new therapies for multiple myeloma.

SUMMARY OF THE DISCLOSURE

Provided herein are improved therapies for treating multiple myeloma.

In one aspect is provided a method of treating a subject who has a cancer, the method comprising administering to the subject at least one dose of cells comprising a chimeric antigen receptor (CAR) polypeptide comprising:
  a) an extracellular antigen binding domain comprising a first anti-BCMA binding moiety and a second BCMA binding moiety;
  b) a transmembrane domain; and
  c) an intracellular signaling domain.

In some embodiments, the cells are expanded in vitro prior to infusion. In some embodiments, the cells are T cells, NK cells, iPSC-NK cells. In some embodiments, the cells are CAR-T cells. In some embodiments, the cells are NKT cells, iPSC-T cells or gamma-delta T cells. In some embodiments, the cells are heterologous or autologous.

In some embodiments, the dose comprises $4.0\times10^5$ to $1.0\times10^6$ of the CAR-T cells per kilogram of the mass of the subject. In some embodiments, the dose comprises $4.0\times10^5$ to $1.0\times10^6$ of the viable CAR-T cells per kilogram of the mass of the subject. In some embodiments, the dose comprises $4.0\times10^5$ to $6.0\times10^5$ of the CAR-T cells per kilogram of the mass of the subject. In some embodiments, the dose comprises $5.0\times10^5$ to $7.0\times10^5$ of the CAR-T cells per kilogram of the mass of the subject. In some embodiments, the dose comprises $5.5\times10^5$ to $6.0\times10^5$ of the CAR-T cells per kilogram of the mass of the subject. In some embodiments, the dose comprises $6.0\times10^5$ to $8.0\times10^5$ of the CAR-T cells per kilogram of the mass of the subject. In some embodiments, the dose comprises $7.0\times10^5$ to $9.0\times10^5$ of the CAR-T cells per kilogram of the mass of the subject. In some embodiments, the dose comprises $8.0\times10^5$ to $1.0\times10^6$ of the CAR-T cells per kilogram of the mass of the subject. In some embodiments, the dose comprises about $5.0\times10^5$, about $6.0\times10^5$, about $7.0\times10^5$, about $8.0\times10^5$, about $9.0\times10^5$, or about $1.0\times10^6$ of the CAR-T cells per kilogram of the mass of the subject. In some embodiments, the dose comprises about $7.1\times10^5$, about $7.2\times10^5$, about $7.3\times10^5$, about $7.4\times10^5$, about $7.5\times10^6$, about $7.6\times10^6$, about $7.7\times10^6$, about $7.8\times10^6$, or about $7.9\times10^6$ of the CAR-T cells per kilogram of the mass of the subject. In one embodiment, the dose comprises about $7.5\times10^5$ of the CAR-T cells per kilogram of the mass of the subject.

In some embodiments, the dose comprises $1\times10^6$ to $1\times10^8$ of the CAR-T cells. In some embodiments, the dose comprises $1\times10^6$ to $5\times10^6$ of the CAR-T cells. In some embodiments, the dose comprises $4\times10^6$ to $1.5\times10^7$ of the CAR-T cells. In some embodiments, the dose comprises $1\times10^7$ to $2.5\times10^7$ of the CAR-T cells. In some embodiments, the dose comprises $2\times10^7$ to $4\times10^7$ of the CAR-T cells. In some embodiments, the dose comprises $3\times10^7$ to $5\times10^7$ of the CAR-T cells. In some embodiments, the dose comprises $4\times10^7$ to $6\times10^7$ of the CAR-T cells. In some embodiments, the dose comprises $5\times10^7$ to $7\times10^7$ of the CAR-T cells. In some embodiments, the dose comprises $6\times10^7$ to $8\times10^7$ of the CAR-T cells. In some embodiments, the dose comprises $7\times10^7$ to $9\times10^7$ of the CAR-T cells. In some embodiments, the dose comprises $8\times10^7$ to $1\times10^8$ of the CAR-T cells. In some embodiments, the dose comprises $2\times10^7$ to $8\times10^7$ of the CAR-T cells. In some embodiments, the dose comprises about $1\times10^7$, about $2\times10^7$, about $3\times10^7$, about $4\times10^7$, about $5\times10^7$, about $6\times10^7$, about $7\times10^7$, about $8\times10^7$, about $9\times10^7$ or about $1\times10^8$ of the CAR-T cells. In some embodiments, the dose comprises about $5.1\times10^7$, about $5.2\times10^7$, about $5.25\times10^7$, about $5.3\times10^7$, about $5.4\times10^7$, about $5.5\times10^7$, about $5.6\times10^7$, about $5.7\times10^7$, about $5.8\times10^7$, or about $5.9\times10^7$ of the CAR-T cells. In one embodiment, the dose comprises about $5.25\times10^7$ of the CAR-T cells.

In some embodiments, the cells are administered at a dose resulting in $4.0\times10^5$ to $1.0\times10^6$ of the CAR-T cells per kilogram of the mass of the subject. In some embodiments, the cells are administered at a dose resulting in $4.0\times10^5$ to $1.0\times10^6$ of the viable CAR-T cells per kilogram of the mass of the subject. In some embodiments, the cells are administered at a dose resulting in $4.0\times10^5$ to $6.0\times10^5$ of the CAR-T cells per kilogram of the mass of the subject. In some embodiments, the cells are administered at a dose resulting in $5.0\times10^5$ to $7.0\times10^5$ of the CAR-T cells per kilogram of the mass of the subject. In some embodiments, the cells are administered at a dose resulting in $5.5\times10^5$ to $6.0\times10^5$ of the CAR-T cells per kilogram of the mass of the subject. In some embodiments, the cells are administered at a dose resulting in $6.0\times10^5$ to $8.0\times10^5$ of the CAR-T cells per kilogram of the mass of the subject. In some embodiments, the cells are administered at a dose resulting in $7.0\times10^5$ to $9.0\times10^5$ of the CAR-T cells per kilogram of the mass of the subject. In some embodiments, the cells are administered at a dose resulting in $8.0\times10^5$ to $1.0\times10^6$ of the CAR-T cells per kilogram of the mass of the subject. In some embodiments, the cells are administered at a dose resulting in about $5.0\times10^5$, about $6.0\times10^5$, about $7.0\times10^5$, about $8.0\times10^5$, about $9.0\times10^5$, or about $1.0\times10^6$ of the CAR-T cells per kilogram of the mass of the subject. In some embodiments, the cells are administered at a dose resulting in about $7.1\times10^5$, about $7.2\times10^5$, about $7.3\times10^5$, about $7.4\times10^5$, about $7.5\times10^6$, about $7.6\times10^6$, about $7.7\times10^6$, about $7.8\times10^6$, or about $7.9\times10^6$ of the CAR-T cells per kilogram of the mass of the subject. In one embodiment, the cells are administered at a dose resulting in about $7.5 \times 10^5$ of the CAR-T cells per kilogram of the mass of the subject.

In some embodiments, the cells are administered at a dose resulting in $1 \times 10^6$ to $1 \times 10^8$ of the CAR-T cells in the subject. In some embodiments, the cells are administered at a dose resulting in $1 \times 10^6$ to $5 \times 10^6$ of the CAR-T cells in the subject. In some embodiments, the cells are administered at a dose resulting in $4 \times 10^6$ to $1.5 \times 10^7$ of the CAR-T cells in the subject. In some embodiments, the cells are administered at a dose resulting in $1 \times 10^7$ to $2.5 \times 10^7$ of the CAR-T cells in the subject. In some embodiments, the cells are administered at a dose resulting in $2 \times 10^7$ to $4 \times 10^7$ of the CAR-T cells in the subject. In some embodiments, the cells are administered at a dose resulting in $3 \times 10^7$ to $5 \times 10^7$ of the CAR-T cells in the subject. In some embodiments, the cells are administered at a dose resulting in $4 \times 10^7$ to $6 \times 10^7$ of the CAR-T cells in the subject. In some embodiments, the cells are administered at a dose resulting in $5 \times 10^7$ to $7 \times 10^7$ of the CAR-T cells in the subject. In some embodiments, the cells are administered at a dose resulting in $6 \times 10^7$ to $8 \times 10^7$ of the CAR-T cells in the subject. In some embodiments, the cells are administered at a dose resulting in $7 \times 10^7$ to $9 \times 10^7$ of the CAR-T cells in the subject. In some embodiments, the cells are administered at a dose resulting in $8 \times 10^7$ to $1 \times 10^8$ of the CAR-T cells in the subject. In some embodiments, the cells are administered at a dose resulting in $2 \times 10^7$ to $8 \times 10^7$ of the CAR-T cells in the subject. In some embodiments, the cells are administered at a dose resulting in about $1 \times 10^7$, about $2 \times 10^7$, about $3 \times 10^7$, about $4 \times 10^7$, about $5 \times 10^7$, about $6 \times 10^7$, about $7 \times 10^7$, about $8 \times 10^7$, about $9 \times 10^7$ or about $1 \times 10^8$ of the CAR-T cells in the subject. In some embodiments, the cells are administered at a dose resulting in about $5.1 \times 10^7$, about $5.2 \times 10^7$, about $5.25 \times 10^7$, about $5.3 \times 10^7$, about $5.4 \times 10^7$, about $5.5 \times 10^7$, about $5.6 \times 10^7$, about $5.7 \times 10^7$, about $5.8 \times 10^7$, or about $5.9 \times 10^7$ of the CAR-T cells in the subject. In one embodiment, the cells are administered at a dose resulting in about $5.25 \times 10^7$ of the CAR-T cells in the subject.

In some embodiments, the dose of the CAR-T cells is administered only once during the course of the treatment. In some embodiments, the dose of the CAR-T cells is administered intravenously. In various embodiments, the cancer is multiple myeloma. In certain embodiments, the multiple myeloma is refractory multiple myeloma or relapsed multiple myeloma.

In various embodiments, the ratio of CD4+ CAR-T cells to CD8+ CAR-T cells in the dose of the CAR-T cells is less than 4. In some embodiments, the ratio of CD4+ CAR-T cells to CD8+ CAR-T cells in the dose of the CAR-T cells is less than 2. In some embodiments, the ratio of CD4+ CAR-T cells to CD8+ CAR-T cells in the dose of the CAR-T cells is less than 1.8. In some embodiments, the ratio of CD4+ CAR-T cells to CD8+ CAR-T cells in the dose of the CAR-T cells is less than 1.7. In some embodiments, the ratio of CD4+ CAR-T cells to CD8+ CAR-T cells in the dose of the CAR-T cells is less than 1.6. In some embodiments, the ratio of CD4+ CAR-T cells to CD8+ CAR-T cells in the dose of the CAR-T cells is less than 1.4. In some embodiments, the ratio of CD4+ CAR-T cells to CD8+ CAR-T cells in the dose of the CAR-T cells is less than 1.2. In some embodiments, the ratio of CD4+ CAR-T cells to CD8+ CAR-T cells in the dose of the CAR-T cells is less than 1.0.

In some embodiments, effector memory CAR+ T cells comprise at least 20% of the total amount of CAR+ T cells in the dose of the CAR-T cells. In some embodiments, effector memory CAR+ T cells comprise at least 25% of the total amount of CAR+ T cells in the dose of the CAR-T cells. In some embodiments, effector memory CAR+ T cells comprise at least 30% of the total amount of CAR+ T cells in the dose of the CAR-T cells. In some embodiments, effector memory CAR+ T cells comprise at least 35% of the total amount of CAR+ T cells in the dose of the CAR-T cells. In some embodiments, effector memory CAR+ T cells comprise at least 40% of the total amount of CAR+ T cells in the dose of the CAR-T cells. In some embodiments, central memory CAR+ T cells comprise at least 3% of the total amount of CAR+ T cells in the dose of the CAR-T cells. In some embodiments, central memory CAR+ T cells comprise at least 5% of the total amount of CAR+ T cells in the dose of the CAR-T cells. In some embodiments, central memory CAR+ T cells comprise at least 6% of the total amount of CAR+ T cells in the dose of the CAR-T cells. In some embodiments, central memory CAR+ T cells comprise at least 10% of the total amount of CAR+ T cells in the dose of the CAR-T cells. In some embodiments, central memory CAR+ T cells comprise at least 15% of the total amount of CAR+ T cells in the dose of the CAR-T cells.

In various embodiments of the above methods, wherein the ratio of the CD4+ CAR-T cells at Cmax to the CD8+ CAR-T cells at Cmax is less than 3.5. In some embodiments, the ratio of the CD4+ CAR-T cells at Cmax to the CD8+ CAR-T cells at Cmax is less than 2.0. In some embodiments, the ratio of the CD4+ CAR-T cells at Cmax to the CD8+ CAR-T cells at Cmax is less than 1.2. In some embodiments, the ratio of the CD4+ CAR-T cells at Cmax to the CD8+ CAR-T cells at Cmax is less than 0.8. In some embodiments, the ratio of the CD4+ CAR-T cells at Cmax to the CD8+ CAR-T cells at Cmax is less than 0.6. In some embodiments, the ratio of the CD4+ CAR-T cells at Cmax to the CD8+ CAR-T cells at Cmax is less than 0.4. In some embodiments, the ratio of the CD4+ CAR-T cells at Cmax to the CD8+ CAR-T cells at Cmax is less than 0.3.

In various embodiments of the above, the method further comprises assaying the amount of CD4+ CAR-T cells and/or CD8+ CAR-T cells in the subject.

In various embodiments of the above methods, the central memory CAR+ T cells comprise at least 75% of the total amount of CAR+ T cells after the dose is administered. In some embodiments, the central memory CAR+ T cells comprise at least 80% of the total amount of CAR+ T cells after the dose is administered. In some embodiments, the central memory CAR+ T cells comprise at least 85% of the total amount of CAR+ T cells after the dose is administered. In some embodiments, the central memory CAR+ T cells comprise at least 90% of the total amount of CAR+ T cells after the dose is administered.

In various embodiments of the above methods, the method further comprises assaying for the ratio of central memory CAR+ T cells to the total amount of CAR+ T cells in the subject after the dose is administered.

In various embodiments of the above methods, the effector memory CAR+ T cells comprise at least 2% of the total amount of CAR+ T cells after the dose is administered. In some embodiments, the effector memory CAR+ T cells comprise at least 3% of the total amount of CAR+ T cells at after the dose is administered. In some embodiments, the central memory CAR+ T cells comprise at least 5% of the total amount of CAR+ T cells after the dose is administered. In some embodiments, the central memory CAR+ T cells comprise at least 8% of the total amount of CAR+ T cells after the dose is administered.

In various embodiments of the above methods, the method further comprises assaying for the ratio of effector memory CAR+ T cells to the total amount of CAR+ T cells in the subject after the dose is administered.

In various embodiments of the above methods, the central memory CAR+CD8+ T cells comprise at least 30% of the total amount of CAR+CD8+ T cells in the subject at Cmax after the dose is administered. In some embodiments, the central memory CAR+CD8+ T cells comprise at least 50% of the total amount of CAR+CD8+ T cells in the subject at Cmax after the dose is administered. In some embodiments, the central memory CAR+CD8+ T cells comprise at least 70% of the total amount of CAR+CD8+ T cells in the subject at Cmax after the dose is administered. In some embodiments, the central memory CAR+CD8+ T cells comprise at least 80% of the total amount of CAR+CD8+ T cells.

In some embodiments, the method further comprises the step of assaying for the ratio of central memory CAR+CD8+ T cells to the total amount of CAR+CD8+ T cells in the subject at Cmax after the dose is administered.

In some embodiments, the effector memory CAR+CD8+ T cells comprise at least 2% of the total amount of CAR+CD8+ T cells. In some embodiments, the effector memory CAR+CD8+ T cells comprise at least 5% of the total amount of CAR+CD8+ T cells. In some embodiments, the effector memory CAR+CD8+ T cells comprise at least 8% of the total amount of CAR+CD8+ T cells. In some embodiments, the effector memory CAR+CD8+ T cells comprise at least 10% of the total amount of CAR+CD8+ T cells.

In various embodiments of the above methods, the method further comprises the step of assaying for the ratio of effector memory CAR+CD8+ T cells to the total amount of CAR+CD8+ T cells in the subject at Cmax after the dose is administered.

In various embodiments of the above methods, the central memory CAR+CD4+ T cells comprise at least 5% of the total amount of CAR+CD4+ T cells in the subject at Cmax after the dose is administered. In some embodiments, the central memory CAR+CD4+ T cells comprise at least 8% of the total amount of CAR+CD4+ T cells in the subject at Cmax after the dose is administered. In some embodiments, the central memory CAR+CD4+ T cells comprise at least 10% of the total amount of CAR+CD4+ T cells in the subject at Cmax after the dose is administered. In some embodiments, the central memory CAR+CD4+ T cells comprise at least 15% of the total amount of CAR+CD4+ T cells in the subject at Cmax after the dose is administered.

In various embodiments of the above methods, the method further comprises the step of assaying for the ratio of central memory CAR+CD4+ T cells to total amount of CAR+CD4+ T cells in the subject at Cmax after the dose is administered.

In various embodiments of the above methods, the method further comprises the step of assaying for the ratio of effector memory CAR+CD4+ T cells to total amount of CAR+CD4+ T cells in the subject at Cmax after the dose is administered, wherein the effector memory CAR+CD4+ T cells comprise at least 70% of the total amount of CAR+CD4+ T cells. In some embodiments, the effector memory CAR+CD4+ T cells comprise at least 75% of the total amount of CAR+CD4+ T cells. In some embodiments, the effector memory CAR+CD4+ T cells comprise at least 80% of the total amount of CAR+CD4+ T cells. In some embodiments, the effector memory CAR+CD4+ T cells comprise at least 90% of the total amount of CAR+CD4+ T cells. In certain embodiments, the effector memory CAR+CD4+ T cells comprise 70-80%, 70-85%, 71-86%, 72-87%, 73-88%, 74-89%, 75-90%, 76-91%, 77-92%, 78-93%, 80-90%, 82-92%, 84-94%, 86-96%, 88-98%, or 90-100% of the total amount of CAR+CD8+ T cells.

In various embodiments of the above methods, the method further comprises the step of assaying for the ratio of effector memory CAR+CD4+ T cells to the total amount of CAR+CD4+ T cells in the subject at Cmax after the dose is administered.

In some embodiments, the first BCMA binding moiety and/or the second BCMA binding moiety is an anti-BCMA sdAb. In some embodiments, the first BCMA binding moiety is a first anti-BCMA sdAb and the second BCMA binding moiety is a second anti-BCMA sdAb. In certain embodiments, the first BCMA binding moiety comprises the amino acid sequence of QVKLEESGGGLVQAGRSLRLS-CAASEHTFSSHVMGWFRQAPGKERESVAVIGWRDI STSYADSVKGRFTISRDNAKKTLYLQMNSLKPED-TAVYYCAARRIDAADFDSWGQG TQVTVSS (SEQ ID NO: 1). In certain embodiments, the first BCMA binding moiety comprises a polypeptide encoded by the nucleic acid sequence of

```
                                            (SEQ ID NO: 2)
CAGGTCAAACTGGAAGAATCTGGCGGAGGCCTGGTGCAGGCAGGACGGAG

CCTGCGCCTGAGCTGCGCAGCATCCGAGCACACCTTCAGCTCCCACGTGA

TGGGCTGGTTTCGGCAGGCCCCAGGCAAGGAGAGAGAGAGCGTGGCCGTG

ATCGGCTGGAGGGACATCTCCACATCTTACGCCGATTCCGTGAAGGGCCG

GTTCACCATCAGCCGGGACAACGCCAAGAAGACACTGTATCTGCAGATGA

ACAGCCTGAAGCCCGAGGACACCGCCGTGTACTATTGCGCAGCAAGGAGA

ATCGACGCAGCAGACTTTGATTCCTGGGGCCAGGGCACCCAGGTGACAGT

GTCTAGC.
```

In certain embodiments, the second BCMA binding moiety comprises the amino acid sequence of EVQLVESGG-GLVQAGGSLRLSCAASGRTFTMGWFRQAPGK-EREFVAAISLSPTLAY YAESVKGRFTISRDNAKNTV-VLQMNSLKPEDTALYYCAADRKSVMSIRPDYWGQG TQVTVSS (SEQ ID NO: 3). In certain embodiments, the second BCMA binding moiety comprises a polypeptide encoded by the nucleic acid sequence of

```
                                            (SEQ ID NO: 4)
GAGGTGCAGCTGGTGGAGAGCGGAGGCGGCCTGGTGCAGGCCGGAGGCTC

TCTGAGGCTGAGCTGTGCAGCATCCGGAAGAACCTTCACAATGGGCTGGT

TTAGGCAGGCACCAGGAAAGGAGAGGGAGTTCGTGGCAGCAATCAGCCTG

TCCCCTACCCTGGCCTACTATGCCGAGAGCGTGAAGGGCAGGTTTACCAT

CTCCCGCGATAACGCCAAGAATACAGTGGTGCTGCAGATGAACTCCCTGA

AACCTGAGGACACAGCCCTGTACTATTGTGCCGCCGATCGGAAGAGCGTG

ATGAGCATTAGACCAGACTATTGGGGGCAGGGAACACAGGTGACCGTGAG

CAGC.
```

In some embodiments, the first BCMA binding moiety and the second BCMA binding moiety are connected to each other via a peptide linker. In certain embodiments, the peptide linker comprises the amino acid sequence of GGGGS (SEQ ID NO: 5).

In some embodiments, the CAR polypeptide further comprises a signal peptide located at the N-terminus of the polypeptide. In some embodiments, the signal peptide is derived from CD8α. In certain embodiments, the signal peptide comprises the amino acid sequence of MALPVTALLLPLALLLHAARP (SEQ ID NO: 6). In certain embodiments, signal peptide comprises a polypeptide encoded by the nucleic acid sequence of (SEQ ID NO: 7)
ATGGCTCTGCCCGTCACCGCTCTGCTGCTGCCTCTGGCTCTGCTGCTGCA

CGCTGCTCGCCCT.

In certain embodiments, the transmembrane domain comprises the amino acid sequence of IYIWAPLAGTCGVLLLSLVITLYC (SEQ ID NO: 8).

In certain embodiments, wherein the transmembrane domain comprises a polypeptide encoded by the nucleic acid sequence of (SEQ ID NO: 9)
ATCTACATCTGGGCGCCCTTGGCCGGGACTTGTGGGGTCCTTCTCCTGTC

ACTGGTTATCACCCTTTACTGC.

In some embodiments, the intracellular signaling domain comprises a primary intracellular signaling domain of an immune effector cell. In some embodiments, wherein the intracellular signaling domain is derived from CD3ζ. In some embodiments, the intracellular signaling domain comprises one or more co-stimulatory signaling domains. In certain embodiments, the intracellular signaling domain comprises the amino acid sequence of (SEQ ID NO: 10)
RVKFSRSADAPAYQQGQNQLYNELNLGRREEYDVLDKRRGRDPEMGGKPR

RKNPQEGLYNELQKDKMAEAYSEIGMKGERRRGKGHDGLYQGLSTATKDT

YDALHMQALPPR.

In certain embodiments, the intracellular signaling domain comprises a polypeptide encoded by the nucleic acid sequence of AGAGTGAAGTTCAGCAGGAGCGCAGACGCCCCGCGTACCAGCAGGGCCAGAA CCAGCTCTATAACGAGCTCAATCTAGGACGAAGAGAGGAGTACGATGTTTTGGA CAAGAGACGTGGCCGGGACCCTGAGATGGGGGGAAAGCCGAGAAGGAAGAACC CTCAGGAAGGCCTGTACAATGAACTGCAGAAAGATAAGATGGCGGAGGCCTACA GTGAGATTGGGATGAAAGGCGAGCGCCGGAGGGGCAAGGGGCACGATGGCCTT TACCAGGGTCTCAGTACAGCCACCAAGGACACCTACGACGCCCTTCACATGCAG GCCCTGCCCCCTCGCTAA (SEQ ID NO: 11). In certain embodiments, the intracellular signaling domain comprises the amino acid sequence of KRGRKKLLYIFKQPFMRPVQTTQEEDGCSCRFPEEEEGGCEL (SEQ ID NO: 12). In certain embodiments, the intracellular signaling domain comprises a polypeptide encoded by the nucleic acid sequence of (SEQ ID NO: 13)
AAACGGGGCAGAAAGAAACTCCTGTATATATTCAAACAACCATTTATGAG

ACCAGTACAAACTACTCAAGAGGAAGATGGCTGTAGCTGCCGATTTCCAG

AAGAAGAAGAAGGAGGATGTGAACTG.

In some embodiments, wherein the CAR polypeptide further comprises a hinge domain located between the C-terminus of the extracellular antigen binding domain and the N-terminus of the transmembrane domain. In certain embodiments, the hinge domain comprises the amino acid sequence of TTTPAPRPPTPAPTIASQPLSLRPEACRPAAGGAVHTRGLDFACD (SEQ ID NO: 15). In certain embodiments, the hinge domain comprises a polypeptide encoded by the nucleic acid sequence of (SEQ ID NO: 14)
ACCACGACGCCAGCGCCGCGACCACCAACACCGGCGCCCACCATCGCGTC

GCAGCCCCTGTCCCTGCGCCCAGAGGCGTGCCGGCCAGCGGCGGGGGCG

CAGTGCACACGAGGGGGCTGGACTTCGCCTGTGAT.

In various embodiments, the T cells are autologous T cells. In some embodiments, the T cells are allogeneic T cells. In some embodiments, the subject is human.

BRIEF DESCRIPTION OF THE DRAWINGS

FIG. 4 summarizes the clinical response in the MMY2001 study described in FIG. 3. The results from individual patients in the study are shown in the chart, with treatment intervals and events shown.

FIGS. 5A and 5B summarizes the preliminary minimal residual disease (MRD) status of the study patients at each of days 28, 56, 184 and 365. The bolded entries are negative MRD status, the boxed entries are positive MRD status, and "indet." indicates indeterminate MRD status. NGS refers to ClonoSeq next-generation sequencing, and F refers to flow cytometry analysis.

FIG. 12 shows graphs plotting the percentage CD3 at Cmax versus the tumor burden. The results show that tumor burden does not correlate with LCAR-B38M expansion (Cmax).

FIG. 14A is a graph showing the CD4:CD8 ratio at peak CAR T-cell expansion (Y-axis) versus CD4:CD8 ratio in the bb2121 final cell product (X-axis). The final bb2121 CAR+ T-cell product was composed of a variable proportion of CAR+CD4 and CD8 T cells, with a median of 85% (range, 42 to 98) CAR+CD4+ T cells and 13% (range, 2 to 47) CAR+CD8+ T cells. The CD4:CD8 ratio in the DP cells is 6.54. A correlation was observed between the CAR+CD4:CD8 T-cell ratio in the final product and that observed at peak expansion.

FIG. 16A is a graph showing in peripheral blood the CD4/CD8 ratio at CART Cmax versus CD4/CD8 ratio in DP CART+. FIG. 16B is a graph showing in bone marrow the CD4/CD8 ratio at CART Cmax versus CD4/CD8 ratio in DP CART+. FIG. 16C is a graph showing a correlation between CD4/CD8 ratio in peripheral blood versus that in bone marrow at day 28 (peak expansion).

FIG. 20C is a graph showing the percent of cells that are CD8+ CD450RO− CD27+ is predictive of clinical response. Patients with CR or PRTD had a higher percentage of CD8+CD450RO− CD27+ cells than those who had PR or NR. FIG. 20C is adapted from Fraietta et al., 2018 Nature Medicine 24, 563-71.

FIG. 20D illustrates graphs showing the correlation of percentage CD8 stem cell memory T cells (left panel) or naïve T cells (right panel) in each patient grouped by clinical response.

FIG. 21A depicts graphs showing the percent of cells that are multiple myeloma cells versus total leukocytes over the study period. The CD38+MM cells and the CD38dim MM cells are as indicated in the figure.

FIG. 35 illustrates that expansion and persistence is not associated with best response. Tlast=last study day where CAR-T cells levels are above LOQ.

FIG. 39 illustrates that responses are independent of the level of baseline BCMA expression. MESF=molecules of equivalent soluble fluorochrome.

FIG. 40 illustrates conclusions for LCAR-B38M from the study MMY2001.

DETAILED DESCRIPTION

Figure 1:
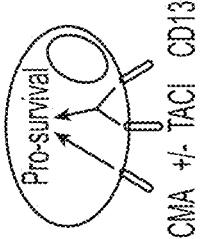
FIG. 1 shows the expression of BCMA antigen on the surface of germinal center (GC), memory and plasmablast cells in the lymph node, long-lived plasma cells in the bone marrow LN and MALT, and on multiple myeloma cells. BAFF-R antigen is not expressed on plasmablast cells, long-lived plasma cells, or multiple myeloma cells. TACI is expressed on memory and plasmablast cells, long-lived plasma cells, and multiple myeloma cells. CD138 is expressed only on long-lived plasma cells and multiple myeloma cells.

A description of example embodiments follows.

The disclosure also provides related nucleic acids, recombinant expression vectors, host cells, populations of cells, antibodies, or antigen binding portions thereof, and pharmaceutical compositions relating to the immune cells and CAR-expressing T cells of the invention. Dosage regimens, dosage forms, and methods of characterizing the phenotype of the CAR-T cells is also provided.

Several aspects of the invention are described below, with reference to examples for illustrative purposes only. It should be understood that numerous specific details, relationships, and methods are set forth to provide a full understanding of the invention. One having ordinary skill in the relevant art, however, will readily recognize that the invention can be practiced without one or more of the specific details or practiced with other methods, protocols, reagents, cell lines and animals. The present invention is not limited by the illustrated ordering of acts or events, as some acts may occur in different orders and/or concurrently with other acts or events. Furthermore, not all illustrated acts, steps or events are required to implement a methodology in accordance with the present invention. Many of the techniques and procedures described, or referenced herein, are well understood and commonly employed using conventional methodology by those skilled in the art.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. It will be further understood that terms, such as those defined in commonly-used dictionaries, should be interpreted as having a meaning that is consistent with their meaning in the context of the relevant art and/or as otherwise defined herein.

Definitions

The term "about" or "approximately" includes being within a statistically meaningful range of a value. Such a range can be within an order of magnitude, preferably within 50%, more preferably within 20%, still more preferably within 10%, and even more preferably within 5% of a given value or range. The allowable variation encompassed by the term "about" or "approximately" depends on the particular system under study, and can be readily appreciated by one of ordinary skill in the art.

The term "antibody" includes monoclonal antibodies (including full length 4-chain antibodies or full length heavy-chain only antibodies which have an immunoglobulin Fc region), antibody compositions with polyepitopic specificity, multispecific antibodies (e.g., bispecific antibodies, diabodies, and single-chain molecules), as well as antibody fragments (e.g., Fab, F(ab')2, and Fv). The term "immunoglobulin" (Ig) is used interchangeably with "antibody" herein. Antibodies contemplated herein include single-domain antibodies, such as heavy chain only antibodies.

The term "heavy chain-only antibody" or "HCAb" refers to a functional antibody, which comprises heavy chains, but lacks the light chains usually found in 4-chain antibodies. Camelid animals (such as camels, llamas, or alpacas) are known to produce HCAbs.

The term "single-domain antibody" or "sdAb" refers to a single antigen-binding polypeptide having three complementary determining regions (CDRs). The sdAb alone is capable of binding to the antigen without pairing with a corresponding CDR-containing polypeptide. In some cases, single-domain antibodies are engineered from camelid HCAbs, and their heavy chain variable domains are referred herein as "VHHs". Some VHHs may also be known as Nanobodies. Camelid sdAb is one of the smallest known antigen-binding antibody fragments (see, e.g., Hamers-Casterman et al., Nature 363:446-8 (1993); Greenberg et al., Nature 374:168-73 (1995); Hassanzadeh-Ghassabeh et al., Nanomedicine (Lond), 8:1013-26 (2013)). A basic VHH has the following structure from the N-terminus to the C-terminus: FR1-CDR1-FR2-CDR2-FR3-CDR3-FR4, in which FR1 to FR4 refer to framework regions 1 to 4, respectively, and in which CDR1 to CDR3 refer to the complementarity determining regions 1 to 3.

The "variable region" or "variable domain" of an antibody refers to the amino-terminal domains of the heavy or light chain of the antibody. The variable domains of the heavy chain and light chain may be referred to as "VH" and "VL", respectively. These domains are generally the most variable parts of the antibody (relative to other antibodies of the same class) and contain the antigen binding sites. Heavy-chain only antibodies from the Camelid species have a single heavy chain variable region, which is referred to as "VHH". VHH is thus a special type of VH.

The term "variable" refers to the fact that certain segments of the variable domains differ extensively in sequence among antibodies. The V domain mediates antigen binding and defines the specificity of a particular antibody for its particular antigen. However, the variability is not evenly distributed across the entire span of the variable domains. Instead, it is concentrated in three segments called hypervariable regions (HVRs) both in the light-chain and the heavy chain variable domains. The more highly conserved portions of variable domains are called the framework regions (FR). The variable domains of native heavy and light chains each comprise four FR regions, largely adopting a beta-sheet configuration, connected by three HVRs, which form loops connecting, and in some cases forming part of, the beta-sheet structure. The HVRs in each chain are held together in close proximity by the FR regions and, with the HVRs from the other chain, contribute to the formation of the antigen binding site of antibodies (see Kabat et al., Sequences of Immunological Interest, Fifth Edition, National Institute of Health, Bethesda, Md. (1991)). The constant domains are not involved directly in the binding of antibody to an antigen, but exhibit various effector functions, such as participation of the antibody in antibody-dependent cellular toxicity.

The terms "fragment of an antibody", "antibody fragment", "functional fragment of an antibody", and "antigen-binding portion" are used interchangeably herein to mean one or more fragments or portions of an antibody that retain the ability to specifically bind to an antigen (see, generally, Holliger et al., Nat. Biotech., 23(9): 1 126-1129 (2005)). The antigen recognition moiety of the CAR encoded by the inventive nucleic acid sequence can contain any BCMA-binding antibody fragment. The antibody fragment desirably comprises, for example, one or more CDRs, the variable region (or portions thereof), the constant region (or portions thereof), or combinations thereof. Examples of antibody fragments include, but are not limited to, (i) a Fab fragment, which is a monovalent fragment consisting of the VL, VH, CL, and CHI domains; (ii) a F(ab')2 fragment, which is a bivalent fragment comprising two Fab fragments linked by a disulfide bridge at the hinge region; (iii) a Fv fragment consisting of the VL and VH domains of a single arm of an antibody; (iv) a single chain Fv (scFv), which is a monovalent molecule consisting of the two domains of the Fv fragment (i.e., VL and VH) joined by a synthetic linker which enables the two domains to be synthesized as a single polypeptide chain (see, e.g., Bird et al., Science, 242: 423-426 (1988); Huston et al., Proc. Natl. Acad. Sci. USA, 85: 5879-5883 (1988); and Osbourn et al., Nat. Biotechnol, 16: 778 (1998)) and (v) a diabody, which is a dimer of polypeptide chains, wherein each polypeptide chain comprises a VH connected to a VL by a peptide linker that is too short to allow pairing between the VH and VL on the same polypeptide chain, thereby driving the pairing between the complementary domains on different VH-VL polypeptide chains to generate a dimeric molecule having two functional antigen binding sites. Antibody fragments are known in the art and are described in more detail in, e.g., U.S. Patent Application Publication 2009/0093024 A1.

The term "Cmax" is used herein to refer to the maximum concentration of the effector CAR-T cells in the blood after the drug has been administered and prior to the administration of a second dose. Reference to "at Cmax" in a subject refers to the day on which the maximum concentration of the effector CAR-T cells in the blood is achieved in the subject.

As used herein, the terms "specifically binds", "specifically recognizes", or "specific for" refer to measurable and reproducible interactions such as binding between a target and an antigen binding protein (such as a CAR or an sdAb), which is determinative of the presence of the target in the presence of a heterogeneous population of molecules including biological molecules.

The term "specificity" refers to selective recognition of an antigen binding protein (such as a CAR or an sdAb) for a particular epitope of an antigen. Natural antibodies, for example, are monospecific. The term "multispecific" denotes that an antigen binding protein (such as a CAR or an sdAb) has two or more antigen-binding sites of which at least two bind different antigens. "Bispecific" as used herein denotes that an antigen binding protein (such as a CAR or an sdAb) has two different antigen-binding specificities.

A chimeric antigen receptor (CAR) is an artificially constructed hybrid protein or polypeptide containing the antigen binding domains of an antibody (scFv) linked to T-cell signaling domains. Characteristics of CARs can include their ability to redirect T-cell specificity and reactivity toward a selected target in a non-MHC-restricted manner, exploiting the antigen-binding properties of monoclonal antibodies. The non-MHC-restricted antigen recognition gives T cells expressing CARs the ability to recognize antigens independent of antigen processing, thus bypassing a major mechanism of tumor evasion. Moreover, when expressed in T-cells, CARs advantageously do not dimerize with endogenous T cell receptor (TCR) alpha and beta chains. T cells expressing a CAR are referred to herein as CAR T cells, CAR-T cells or CAR modified T cells, and these terms are used interchangeably herein. The cell can be genetically modified to stably express an antibody binding domain on its surface, conferring novel antigen specificity that is MHC independent. "BCMA CAR" refers to a CAR having an extracellular binding domain specific for BCMA. "Bi-epitope CAR" refers to a CAR having an extracellular binding domain specific for two different epitopes an BCMA.

"LCAR-B38M" is a chimeric antigen receptor T cell (CAR-T) therapy containing two B-cell maturation antigen (BCMA)-targeting single-domain antibodies designed to confer avidity. LCAR-B38M can comprise T lymphocytes transduced with LCAR-B38M CAR, a CAR encoded by a lentiviral vector. The CAR targets the human B cell maturation antigen (anti-BCMA CAR). A diagram of the lentiviral vector encoding LCAR-B38M CAR is provided in FIG. 2A.

The terms "express" and "expression" mean allowing or causing the information in a gene or DNA sequence to become produced, for example producing a protein by activating the cellular functions involved in transcription and translation of a corresponding gene or DNA sequence. A DNA sequence is expressed in or by a cell to form an "expression product" such as a protein. The expression product itself, e.g., the resulting protein, may also be said to be "expressed" by the cell. An expression product can be characterized as intracellular, extracellular or transmembrane.

The terms "treat" or "treatment" refer to therapeutic treatment wherein the object is to slow down (lessen) an undesired physiological change or disease, or provide a beneficial or desired clinical outcome during treatment. Beneficial or desired clinical outcomes include alleviation of symptoms, diminishment of extent of disease, stabilized (i.e., not worsening) state of disease, delay or slowing of disease progression, amelioration or palliation of the disease state, and/or remission (whether partial or total), whether detectable or undetectable. "Treatment" can also mean prolonging survival as compared to expected survival if a subject was not receiving treatment. Those in need of treatment include those subjects already with the undesired physiological change or disease as well as those subjects prone to have the physiological change or disease.

As used herein, the term "subject" refers to an animal. The terms "subject" and "patient" may be used interchangeably herein in reference to a subject. As such, a "subject" includes a human that is being treated for a disease, or prevention of a disease, as a patient. The methods described herein may be used to treat an animal subject belonging to any classification. Examples of such animals include mammals. Mammals, include, but are not limited to, mammals of the order Rodentia, such as mice and hamsters, and mammals of the order Lagomorpha, such as rabbits. The mammals may be from the order Carnivora, including felines (cats) and canines (dogs). The mammals may be from the order Artiodactyla, including bovines (cows) and swines (pigs) or of the order Perissodactyla, including equines (horses). The mammals may be of the order Primates, Ceboids, or Simoids (monkeys) or of the order Anthropoids (humans and apes). In one embodiment, the mammal is a human.

The term "effective" applied to dose or amount refers to that quantity of a compound or pharmaceutical composition that is sufficient to result in a desired activity upon administration to a subject in need thereof. Note that when a combination of active ingredients is administered, the effective amount of the combination may or may not include amounts of each ingredient that would have been effective if administered individually. The exact amount required will vary from subject to subject, depending on the species, age, and general condition of the subject, the severity of the condition being treated, the particular drug or drugs employed, the mode of administration, and the like.

The phrase "pharmaceutically acceptable", as used in connection with compositions described herein, refers to molecular entities and other ingredients of such compositions that are physiologically tolerable and do not typically produce untoward reactions when administered to a mammal (e.g., a human). Preferably, the term "pharmaceutically acceptable" means approved by a regulatory agency of the Federal or a state government or listed in the U.S. Pharmacopeia or other generally recognized pharmacopeia for use in mammals, and more particularly in humans.

The terminology used herein is for the purpose of describing particular embodiments only and is not intended to be limiting. As used herein, the indefinite articles "a", "an" and "the" should be understood to include plural reference unless the context clearly indicates otherwise.

Throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. As another example, a range such as 95-99% identity, includes something with 95%, 96%, 97%, 98% or 99% identity, and includes subranges such as 96-99%, 96-98%, 96-97%, 97-99% 97-98% and 98-99% identity. This applies regardless of the breadth of the range.

Vectors

Polynucleotide sequences encoding the CARs described in the present application can be obtained using standard recombinant techniques. Desired polynucleotide sequences may be isolated and sequenced from antibody producing cells such as hybridoma cells. Alternatively, polynucleotides can be synthesized using nucleotide synthesizer or PCR techniques. A large number of promoters recognized by a variety of potential host cells are well known. The selected promoter can be operably linked to cistron DNA encoding the light or heavy chain by removing the promoter from the source DNA via restriction enzyme digestion and inserting the isolated promoter sequence into the vector of the present application.

The disclosure also provides a vector comprising the nucleic acid sequence encoding the inventive CAR. The vector can be, for example, a plasmid, a cosmid, a viral vector (e.g., retroviral or adenoviral), or a phage. Suitable vectors and methods of vector preparation are well known in the art (see, e.g., Sambrook et al. (2001) Molecular Cloning: A Laboratory Manual. 3rd ed. Cold Spring Harbor Laboratory Press: Cold Spring Harbor, New York; Ausubel et al. eds. (2005) Current Protocols in Molecular Biology. John Wiley and Sons, Inc.: Hoboken, New Jersey).

In addition to the inventive nucleic acid sequence encoding the CAR, the vector preferably comprises expression control sequences, such as promoters, enhancers, polyadenylation signals, transcription terminators, internal ribosome entry sites (IRES), and the like, that provide for the expression of the nucleic acid sequence in a host cell. Exemplary expression control sequences are known in the art and described in, for example, Goeddel, Gene Expression Technology: Methods in Enzymology, Vol. 185, Academic Press, San Diego, Calif. (1990).

A large number of promoters, including constitutive, inducible, and repressible promoters, from a variety of different sources are well known in the art. Representative sources of promoters include for example, virus, mammal, insect, plant, yeast, and bacteria, and suitable promoters from these sources are readily available, or can be made synthetically, based on sequences publicly available, for example, from depositories such as the ATCC as well as other commercial or individual sources. Promoters can be unidirectional (i.e., initiate transcription in one direction) or bi-directional (i.e., initiate transcription in either a 3' or 5' direction). Non-limiting examples of promoters include, for example, the T7 bacterial expression system, pBAD (araA) bacterial expression system, the cytomegalovirus (CMV) promoter, the SV40 promoter, and the RSV promoter. Inducible promoters include, for example, the Tet system (U.S. Pat. Nos. 5,464,758 and 5,814,618), the Ecdysone inducible system (No et al., Proc. Natl. Acad. Sci., 93: 3346-3351 (1996)), the T-REX™ system (Invitrogen, Carlsbad, CA), LACSWITCH™ System (Stratagene, San Diego, CA), and the Cre-ERT tamoxifen inducible recombinase system (Indra et al., Nuc. Acid. Res., 27: 4324-4327 (1999); Nuc. Acid. Res., 28: e99 (2000); U.S. Pat. No. 7,112,715; and Kramer & Fussenegger, Methods Mol. Biol, 308: 123-144 (2005)).

The term "enhancer" as used herein, refers to a DNA sequence that increases transcription of, for example, a nucleic acid sequence to which it is operably linked.

Enhancers can be located many kilobases away from the coding region of the nucleic acid sequence and can mediate the binding of regulatory factors, patterns of DNA methylation, or changes in DNA structure. A large number of enhancers from a variety of different sources are well known in the art and are available as or within cloned polynucleotides (from, e.g., depositories such as the ATCC as well as other commercial or individual sources). A number of polynucleotides comprising promoters (such as the commonly-used CMV promoter) also comprise enhancer sequences. Enhancers can be located upstream, within, or downstream of coding sequences. The term "Ig enhancers" refers to enhancer elements derived from enhancer regions mapped within the immunoglobulin (Ig) locus (such enhancers include for example, the heavy chain (mu) 5' enhancers, light chain (kappa) 5' enhancers, kappa and mu intronic enhancers, and 3' enhancers (see generally Paul W. E. (ed), Fundamental Immunology, 3rd Edition, Raven Press, New York (1993), pages 353-363; and U.S. Pat. No. 5,885,827).

The vector also can comprise a "selectable marker gene." The term "selectable marker gene", as used herein, refers to a nucleic acid sequence that allows cells expressing the nucleic acid sequence to be specifically selected for or against, in the presence of a corresponding selective agent. Suitable selectable marker genes are known in the art and described in, e.g., International Patent Application Publications WO 1992/08796 and WO 1994/28143; Wigler et al., Proc. Natl. Acad. Sci. USA, 77: 3567 (1980); O'Hare et al., Proc. Natl. Acad. Sci. USA, 78: 1527 (1981); Mulligan & Berg, Proc. Natl. Acad. Sci. USA, 78: 2072 (1981); Colberre-Garapin et al., J. Mol. Biol., 150: 1 (1981); Santerre et al., Gene, 30: 147 (1984); Kent et al., Science, 237: 901-903 (1987); Wigler et al., Cell, IP. 223 (1977); Szybalska & Szybalski, Proc. Natl. Acad. Sci. USA, 48: 2026 (1962); Lowy et al., Cell, 22: 817 (1980); and U.S. Pat. Nos. 5,122,464 and 5,770,359.

In some embodiments, the vector is an "episomal expression vector" or "episome", which is able to replicate in a host cell, and persists as an extrachromosomal segment of DNA within the host cell in the presence of appropriate selective pressure (see, e.g., Conese et al., Gene Therapy, 11: 1735-1742 (2004)). Representative commercially available episomal expression vectors include, but are not limited to, episomal plasmids that utilize Epstein Barr Nuclear Antigen 1 (EBNA1) and the Epstein Barr Virus (EBV) origin of replication (oriP). The vectors pREP4, pCEP4, pREP7, and pcDNA3.1 from Invitrogen (Carlsbad, CA) and pB-CMV from Stratagene (La Jolla, CA) represent non-limiting examples of an episomal vector that uses T-antigen and the SV40 origin of replication in lieu of EBNA1 and oriP.

Other suitable vectors include integrating expression vectors, which may randomly integrate into the host cell's DNA, or may include a recombination site to enable the specific recombination between the expression vector and the host cell's chromosome. Such integrating expression vectors may utilize the endogenous expression control sequences of the host cell's chromosomes to effect expression of the desired protein. Examples of vectors that integrate in a site specific manner include, for example, components of the flp-in system from Invitrogen (Carlsbad, CA) (e.g., pcDNA™5/FRT), or the cre-lox system, such as can be found in the pExchange-6 Core Vectors from Stratagene (La Jolla, CA). Examples of vectors that randomly integrate into host cell chromosomes include, for example, pcDNA3.1 (when introduced in the absence of T-antigen) from Invitrogen (Carlsbad, CA), and pCI or pFNI OA (ACT) FLEXI™ from Promega (Madison, WI).

Viral vectors also can be used. Representative viral expression vectors include, but are not limited to, the adenovirus-based vectors (e.g., the adenovirus-based Per.C6 system available from Crucell, Inc. (Leiden, The Netherlands)), lentivirus-based vectors (e.g., the lentiviral-based pLP1 from Life Technologies (Carlsbad, CA)), and retroviral vectors (e.g., the pFB-ERV plus pCFB-EGSH from Stratagene (La Jolla, CA)). In a preferred embodiment, the viral vector is a lentivirus vector.

The vector comprising the inventive nucleic acid encoding the CAR can be introduced into a host cell that is capable of expressing the CAR encoded thereby, including any suitable prokaryotic or eukaryotic cell. Preferred host cells are those that can be easily and reliably grown, have reasonably fast growth rates, have well characterized expression systems, and can be transformed or transfected easily and efficiently.

As used herein, the term "host cell" refers to any type of cell that can contain the expression vector. The host cell can be a eukaryotic cell, e.g., plant, animal, fungi, or algae, or can be a prokaryotic cell, e.g., bacteria or protozoa. The host cell can be a cultured cell or a primary cell, i.e., isolated directly from an organism, e.g., a human. The host cell can be an adherent cell or a suspended cell, i.e., a cell that grows in suspension. Suitable host cells are known in the art and include, for instance, DH5α E. coli cells, Chinese hamster ovarian cells, monkey VERO cells, COS cells, HE 293 cells, and the like. For purposes of amplifying or replicating the recombinant expression vector, the host cell may be a prokaryotic cell, e.g., a DH5α cell. For purposes of producing a recombinant CAR, the host cell can be a mammalian cell. The host cell preferably is a human cell. The host cell can be of any cell type, can originate from any type of tissue, and can be of any developmental stage. In one embodiment, the host cell can be a peripheral blood lymphocyte (PBL), a peripheral blood mononuclear cell (PBMC), or a natural killer (NK). Preferably, the host cell is a natural killer (NK) cell. More preferably, the host cell is a T-cell. Methods for selecting suitable mammalian host cells and methods for transformation, culture, amplification, screening, and purification of cells are known in the art.

The disclosure provides an isolated host cell which expresses the inventive nucleic acid sequence encoding the CAR described herein. In one embodiment, the host cell is a T-cell. The T-cell of the invention can be any T-cell, such as a cultured T-cell, e.g., a primary T-cell, or a T-cell from a cultured T-cell line, or a T-cell obtained from a mammal. If obtained from a mammal, the T-cell can be obtained from numerous sources, including but not limited to blood, bone marrow, lymph node, the thymus, or other tissues or fluids. T-cells can also be enriched for or purified. The T-cell preferably is a human T-cell (e.g., isolated from a human). The T-cell can be of any developmental stage, including but not limited to, a CD4+/CD8+ double positive T-cell, a CD4+ helper T-cell, e.g., Th, and Th2 cells, a CD8+T− cell (e.g., a cytotoxic T-cell), a tumor infiltrating cell, a memory T-cell, a naive T-cell, and the like. In one embodiment, the T-cell is a CD8+ T-cell or a CD4+ T-cell. T-cell lines are available from, e.g., the American Type Culture Collection (ATCC, Manassas, VA), and the German Collection of Microorganisms and Cell Cultures (DSMZ) and include, for example, Jurkat cells (ATCC TIB-152), Sup-T1 cells (ATCC CRL-1942), RPMI 8402 cells (DSMZ ACC-290), Karpas 45 cells (DSMZ ACC-545), and derivatives thereof. In another embodiment, the host cell is a natural killer (NK) cell. NK cells are a type of cytotoxic lymphocyte that plays a role in the innate immune system. NK cells are defined as large granular lymphocytes and constitute the third kind of cells differentiated from the common lymphoid progenitor which also gives rise to B and T lymphocytes (see, e.g., Immunobiology, 5th ed., Janeway et al., eds., Garland Publishing, New York, NY. (2001)). NK cells differentiate and mature in the bone marrow, lymph node, spleen, tonsils, and thymus. Following maturation, NK cells enter into the circulation as large lymphocytes with distinctive cytotoxic granules. NK cells are able to recognize and kill some abnormal cells, such as, for example, some tumor cells and virus-infected cells, and are thought to be important in the innate immune defense against intracellular pathogens. As described above with respect to T-cells, the NK cell can be any NK cell, such as a cultured NK cell, e.g., a primary NK cell, or an NK cell from a cultured NK cell line, or an NK cell obtained from a mammal. If obtained from a mammal, the NK cell can be obtained from numerous sources, including but not limited to blood, bone marrow, lymph node, the thymus, or other tissues or fluids. NK cells can also be enriched for or purified. The NK cell preferably is a human NK cell (e.g., isolated from a human). NK cell lines are available from, e.g., the American Type Culture Collection (ATCC, Manassas, VA) and include, for example, NK-92 cells (ATCC CRL-2407), NK92MI cells (ATCC CRL-2408), and derivatives thereof.

The inventive nucleic acid sequence encoding a CAR may be introduced into a cell by "transfection", "transformation", or "transduction". "Transfection", "transformation", or transduction", as used herein, refer to the introduction of one or more exogenous polynucleotides into a host cell by using physical or chemical methods. Many transfection techniques are known in the art and include, for example, calcium phosphate DNA co-precipitation (see, e.g., Murray E. J. (ed.), Methods in Molecular Biology, Vol. 7, Gene Transfer and Expression Protocols, Humana Press (1991)); DEAE-dextran; electroporation; cationic liposome-mediated transfection; tungsten particle-facilitated microparticle bombardment (Johnston, Nature, 346: 776-777 (1990)); and strontium phosphate DNA co-precipitation (Brash et al., Mol. Cell Biol., 7: 2031-2034 (1987)). Phage or viral vectors can be introduced into host cells, after growth of infectious particles in suitable packaging cells, many of which are commercially available.

Chimeric Antigen Receptors

International Patent Publication No. WO 2018/028647 is incorporated by reference herein in its entirety. US Patent Publication No. 2018/0230225 is incorporated by reference herein in its entirety.

The disclosure provides for methods of treating a subject with cells expressing a chimeric antigen receptor (CAR). The CAR comprises an extracellular antigen binding domain comprising one or more single-domain antibodies (such as VHHs). In various embodiments, there is provided a CAR targeting BCMA (also referred herein as "BCMA CAR") comprising a polypeptide comprising: (a) an extracellular antigen binding domain comprising an anti-BCMA sdAb; (b) a transmembrane domain; and (c) an intracellular signaling domain. In some embodiments, the anti-BCMA sdAb is camelid, chimeric, human, or humanized. In some embodiments, the intracellular signaling domain comprises a primary intracellular signaling domain of an immune effector cell (such as T cell). In some embodiments, the primary intracellular signaling domain is derived from CD4. In some embodiments, the intracellular signaling domain comprises a co-stimulatory signaling domain. In some embodiments, the co-stimulatory signaling domain is derived from a co-stimulatory molecule selected from the group consisting of CD27, CD28, CD137, OX40, CD30, CD40, CD3, LFA-1, ICOS, CD2, CD7, LIGHT, NKG2C, B7-H3, ligands of CD83 and combinations thereof. In certain embodiments, the transmembrane domain is derived from CD137.

In some embodiments, the BCMA CAR further comprises a hinge domain (such as a CD8a hinge domain) located between the C-terminus of the extracellular antigen binding domain and the N-terminus of the transmembrane domain. In some embodiments, the BCMA CAR further comprises a signal peptide (such as a CD8α (signal peptide) located at the N-terminus of the polypeptide. In some embodiments, the polypeptide comprises from the N-terminus to the C-terminus: a CD8α signal peptide, the extracellular antigen-binding domain, a CD8α hinge domain, a CD28 transmembrane domain, a first co-stimulatory signaling domain derived from CD28, a second co-stimulatory signaling domain derived from CD137, and a primary intracellular signaling domain derived from CD4. In some embodiments, the polypeptide comprises from the N-terminus to the C-terminus: a CD8α signal peptide, the extracellular antigen-binding domain, a CD8α hinge domain, a CD8α transmembrane domain, a second co-stimulatory signaling domain derived from CD137, and a primary intracellular signaling domain derived from CD3ζ. In some embodiments, the BCMA CAR is monospecific. In some embodiments, the BCMA CAR is monovalent.

The present application also provides CARs that have two or more (including, but not limited to, any one of 2, 3, 4, 5, 6, or more) binding moieties that specifically bind to an antigen, such as BCMA. In some embodiments, one or more of the binding moieties are antigen binding fragments. In some embodiments, one or more of the binding moieties comprise single-domain antibodies.

In some embodiments, the CAR is a multivalent (such as bivalent, trivalent, or of higher number of valencies) CAR comprising a polypeptide comprising: (a) an extracellular antigen binding domain comprising a plurality (such as at least about any one of 2, 3, 4, 5, 6, or more) of binding moieties specifically binding to an antigen (such as a tumor antigen); (b) a transmembrane domain; and (c) an intracellular signaling domain.

In some embodiments, the binding moieties, such as sdAbs (including the plurality of sdAbs, or the first sdAb and/or the second sdAb) are camelid, chimeric, human, or humanized. In some embodiments, the binding moieties or sdAbs are connected to each other via peptide bonds or peptide linkers. In some embodiments, each peptide linker is no more than about 50 (such as no more than about any one of 35, 25, 20, 15, 10, or 5) amino acids long.

In some embodiments, the CAR further comprises a hinge domain (such as a CD8α hinge domain) located between the C-terminus of the extracellular antigen binding domain and the N-terminus of the transmembrane domain. In some embodiments, the CAR further comprises a signal peptide (such as a CD8α signal peptide) located at the N-terminus of the polypeptide.

Without wishing to be bound by theory, the CARs that are multivalent, or those CARs comprising an extracellular antigen binding domain comprising a first anti-BCMA binding moiety and a second BCMA binding moiety, may be specially suitable for targeting multimeric antigens via synergistic binding by the different antigen binding sites, or for enhancing binding affinity or avidity to the antigen. Improved avidity may allow for a substantial reduction in the dose of CAR-T cells needed to achieve a therapeutic effect, such as a dose ranging from $4.0 \times 10^5$ to $1.0 \times 10^6$ CAR-T cells per kilogram of the mass of the subject, or $3.0 \times 10^7$ to $1.0 \times 10^8$ CAR-T cells. Single valent CARs, such as bb2121, may need to be dosed at 5 to 10 times these amounts to achieve a comparable effect. In various embodiments, reduced dosage ranges may provide for substantial reduction in cytokine release syndrome (CRS) and other potentially dangerous side-effects of CAR-T therapy.

The various binding moieties (e.g., an extracellular antigen binding domain comprising a first anti-BCMA binding moiety and a second BCMA binding moiety) in the CARs described herein may be connected to each other via peptide linkers. In some embodiments, the binding moieties (such as sdAbs) are directly connected to each other without any peptide linkers. The peptide linkers connecting different binding moieties (such as sdAbs) may be the same or different. Different domains of the CARs may also be connected to each other via peptide linkers.

The peptide linker in the CARs described herein can be of any suitable length. In some embodiments, the peptide linker is at least about any of 1, 2, 3, 4, 5, 6, 7, 8, 9, 10, 11, 12, 13, 14, 15, 16, 17, 18, 19, 20, 25, 30, 35, 40, 50, 75, 100 or more amino acids long. In some embodiments, the peptide linker is no more than about any of 100, 75, 50, 40, 35, 30, 25, 20, 19, 18, 17, 16, 15, 14, 13, 12, 11, 10, 9, 8, 7, 6, 5 or fewer amino acids long. In some embodiments, the length of the peptide linker is any of about 1 amino acid to about 10 amino acids, about 1 amino acids to about 20 amino acids, about 1 amino acid to about 30 amino acids, about 5 amino acids to about 15 amino acids, about 10 amino acids to about 25 amino acids, about 5 amino acids to about 30 amino acids, about 10 amino acids to about 30 amino acids long, about 30 amino acids to about 50 amino acids, about 50 amino acids to about 100 amino acids, or about 1 amino acid to about 100 amino acids.

The CARs of the present application comprise a transmembrane domain that can be directly or indirectly connected to the extracellular antigen binding domain.

The CAR may comprise a T-cell activation moiety. The T-cell activation moiety can be any suitable moiety derived or obtained from any suitable molecule. In one embodiment, for example, the T-cell activation moiety comprises a transmembrane domain. The transmembrane domain can be any transmembrane domain derived or obtained from any molecule known in the art. For example, the transmembrane domain can be obtained or derived from a CD8α molecule or a CD28 molecule. CD8 is a transmembrane glycoprotein that serves as a co-receptor for the T-cell receptor (TCR), and is expressed primarily on the surface of cytotoxic T-cells. The most common form of CD8 exists as a dimer composed of a CD8α and CD8β chain. CD28 is expressed on T-cells and provides co-stimulatory signals required for T-cell activation. CD28 is the receptor for CD80 (B7.1) and CD86 (B7.2). In a preferred embodiment, the CD8α and CD28 are human.

In addition to the transmembrane domain, the T-cell activation moiety further comprises an intracellular (i.e., cytoplasmic) T-cell signaling domain. The intercellular T-cell signaling domain can be obtained or derived from a CD28 molecule, a CD3 zeta (ζ) molecule or modified versions thereof, a human Fc receptor gamma (FcRγ) chain, a CD27 molecule, an OX40 molecule, a 4-1BB molecule, or other intracellular signaling molecules known in the art. As discussed above, CD28 is a T-cell marker important in T-cell co-stimulation. CD3ζ associates with TCRs to produce a signal and contains immunoreceptor tyrosine-based activation motifs (ITAMs). 4-1BB, also known as CD137, transmits a potent costimulatory signal to T-cells, promoting differentiation and enhancing long-term survival of T lymphocytes. In a preferred embodiment, the CD28, CD3ζ, 4-1BB, OX40, and CD27 are human.

The T-cell activation domain of the CAR encoded by the inventive nucleic acid sequence can comprise any one of aforementioned transmembrane domains and any one or more of the aforementioned intercellular T-cell signaling domains in any combination. For example, the inventive nucleic acid sequence can encode a CAR comprising a CD28 transmembrane domain and intracellular T-cell signaling domains of CD28 and CD3ζ. Alternatively, for example, the inventive nucleic acid sequence can encode a CAR comprising a CD8α transmembrane domain and intracellular T-cell signaling domains of CD28, CD3ζ, the Fc receptor gamma (FcRγ) chain, and/or 4-1BB.

In some embodiments, the first BCMA binding moiety and/or the second BCMA binding moiety is an anti-BCMA sdAb. In some embodiments, the first BCMA binding moiety is a first anti-BCMA sdAb and the second BCMA binding moiety is a second anti-BCMA sdAb. In certain embodiments, the first BCMA binding moiety comprises the amino acid sequence of QVKLEESGGGLVQAGRSLRLS-CAASEHTFSSHVMGWFRQAPGKERESVAVIGWRDI STSYADSVKGRFTISRDNAKKTLYLQMNSLKPED-TAVYYCAARRIDAADFDSWGQG TQVTVSS (SEQ ID NO: 1). In certain embodiments, the first BCMA binding moiety comprises a polypeptide encoded by the nucleic acid sequence of (SEQ ID NO: 2)
CAGGTCAAACTGGAAGAATCTGGCGGAGGCCTGGTGCAGGCAGGACGGAG

CCTGCGCCTGAGCTGCGCAGCATCCGAGCACACCTTCAGCTCCCACGTGA

TGGGCTGGTTTCGGCAGGCCCCAGGCAAGGAGAGAGAGAGCGTGGCCGTG

ATCGGCTGGAGGGACATCTCCACATCTTACGCCGATTCCGTGAAGGGCCG

GTTCACCATCAGCCGGGACAACGCCAAGAAGACACTGTATCTGCAGATGA

ACAGCCTGAAGCCCGAGGACACCGCCGTGTACTATTGCGCAGCAAGGAGA

ATCGACGCAGCAGACTTTGATTCCTGGGGCCAGGGCACCCAGGTGACAGT

GTCTAGC.

In certain embodiments, the second BCMA binding moiety comprises the amino acid sequence of EVQLVESGG-GLVQAGGSLRLSCAASGRTFTMGWFRQAPGKERE-FVAAISLSPTLAY YAESVKGRFTISRDNAKNTVVLQ-MNSLKPEDTALYYCAADRKSVMSIRPDYWGQG TQVTVSS (SEQ ID NO: 3). In certain embodiments, the second BCMA binding moiety comprises a polypeptide encoded by the nucleic acid sequence of (SEQ ID NO: 4)
GAGGTGCAGCTGGTGGAGAGCGGAGGCGGCCTGGTGCAGGCCGGAGGCTC

TCTGAGGCTGAGCTGTGCAGCATCCGGAAGAACCTTCACAATGGGCTGGT

TTAGGCAGGCACCAGGAAAGGAGAGGGAGTTCGTGGCAGCAATCAGCCTG

TCCCCTACCCTGGCCTACTATGCCGAGAGCGTGAAGGGCAGGTTTACCAT

CTCCCGCGATAACGCCAAGAATACAGTGGTGCTGCAGATGAACTCCCTGA

AACCTGAGGACACAGCCCTGTACTATTGTGCCGCCGATCGGAAGAGCGTG

ATGAGCATTAGACCAGACTATTGGGGGCAGGGAACACAGGTGACCGTGAG

CAGC.

In some embodiments, the first BCMA binding moiety and the second BCMA binding moiety are connected to each other via a peptide linker. In certain embodiments, the peptide linker comprises the amino acid sequence of GGGGS (SEQ ID NO: 5).

In some embodiments, the CAR polypeptide further comprises a signal peptide located at the N-terminus of the polypeptide. In some embodiments, the signal peptide is derived from CD8α. In certain embodiments, the signal peptide comprises the amino acid sequence of MALPVTALLLPLALLLHAARP (SEQ ID NO: 6). In certain embodiments, signal peptide comprises a polypeptide encoded by the nucleic acid sequence of (SEQ ID NO: 7)
ATGGCTCTGCCCGTCACCGCTCTGCTGCTGCCTCTGGCTCTGCTGCTGCA

CGCTGCTCGCCCT.

In certain embodiments, the transmembrane domain comprises the amino acid sequence of IYI-WAPLAGTCGVLLLSLVITLYC (SEQ ID NO: 8).

In certain embodiments, wherein the transmembrane domain comprises a polypeptide encoded by the nucleic acid sequence of (SEQ ID NO: 9)
ATCTACATCTGGGCGCCCTTGGCCGGGACTTGTGGGGTCCTTCTCCTGTC

ACTGGTTATCACCCTTTACTGC.

In some embodiments, the intracellular signaling domain comprises a primary intracellular signaling domain of an immune effector cell. In some embodiments, wherein the intracellular signaling domain is derived from CD3ζ. In some embodiments, the intracellular signaling domain comprises one or more co-stimulatory signaling domains. In certain embodiments the intracellular signaling domain comprises the amino acid sequence of (SEQ ID NO: 10)
RVKFSRSADAPAYQQGQNQLYNELNLGRREEYDVLDKRRGRDPEMGGKPR

RKNPQEGLYNELQKDKMAEAYSEIGMKGERRRGKGHDGLYQGLSTATKDT

YDALHMQALPPR.

In certain embodiments, the intracellular signaling domain comprises a polypeptide encoded by the nucleic acid sequence of AGAGTGAAGTTCAGCAGGAGCGCA-GACGCCCCCGCGTACCAGCAGGGCCAGAA CCAG-CTCTATAACGAGCTCAATCTAGGACGAAGAGAG-GAGTACGATGTTTTGGA CAAGAGACGTGGC-CGGGACCCTGAGATGGGGGGAAAGCCGAG-AAGGAAGAACC CTCAGGAAGGCCTGTACAAT-GAACTGCAGAAAGATAAGATGGCGGAGGCCTACA GTGAGATTGGGATGAAAGGCGAGCGCCGGAGG-GGCAAGGGGCACGATGGCCTT TACCAGGGTC-TCAGTACAGCCACCAAGGACACCTACGACGCC-CTTCACATGCAG GCCCTGCCCCCTCGCTAA (SEQ ID NO: 11). In certain embodiments, the intracellular signaling domain comprises the amino acid sequence of KRGRKKL-LYIFKQPFMRPVQTTQEEDGCSCRFPEEEEGGCEL (SEQ ID NO: 12). In certain embodiments, the intracellular signaling domain comprises a polypeptide encoded by the nucleic acid sequence of

```
                                              (SEQ ID NO: 13)
AAACGGGGCAGAAAGAAACTCCTGTATATATTCAAACAACCATTTATGAG

ACCAGTACAAACTACTCAAGAGGAAGATGGCTGTAGCTGCCGATTTCCAG

AAGAAGAAGAAGGAGGATGTGAACTG.
```

In some embodiments, wherein the CAR polypeptide further comprises a hinge domain located between the C-terminus of the extracellular antigen binding domain and the N-terminus of the transmembrane domain. In certain embodiments, the hinge domain comprises the amino acid sequence of TTTPAPRPPTPAPTIASQPLSLRPEACR-PAAGGAVHTRGLDFACD (SEQ ID NO: 15). In certain embodiments, the hinge domain comprises a polypeptide encoded by the nucleic acid sequence of

```
                                              (SEQ ID NO: 14)
ACCACGACGCCAGCGCCGCGACCACCAACACCGGCGCCCACCATCGCGT

CGCAGCCCCTGTCCCTGCGCCCAGAGGCGTGCCGGCCAGCGGGGGGGC

GCAGTGCACACGAGGGGGCTGGACTTCGCCTGTGAT
```

In one embodiment, the CAR comprises one or more of, or all of, the elements listed in the Table 1:

TABLE 1

| CAR element | Amino Acid sequence |
|---|---|
| CD8α signal peptide, CD8α SP | MALPVTALLLPLALLLHAARP (SEQ ID NO: 6) |
| BCMA binding domain | VHH1 (A37353) aa sequence<br>QVKLEESGGGLVQAGRSLRLSCAASEHTFSSHVMG<br>WFRQAPGKERESVAVIGWRDISTSYADSVKGRFTI<br>SRDNAKKTLYLQMNSLKPEDTAVYYCAARRIDAAD<br>FDSWGQGTQVTVSS<br>(SEQ ID NO: 1)<br>G4S linker aa sequence<br>GGGGS (SEQ ID NO: 5)<br>VHH2 (A37917) aa sequence<br>EVQLVESGGGLVQAGGSLRLSCAASGRTFTMGWFR<br>QAPGKEREFVAAISLSPTLAYYAESVKGRFTISRD<br>NAKNTVVLQMNSLKPEDTALYYCAADRKSVMSIRP<br>DYWGQGTQVTVSS (SEQ ID NO: 3) |
| CD8α hinge | TTTPAPRPPTPAPTIASQPLSLRPEACRPAAGGAV<br>HTRGLDFACD (SEQ ID NO: 15) |
| CD8α transmembrane | IYIWAPLAGTCGVLLLSLVITLYC (SEQ ID NO: 8) |
| CD137 Cytoplasmic | KRGRKKLLYIFKQPFMRPVQTTQEEDGCSCRFPEE<br>EEGGCEL (SEQ ID NO: 12) |
| CD3ζ Cytoplasmic | RVKFSRSADAPAYQQGQNQLYNELNLGRREEYDVL<br>DKRRGRDPEMGGKPRRKNPQEGLYNELQKDKMAEA<br>YSEIGMKGERRRGKGHDGLYQGLSTATKDTYDALH<br>MQALPPR (SEQ ID NO: 10) |

Immune Effector Cells Compositions

"Immune effector cells" are immune cells that can perform immune effector functions. In some embodiments, the immune effector cells express at least FcγRIII and perform ADCC effector function. Examples of immune effector cells which mediate ADCC include peripheral blood mononuclear cells (PBMC), natural killer (NK) cells, monocytes, cytotoxic Tcells, neutrophils, and eosinophils. In some embodiments, the immune effector cells are Tcells. In some embodiments, the Tcells are CD4+/CD8−, CD4−/CD8+, CD4+/CD8+, CD4−/CD8−, or combinations thereof. In some embodiments, the Tcells produce IL-2, TFN, and/or TNF upon expressing the CAR and binding to the target cells, such as CD20+ or CD19+ tumor cells. In some embodiments, the CD8+ Tcells lyse antigen-specific target cells upon expressing the CAR and binding to the target cells.

Biological methods for introducing the vector into an immune effector cell include the use of DNA and RNA vectors. Viral vectors have become the most widely used method for inserting genes into mammalian, e.g., human cells. Chemical means for introducing the vector into an immune effector cell include colloidal dispersion systems, such as macromolecule complexes, nanocapsules, microspheres, beads, and lipid-based systems including oil-in-water emulsions, micelles, mixed micelles, and liposomes. An exemplary colloidal system for use as a delivery vehicle in vitro is a liposome (e.g., an artificial membrane vesicle).

Provided herein are dosage forms comprising $3.0 \times 10^7$ to $1.0 \times 10^8$ CAR-T cells comprising a CAR comprising a polypeptide comprising: (a) an extracellular antigen binding domain comprising a first BCMA binding moiety specifically binding to a first epitope of BCMA, and a second BCMA binding moiety specifically binding to a second epitope of BCMA; (b) a transmembrane domain; and (c) an intracellular signaling domain, wherein the first epitope and the second epitope are different. In certain embodiments, the dosage form comprises $3.0 \times 10^7$ to $4.0 \times 10^7$ of the CAR-T cells. In certain embodiments, the dosage form comprises $3.5 \times 10^7$ to $4.5 \times 10^7$ of the CAR-T cells. In certain embodiments, the dosage form comprises $4.0 \times 10^7$ to $5.0 \times 10^7$ of the CAR-T cells. In certain embodiments, the dosage form comprises $4.5 \times 10^7$ to $5.5 \times 10^7$ of the CAR-T cells. In certain embodiments, the dosage form comprises $5.0 \times 10^7$ to $6.0 \times 10^7$ of the CAR-T cells. In certain embodiments, the dosage form comprises $5.5 \times 10^7$ to $6.5 \times 10^7$ of the CAR-T cells. In certain embodiments, the dosage form comprises $6.0 \times 10^7$ to $7.0 \times 10^7$ of the CAR-T cells. In certain embodiments, the dosage form comprises $6.5 \times 10^7$ to $7.5 \times 10^7$ of the CAR-T cells. In certain embodiments, the dosage form comprises $7.0 \times 10^7$ to $8.0 \times 10^7$ of the CAR-T cells. In certain embodiments, the dosage form comprises $7.5 \times 10^7$ to $8.5 \times 10^7$ of the CAR-T cells. In certain embodiments, the dosage form comprises $8.0 \times 10^7$ to $9.0 \times 10^7$ of the CAR-T cells. In certain embodiments, the dosage form comprises $8.5 \times 10^7$ to $9.5 \times 10^7$ of the CAR-T cells. In certain embodiments, the dosage form comprises $9.0 \times 10^7$ to $1.0 \times 10^8$ of the CAR-T cells. In some embodiments, the dosage form comprises $2 \times 10^7$ to $8 \times 10^7$ of the CAR-T cells. In some embodiments, the dosage form comprises about $1 \times 10^7$, about $2 \times 10^7$, about $3 \times 10^7$, about $4 \times 10^7$, about $5 \times 10^7$, about $6 \times 10^7$, about $7 \times 10^7$, about $8 \times 10^7$, about $9 \times 10^7$ or about $1 \times 10^8$ of the CAR-T cells. In some embodiments, the dosage form comprises about $5.1 \times 10^7$, about $5.2 \times 10^7$, about $5.25 \times 10^7$, about $5.3 \times 10^7$, about $5.4 \times 10^7$, about $5.5 \times 10^7$, about $5.6 \times 10^7$, about $5.7 \times 10^7$, about $5.8 \times 10^7$, or about $5.9 \times 10^7$ of the CAR-T cells. In one embodiment, the dosage form comprises about $5.25 \times 10^7$ of the CAR-T cells.

In some embodiments, there is provided a dosage form comprising $3.0 \times 10^6$ to $1.0 \times 10^8$ engineered immune effector cells (such as T-cells) comprising a CAR comprising a polypeptide comprising: (a) an extracellular antigen binding domain comprising a first anti-BCMA sdAb specifically binding to a first epitope of BCMA, and a second anti-BCMA sdAb specifically binding to a second epitope of BCMA; (b) a transmembrane domain; and (c) an intracellular signaling domain, wherein the first epitope and the second epitope are different. In certain embodiments, the dosage form comprises $3.0 \times 10^7$ to $4.0 \times 10^7$ of the CAR-T cells. In certain embodiments, the dosage form comprises $3.5 \times 10^7$ to $4.5 \times 10^7$ of the CAR-T cells. In certain embodiments, the dosage form comprises $4.0 \times 10^7$ to $5.0 \times 10^7$ of the CAR-T cells. In certain embodiments, the dosage form comprises $4.5 \times 10^7$ to $5.5 \times 10^7$ of the CAR-T cells. In certain embodiments, the dosage form comprises $5.0 \times 10^7$ to $6.0 \times 10^7$ of the CAR-T cells. In certain embodiments, the dosage form comprises $5.5 \times 10^7$ to $6.5 \times 10^7$ of the CAR-T cells. In certain embodiments, the dosage form comprises $6.0 \times 10^7$ to $7.0 \times 10^7$ of the CAR-T cells. In certain embodiments, the dosage form comprises $6.5 \times 10^7$ to $7.5 \times 10^7$ of the CAR-T cells. In certain embodiments, the dosage form comprises $7.0 \times 10^7$ to $8.0 \times 10^7$ of the CAR-T cells. In certain embodiments, the dosage form comprises $7.5 \times 10^7$ to $8.5 \times 10^7$ of the CAR-T cells. In certain embodiments, the dosage form comprises $8.0 \times 10^7$ to $9.0 \times 10^7$ of the CAR-T cells. In certain embodiments, the dosage form comprises $8.5 \times 10^7$ to $9.5 \times 10^7$ of the CAR-T cells. In certain embodiments, the dosage form comprises $9.0 \times 10^7$ to $1.0 \times 10^8$ of the CAR-T cells. In some embodiments, the dosage form comprises $2 \times 10^7$ to $8 \times 10^7$ of the CAR-T cells. In some embodiments, the dosage form comprises about $1 \times 10^7$, about $2 \times 10^7$, about $3 \times 10^7$, about $4 \times 10^7$, about $5 \times 10^7$, about $6 \times 10^7$, about $7 \times 10^7$, about $8 \times 10^7$, about $9 \times 10^7$ or about $1 \times 10^8$ of the CAR-T cells. In some embodiments, the dosage form comprises about $5.1 \times 10^7$, about $5.2 \times 10^7$, about $5.25 \times 10^7$, about $5.3 \times 10^7$, about $5.4 \times 10^7$, about $5.5 \times 10^7$, about $5.6 \times 10^7$, about $5.7 \times 10^7$, about $5.8 \times 10^7$, or about $5.9 \times 10^7$ of the CAR-T cells. In one embodiment, the dosage form comprises about $5.25 \times 10^7$ of the CAR-T cells.

Pharmaceutical Compositions and Formulations

Further provided by the present application are pharmaceutical compositions comprising any one of the anti-BCMA single-domain antibodies, or any one of the engineered immune effector cells comprising any one of the CARs (such as BCMA CARs) as described herein, and a pharmaceutically acceptable carrier. Pharmaceutical compositions can be prepared by mixing any of the immune effector cells described herein, having the desired degree of purity, with optional pharmaceutically acceptable carriers, excipients or stabilizers (Remington's Pharmaceutical Sciences 16th edition, Osol, A. Ed. (1980)), in the form of lyophilized formulations or aqueous solutions.

The compositions described herein may be administered as part of a pharmaceutical composition comprising one or more carriers. The choice of carrier will be determined in part by the particular inventive nucleic acid sequence, vector, or host cells expressing the CAR, as well as by the particular method used to administer the inventive nucleic acid sequence, vector, or host cells expressing the CAR. Accordingly, there are a variety of suitable formulations of the pharmaceutical composition of the invention. For example, the pharmaceutical composition can contain preservatives. Suitable preservatives may include, for example, methylparaben, propylparaben, sodium benzoate, and benzalkonium chloride. A mixture of two or more preservatives optionally may be used. The preservative or mixtures thereof are typically present in an amount of about 0.0001% to about 2% by weight of the total composition.

In addition, buffering agents may be used in the composition. Suitable buffering agents include, for example, citric acid, sodium citrate, phosphoric acid, potassium phosphate, and various other acids and salts. A mixture of two or more buffering agents optionally may be used. The buffering agent or mixtures thereof are typically present in an amount of about 0.001% to about 4% by weight of the total composition.

The composition comprising the inventive nucleic acid sequence encoding the CAR, or host cells expressing the CAR, can be formulated as an inclusion complex, such as cyclodextrin inclusion complex, or as a liposome. Liposomes can serve to target the host cells (e.g., T-cells or NK cells) or the inventive nucleic acid sequence to a particular tissue. Liposomes also can be used to increase the half-life of the inventive nucleic acid sequence. Many methods are available for preparing liposomes, such as those described in, for example, Szoka et al., Ann. Rev. Biophys. Bioeng., 9: 467 (1980), and U.S. Pat. Nos. 4,235,871; 4,501,728; 4,837,028; and 5,019,369. The composition can employ time-released, delayed release, and sustained release delivery systems such that the delivery of the inventive composition occurs prior to, and with sufficient time to cause, sensitization of the site to be treated. Many types of release delivery systems are available and known to those of ordinary skill in the art. Such systems can avoid repeated administrations of the composition, thereby increasing convenience to the subject and the physician, and may be particularly suitable for certain composition embodiments of the invention.

Methods of Treatment

The present application further relates to methods and compositions for use in cell immunotherapy. In some embodiments, the cell immunotherapy is for treating cancer, including but not limited to hematological malignancies and solid tumors. The methods are suitable for treatment of adults and pediatric population, including all subsets of age, and can be used as any line of treatment, including first line or subsequent lines.

Any of the anti-BCMA sdAbs, CARs, and engineered immune effector cells (such as CAR-T cells) described herein may be used in the method of treating cancer.

In certain embodiments, the CAR-T cells are administered at a dose of about $4.0 \times 10^5$ to $5.0 \times 10^5$ cells/kg, $4.5 \times 10^5$ to $5.5 \times 10^5$ cells/kg, $5.0 \times 10^5$ to $6.0 \times 10^5$ cells/kg, $5.5 \times 10^5$ to $6.5 \times 10^5$ cells/kg, $6.0 \times 10^5$ to $7.0 \times 10^5$ cells/kg, $6.5 \times 10^5$ to $7.5 \times 10^5$ cells/kg, $7.0 \times 10^5$ to $8.0 \times 10^5$ cells/kg, $7.5 \times 10^5$ to $8.5 \times 10^5$ cells/kg, $8.0 \times 10^5$ to $9.0 \times 10^5$ cells/kg, $8.5 \times 10^5$ to $9.5 \times 10^5$ cells/kg, $9.0 \times 10^5$ to $1.0 \times 10^6$ cells/kg. In certain embodiments, the CAR-T cells are administered at a dose of about $7.1 \times 10^5$ cells/kg, about $7.2 \times 10^5$ cells/kg, about $7.3 \times 10^5$ cells/kg, about $7.4 \times 10^5$ cells/kg, about $7.5 \times 10^6$ cells/kg, about $7.6 \times 10^6$ cells/kg, about $7.7 \times 10^6$ cells/kg, about $7.8 \times 10^6$ cells/kg, or about $7.9 \times 10^6$ cells/kg. In one embodiment, the CAR-T cells are administered at a dose of about $7.5 \times 10^6$ cells/kg. In certain embodiments, the CAR-T cells are administered at a dose of about 3.0 to $4.0 \times 10^7$ cells. In certain embodiments, the CAR-T cells are administered at a dose of about 3.5 to $4.5 \times 10^7$ cells. In certain embodiments, the CAR-T cells are administered at a dose of about 4.0 to $5.0 \times 10^7$ cells. In certain embodiments, the CAR-T cells are administered at a dose of about 4.5 to $5.5 \times 10^7$ cells. In certain embodiments, the CAR-T cells are administered at a dose of about 5.0 to $6.0 \times 10^7$ cells. In certain embodiments, the CAR-T cells are administered at a dose of about 5.5 to $6.5 \times 10^7$ cells. In certain embodiments, the CAR-T cells are administered at a dose of about 6.0 to $7.0 \times 10^7$ cells. In certain embodiments, the CAR-T cells are administered at a dose of about 6.5 to $7.5 \times 10^7$ cells. In certain embodiments, the CAR-T cells are administered at a dose of about 7.0 to $8.0 \times 10^7$ cells. In certain embodiments, the CAR-T cells are administered at a dose of about 7.5 to $8.5 \times 10^7$ cells. In certain embodiments, the CAR-T cells are administered at a dose of about 8.0 to $9.0 \times 10^7$ cells. In certain embodiments, the CAR-T cells are administered at a dose of about 8.5 to $9.5 \times 10^7$ cells. In certain embodiments, the CAR-T cells are administered at a dose of about 9.0 to $10.0 \times 10^7$ cells. In some embodiments, the CAR-T cells are administered at a dose of about $5.1 \times 10^7$, about $5.2 \times 10^7$, about $5.25 \times 10^7$, about $5.3 \times 10^7$, about $5.4 \times 10^7$, about $5.5 \times 10^7$, about $5.6 \times 10^7$, about $5.7 \times 10^7$, about $5.8 \times 10^7$, or about $5.9 \times 10^7$ cells. In one embodiment, the CAR-T cells are administered at a dose of about $5.25 \times 10^7$ of cells.

In certain embodiments, the CAR-T cells are administered at a dose resulting in about $4.0 \times 10^5$ to $5.0 \times 10^5$ cells/kg, $4.5 \times 10^5$ to $5.5 \times 10^5$ cells/kg, $5.0 \times 10^5$ to $6.0 \times 10^5$ cells/kg, $5.5 \times 10^5$ to $6.5 \times 10^5$ cells/kg, $6.0 \times 10^5$ to $7.0 \times 10^5$ cells/kg, $6.5 \times 10^5$ to $7.5 \times 10^5$ cells/kg, $7.0 \times 10^5$ to $8.0 \times 10^5$ cells/kg, $7.5 \times 10^5$ to $8.5 \times 10^5$ cells/kg, $8.0 \times 10^5$ to $9.0 \times 10^5$ cells/kg, $8.5 \times 10^5$ to $9.5 \times 10^5$ cells/kg, $9.0 \times 10^5$ to $1.0 \times 10^6$ cells/kg in the subject. In certain embodiments, the CAR-T cells are administered at a dose resulting in about $7.1 \times 10^5$ cells/kg, about $7.2 \times 10^5$ cells/kg, about $7.3 \times 10^5$ cells/kg, about $7.4 \times 10^5$ cells/kg, about $7.5 \times 10^6$ cells/kg, about $7.6 \times 10^6$ cells/kg, about $7.7 \times 10^6$ cells/kg, about $7.8 \times 10^6$ cells/kg, or about $7.9 \times 10^6$ cells/kg in the subject. In one embodiment, the CAR-T cells are administered at a dose resulting in about $7.5 \times 10^6$ cells/kg in the subject. In certain embodiments, the CAR-T cells are administered at a dose resulting in about 3.0 to $4.0 \times 10^7$ cells in the subject. In certain embodiments, the CAR-T cells are administered at a dose resulting in about 3.5 to $4.5 \times 10^7$ cells in the subject. In certain embodiments, the CAR-T cells are administered at a dose resulting in about 4.0 to $5.0 \times 10^7$ cells in the subject. In certain embodiments, the CAR-T cells are administered at a dose resulting in about 4.5 to $5.5 \times 10^7$ cells in the subject. In certain embodiments, the CAR-T cells are administered at a dose resulting in about 5.0 to $6.0 \times 10^7$ cells in the subject. In certain embodiments, the CAR-T cells are administered at a dose resulting in about 5.5 to $6.5 \times 10^7$ cells in the subject. In certain embodiments, the CAR-T cells are administered at a dose resulting in about 6.0 to $7.0 \times 10^7$ cells in the subject. In certain embodiments, the CAR-T cells are administered at a dose resulting in about 6.5 to $7.5 \times 10^7$ cells in the subject. In certain embodiments, the CAR-T cells are administered at a dose resulting in about 7.0 to $8.0 \times 10^7$ cells in the subject. In certain embodiments, the CAR-T cells are administered at a dose resulting in about 7.5 to $8.5 \times 10^7$ cells in the subject. In certain embodiments, the CAR-T cells are administered at a dose resulting in about 8.0 to $9.0 \times 10^7$ cells in the subject. In certain embodiments, the CAR-T cells are administered at a dose resulting in about 8.5 to $9.5 \times 10^7$ cells in the subject. In certain embodiments, the CAR-T cells are administered at a dose resulting in about 9.0 to $10.0 \times 10^7$ cells in the subject. In some embodiments, the CAR-T cells are administered at a dose resulting in about $5.1 \times 10^7$, about $5.2 \times 10^7$, about $5.25 \times 10^7$, about $5.3 \times 10^7$, about $5.4 \times 10^7$, about $5.5 \times 10^7$, about $5.6 \times 10^7$, about $5.7 \times 10^7$, about $5.8 \times 10^7$, or about $5.9 \times 10^7$ cells in the subject. In one embodiment, the CAR-T cells are administered at a dose resulting in about $5.25 \times 10^7$ of cells in the subject.

The methods described herein may be used for treating various cancers, including both solid cancer and liquid cancer. In certain embodiments, the methods are used to treat multiple myeloma. The methods described herein may be used as a first therapy, second therapy, third therapy, or combination therapy with other types of cancer therapies known in the art, such as chemotherapy, surgery, radiation, gene therapy, immunotherapy, bone marrow transplantation, stem cell transplantation, targeted therapy, cryotherapy, ultrasound therapy, photodynamic therapy, radio-frequency ablation or the like, in an adjuvant setting or a neoadjuvant setting.

In some embodiments, the cancer is multiple myeloma. In some embodiments, the cancer is stage I, stage II or stage III, and/or stage A or stage B multiple myeloma based on the Durie-Salmon staging system. In some embodiments, the cancer is stage I, stage II or stage III multiple myeloma based on the International staging system published by the International Myeloma Working Group (IMWG).

The composition comprising the host cells expressing the inventive CAR-encoding nucleic acid sequence, or a vector comprising the inventive CAR-encoding nucleic acid sequence, can be administered to a mammal using standard administration techniques, including oral, intravenous, intraperitoneal, subcutaneous, pulmonary, transdermal, intramuscular, intranasal, buccal, sublingual, or suppository administration. The composition preferably is suitable for parenteral administration. The term "parenteral", as used herein, includes intravenous, intramuscular, subcutaneous, rectal, vaginal, and intraperitoneal administration. More preferably, the composition is administered to a mammal using peripheral systemic delivery by intravenous, intraperitoneal, or subcutaneous injection.

The composition comprising the host cells expressing the inventive CAR-encoding nucleic acid sequence, or a vector comprising the inventive CAR-encoding nucleic acid sequence, can be administered with one or more additional therapeutic agents, which can be coadministered to the mammal. By "coadministering" is meant administering one or more additional therapeutic agents and the composition comprising the inventive host cells or the inventive vector sufficiently close in time such that the inventive CAR can enhance the effect of one or more additional therapeutic agents, or vice versa. In this regard, the composition comprising the inventive host cells or the inventive vector can be administered first, and the one or more additional therapeutic agents can be administered second, or vice versa.

A CAR-expressing cell described herein and the at least one additional therapeutic agent can be administered simultaneously, in the same or in separate compositions, or sequentially. For sequential administration, the CAR-expressing cell described herein can be administered first, and the additional agent can be administered second, or the order of administration can be reversed.

Once the composition comprising host cells expressing the inventive CAR-encoding nucleic acid sequence, or a vector comprising the inventive CAR-encoding nucleic acid sequence, is administered to a mammal (e.g., a human), the biological activity of the CAR can be measured by any suitable method known in the art. In accordance with the inventive method, the CAR binds to BCMA on the multiple myeloma cells, and the multiple myeloma cells are destroyed. Binding of the CAR to BCMA on the surface of multiple myeloma cells can be assayed using any suitable method known in the art, including, for example, ELISA and flow cytometry. The ability of the CAR to destroy multiple myeloma cells can be measured using any suitable method known in the art, such as cytotoxicity assays described in, for example, Kochenderfer et al., J. Immunotherapy, 32(7): 689-702 (2009), and Herman et al. J. Immunological Methods, 285(1): 25-40 (2004). The biological activity of the CAR also can be measured by assaying expression of certain cytokines, such as CD 107a, IFN-γ, IL-2, and TNF.

T Cell Phenotypic Characterization

In some embodiments, the cell population of the CAR-T dosage forms described herein comprise a T cell or population of T cells, e.g., at various stages of differentiation. Stages of T cell differentiation include naïve T cells, stem central memory T cells, central memory T cells, effector memory T cells, and terminal effector T cells, from least to most differentiated. After antigen exposure, naïve T cells proliferate and differentiate into memory T cells, e.g., stem central memory T cells and central memory T cells, which then differentiate into effector memory T cells. Upon receiving appropriate T cell receptor, costimulatory, and inflammatory signals, memory T cells further differentiate into terminal effector T cells. See, e.g., Restifo. Blood. 124.4 (2014):476-77; and Joshi et al. J. Immunol. 180.3(2008): 1309-15.

Figure 17:
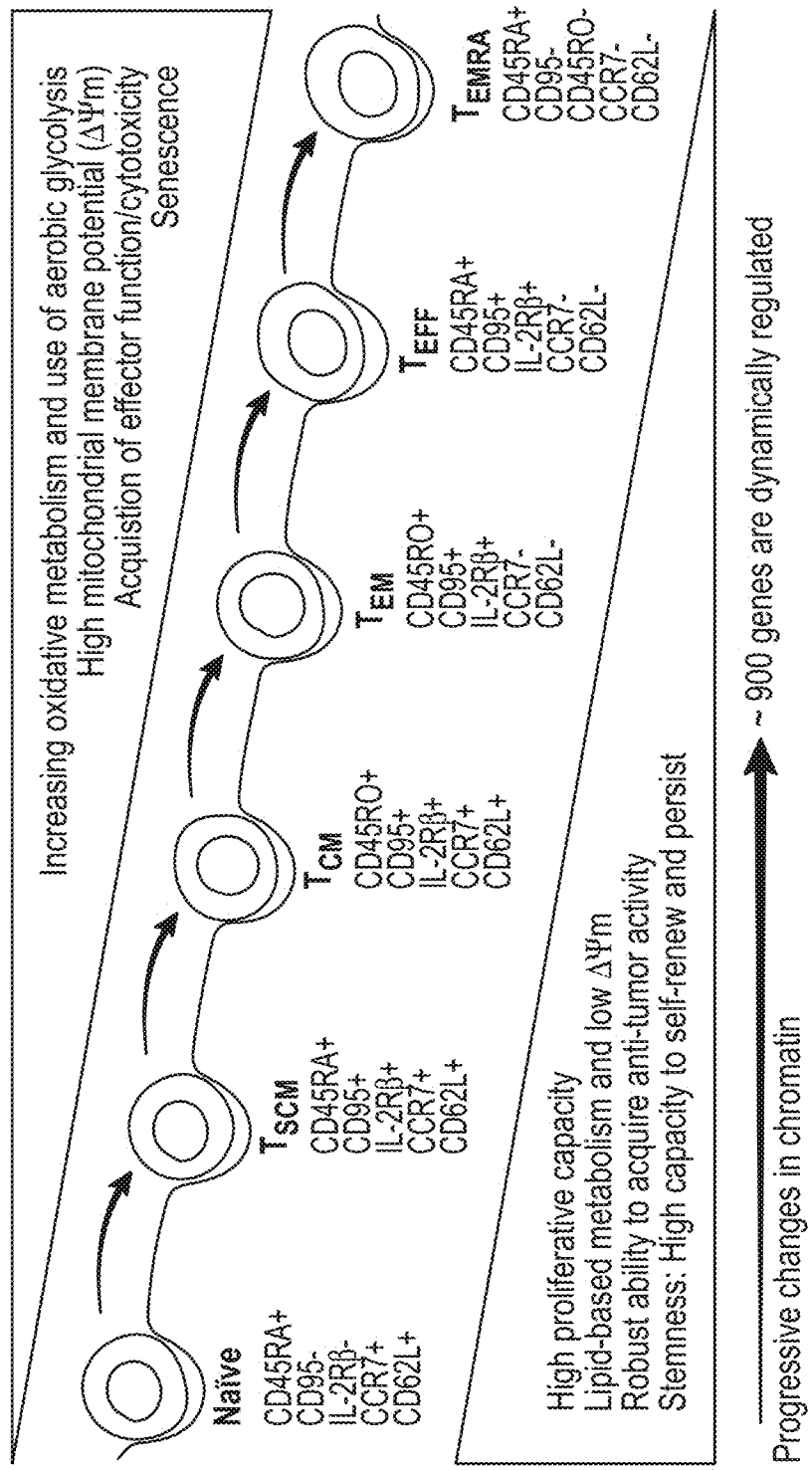
FIG. 17 shows the changes in phenotype in various T cell differentiation states: naïve, stem memory (Tscm), central memory (Tcm), effector memory (Tem), effector (Teff) and effector memory RA (Temra). T cell activation and differentiation is correlated with increased reliance on glycolysis and increased mitochondrial membrane potential, both of which may mediate effector function of T cells in responding to cancer. The image is courtesy of Kiston, R. J. et al., Cell Metabolism, 2017, 26(1):94-109.
Figure 18:
FIG. 18 shows the phenotypic markers for each of the T cell subsets for LCAR-B38M CAR-T. The stem memory cells (Tscm) are CCR7+, CD45RO− and CD95+. The central memory cells (Tcm) are CCR7+ and CD45RO+.

Naïve T cells can have the following expression pattern of cell surface markers: CCR7+, CD62L+, CD45RO−, CD95−. Stem central memory T cells (Tscm) can have the following expression pattern of cell surface markers: CCR7+, CD62L+, CD45RO−, CD95+. Central memory T cells (Tcm) can have the following expression pattern of cell surface markers: CCR7+, CD62L+, CD45RO+, CD95+. Effector memory T cells (Tem) can have the following expression pattern of cell surface markers: CCR7−, CD62L−, CD45RO+, CD95+. Terminal effector T cells (Teff) can have the following expression pattern of cell surface markers: CCR7−, CD62L−, CD45RO−, CD95+. See, e.g., Gattinoni et al. Nat. Med. 17(2011):1290-7; and Flynn et al. Clin. Translat. Immunol. 3(2014):e20. FIGS. 17 and 18 also show markers expressed on each of these and additional classes of T cells.

Without wishing to be bound by theory, pre-infusion T cell phenotype can correlate with expansion and persistence of CAR+ T cells, toxicity profile and clinical responses. The drug product (DP) and post-infusion CD4:CD8 ratios and CAR-T memory phenotype can also provide information on expansion and persistence of CAR+ T cells, toxicity profile and clinical responses. Immunophenotyping of CD4 and CD8 T cell subsets can be undertaken at various stages, including initial collection of patient's T cells by apheresis, of the DP itself, and at various timepoints post-infusion (e.g., to characterize subsets, activation status, ratios).

In various embodiments, the ratio of CD4+ CAR-T cells to CD8+ CAR-T cells in the dose of the CAR-T cells is less than 4. In some embodiments, the ratio of CD4+ CAR-T cells to CD8+ CAR-T cells in the dose of the CAR-T cells is less than 2. In some embodiments, the ratio of CD4+ CAR-T cells to CD8+ CAR-T cells in the dose of the CAR-T cells is less than 1.8. In some embodiments, the ratio of CD4+ CAR-T cells to CD8+ CAR-T cells in the dose of the CAR-T cells is less than 1.7. In some embodiments, the ratio of CD4+ CAR-T cells to CD8+ CAR-T cells in the dose of the CAR-T cells is less than 1.6. In specific embodiments, in at least five, six, seven, eight, nine, ten, 11, 12, 13, 14, 15, 16, 17, 18, 19 or 20 patients, the median ratio of CD4+ CAR-T cells to CD8+ CAR-T cells in the dose of the CAR-T cells is less than 1.6. In specific embodiments, in at least five, six, seven, eight, nine, ten, 11, 12, 13, 14, 15, 16, 17, 18, 19 or 20 patients, the median ratio of CD4+ CAR-T cells to CD8+ CAR-T cells in the dose of the CAR-T cells is about 1.54. In specific embodiments, in at least five, six, seven, eight, nine, ten, 11, 12, 13, 14, 15, 16, 17, 18, 19 or 20 patients, the median ratio of CD4+ CAR-T cells to CD8+ CAR-T cells in the dose of the CAR-T cells is 1.54.

In various embodiments of the above methods, the method further comprises the steps of assaying the amount of CD4+ CAR-T cells in the subject at Cmax, assaying the amount of CD8+ CAR-T cells in the subject at Cmax, wherein the ratio of the CD4+ CAR-T cells at Cmax to the CD8+ CAR-T cells at Cmax is less than 3.5. In some embodiments, the ratio of the CD4+ CAR-T cells at Cmax to the CD8+ CAR-T cells at Cmax is less than 2.0. In some embodiments, the ratio of the CD4+ CAR-T cells at Cmax to the CD8+ CAR-T cells at Cmax is less than 1.2. In some embodiments, the ratio of the CD4+ CAR-T cells at Cmax to the CD8+ CAR-T cells at Cmax is less than 0.8. In some embodiments, the ratio of the CD4+ CAR-T cells at Cmax to the CD8+ CAR-T cells at Cmax is less than 0.6. In some embodiments, the ratio of the CD4+ CAR-T cells at Cmax to the CD8+ CAR-T cells at Cmax is less than 0.4. In some embodiments, the ratio of the CD4+ CAR-T cells at Cmax to the CD8+ CAR-T cells at Cmax is less than 0.3. In some embodiments, the ratio of the CD4+ CAR-T cells at Cmax to the CD8+ CAR-T cells at Cmax is about 0.3. In specific embodiments, in at least five, six, seven, eight, nine, ten, 11, 12, 13, 14, 15, 16, 17, 18, 19 or 20 patients, the median ratio of CD4+ CAR-T cells to CD8+ CAR-T cells in the dose of the CAR-T cells is less than 1.6. In specific embodiments, in at least five, six, seven, eight, nine, ten, 11, 12, 13, 14, 15, 16, 17, 18, 19 or 20 patients, the median ratio of CD4+ CAR-T cells to CD8+ CAR-T cells at Cmax is about 0.35. In specific embodiments, in at least five, six, seven, eight, nine, ten, 11, 12, 13, 14, 15, 16, 17, 18, 19 or 20 patients, the median ratio of CD4+ CAR-T cells to CD8+ CAR-T cells at Cmax is 0.35. In specific embodiments, in at least five, six, seven, eight, nine, ten, 11, 12, 13, 14, 15, 16, 17, 18, 19 or 20 patients, the median ratio of CD4+ CAR-T cells to CD8+ CAR-T cells at Cmax is about 0.3. In specific embodiments, in at least five, six, seven, eight, nine, ten, 11, 12, 13, 14, 15, 16, 17, 18, 19 or 20 patients, the median ratio of CD4+ CAR-T cells to CD8+ CAR-T cells at Cmax is 0.3.

In various embodiments of the above methods, the central memory CAR+ T cells comprise at least 85% of the total amount of CAR+ T cells at 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 days after the dose is administered. In some embodiments, the central memory CAR+ T cells comprise at least 90% of the total amount of CAR+ T cells at 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 days after the dose is administered. In some embodiments, the central memory CAR+ T cells comprise at least 95% of the total amount of CAR+ T cells at 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 days after the dose is administered. In some embodiments, the central memory CAR+ T cells comprise at least 97% of the total amount of CAR+ T cells at 7, 8, 9, 10, 11, 12, 13, 14, 15, 16, 17, 18, 19, 20, 21, 22, 23, 24, 25, 26, 27, 28, 29 or 30 days after the dose is administered.

In certain embodiments, the central memory CAR+ T cells comprise 85-86%, 86-87%, 87-88%, 88-89%, 89-90%, 90-91%, 91-92%, 92-93%, 93-94%, 94-95%, 95-96%, 96-97%, 97-98%, or 98-99% of the total amount of CAR+ T cells.

In various embodiments of the above methods, the effector memory CAR+ T cells comprise at least 2% of the total amount of CAR+ T cells at 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 days after the dose is administered. In some embodiments, the effector memory CAR+ T cells comprise at least 5% of the total amount of CAR+ T cells at 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 days after the dose is administered. In some embodiments, the effector memory CAR+ T cells comprise at least 7% of the total amount of CAR+ T cells at 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 days after the dose is administered. In some embodiments, the effector memory CAR+ T cells comprise at least 8% of the total amount of CAR+ T cells at 7, 8, 9, 10, 11, 12, 13, 14, 15, 16, 17, 18, 19, 20, 21, 22, 23, 24, 25, 26, 27, 28, 29 or 30 days after the dose is administered.

In various embodiments of the above methods, the method further comprises the step of assaying for the ratio of central memory CAR+CD8+ T cells to the total amount of CAR+CD8+ T cells in the subject at Cmax after the dose is administered, wherein the central memory CAR+CD8+ T cells comprise at least 30% of the total amount of CAR+CD8+ T cells. In some embodiments, the central memory CAR+CD8+ T cells comprise at least 50% of the total amount of CAR+CD8+ T cells. In some embodiments, the central memory CAR+CD8+ T cells comprise at least 50% of the total amount of CAR+CD8+ T cells. In some embodiments, the central memory CAR+CD8+ T cells comprise at least 80% of the total amount of CAR+CD8+ T cells. In certain embodiments, the central memory CAR+CD8+ T cells comprise 55-70%, 56-71%, 57-72%, 58-73%, 59-74%, 60-75%, 61-76%, 62-77%, 63-78%, 64-79%, 65-80%, 66-81%, 67-82%, 68-83%, 70-85%, 72-87%, 74-89%, 76-91%, 78-93%, or 80-100% of the total amount of CAR+CD8+ T cells.

In various embodiments of the above methods, the method further comprises the step of assaying for the ratio of central memory CAR+CD4+ T cells to total amount of CAR+CD4+ T cells in the subject at Cmax after the dose is administered, wherein the central memory CAR+CD4+ T cells comprise at least 60% of the total amount of CAR+CD4+ T cells. In some embodiments, the central memory CAR+CD4+ T cells comprise at least 65% of the total amount of CAR+CD4+ T cells. In some embodiments, the central memory CAR+CD4+ T cells comprise at least 70% of the total amount of CAR+CD4+ T cells. In some embodiments, the central memory CAR+CD4+ T cells comprise at least 75% of the total amount of CAR+CD4+ T cells. In certain embodiments, the central memory CAR+CD4+ T cells comprise 65-80%, 66-81%, 67-82%, 68-83%, 69-84%, 70-85%, 71-86%, 72-87%, 73-88%, 74-89%, 75-90%, 76-91%, 77-92%, 78-93%, 80-90%, 82-92%, 84-94%, 86-96%, 88-98%, or 90-100% of the total amount of CAR+CD8+ T cells.

In various embodiments of the above methods, the method further comprises the step of assaying for the ratio of effector memory CAR+CD8+ T cells to the total amount of CAR+CD8+ T cells in the subject at Cmax after the dose is administered, wherein the effector memory CAR+CD8+ T cells comprise at least 2% of the total amount of CAR+CD8+ T cells. In some embodiments, the effector memory CAR+CD8+ T cells comprise at least 5% of the total amount of CAR+CD8+ T cells. In some embodiments, the effector memory CAR+CD8+ T cells comprise at least 8% of the total amount of CAR+CD8+ T cells. In some embodiments, the effector memory CAR+CD8+ T cells comprise at least 10% of the total amount of CAR+CD8+ T cells.

In various embodiments of the above methods, the method further comprises the step of assaying for the ratio of effector memory CAR+CD4+ T cells to total amount of CAR+CD4+ T cells in the subject at Cmax after the dose is administered, wherein the effector memory CAR+CD4+ T cells comprise at least 70% of the total amount of CAR+CD4+ T cells. In some embodiments, the effector memory CAR+CD4+ T cells comprise at least 75% of the total amount of CAR+CD4+ T cells. In some embodiments, the effector memory CAR+CD4+ T cells comprise at least 80% of the total amount of CAR+CD4+ T cells. In some embodiments, the effector memory CAR+CD4+ T cells comprise at least 90% of the total amount of CAR+CD4+ T cells. In certain embodiments, the effector memory CAR+CD4+ T cells comprise 70-80%, 70-85%, 71-86%, 72-87%, 73-88%, 74-89%, 75-90%, 76-91%, 77-92%, 78-93%, 80-90%, 82-92%, 84-94%, 86-96%, 88-98%, or 90-100% of the total amount of CAR+CD8+ T cells.

Without wishing to be bound by theory, the percentage of cells in the patient may be predictive of clinical response as shown in FIGS. 22C and 22D.

Figure 26A:
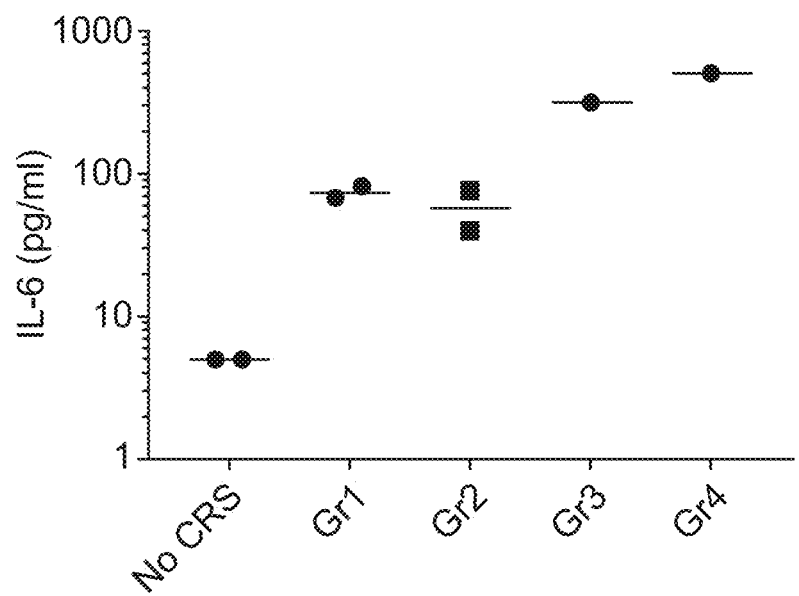
FIG. 26A is a graph showing that IL-6 serum cytokine levels correlate with CRS.
Figure 26B:
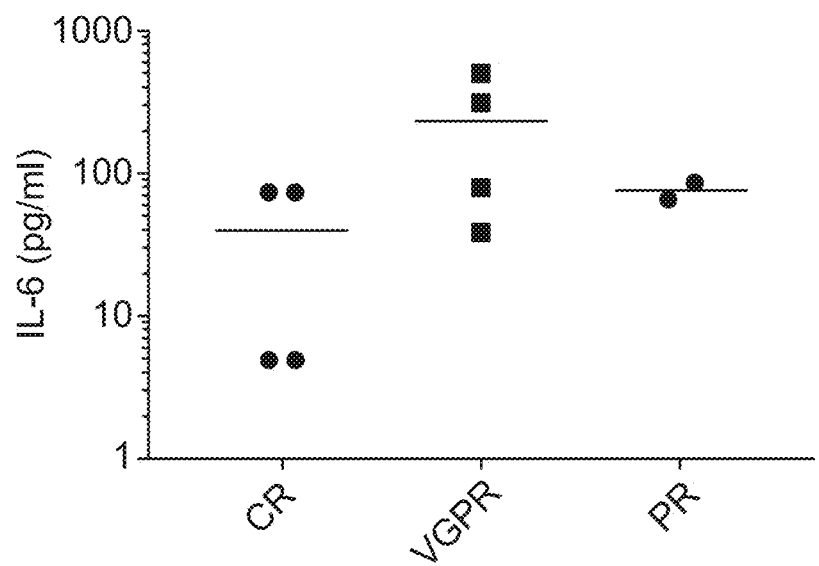
FIG. 26B is a graph showing that IL-6 serum cytokine levels do not correlate with clinical responses.
Figure 27:
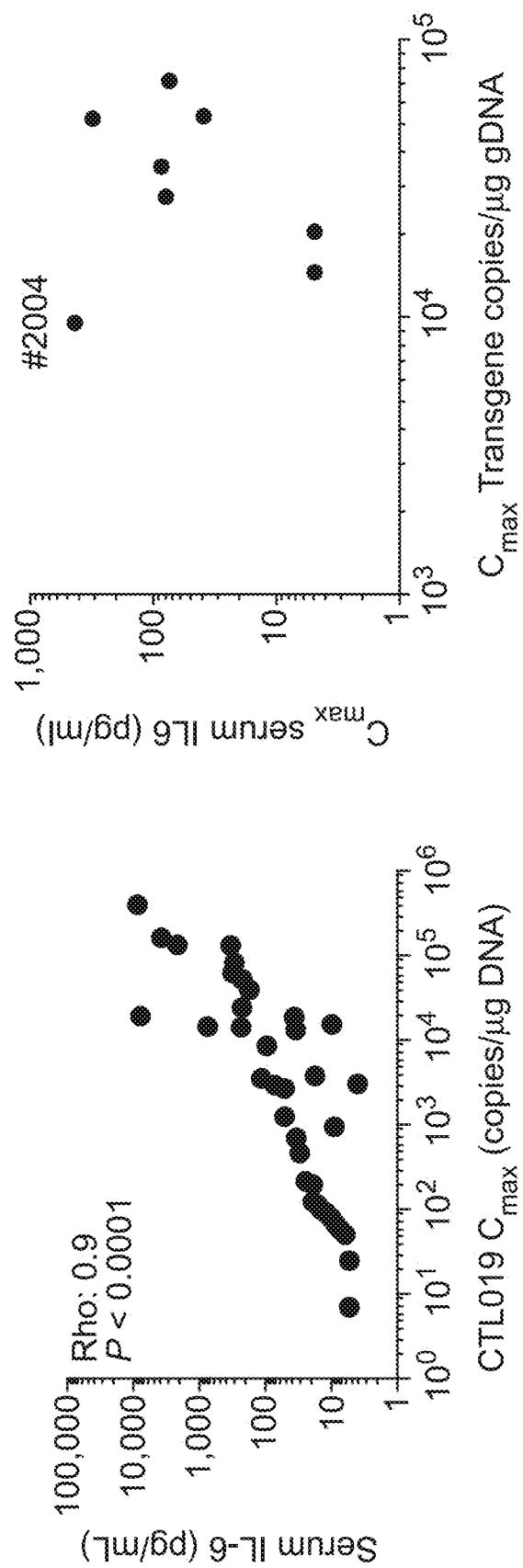
FIG. 27 illustrates data showing that IL-6 serum Cmax may correlate with peak LCAR-B38M. The left panel is a figure adapted from Fraietta et al., 2018 Nature Medicine 24, 563-71.
Figure 28:
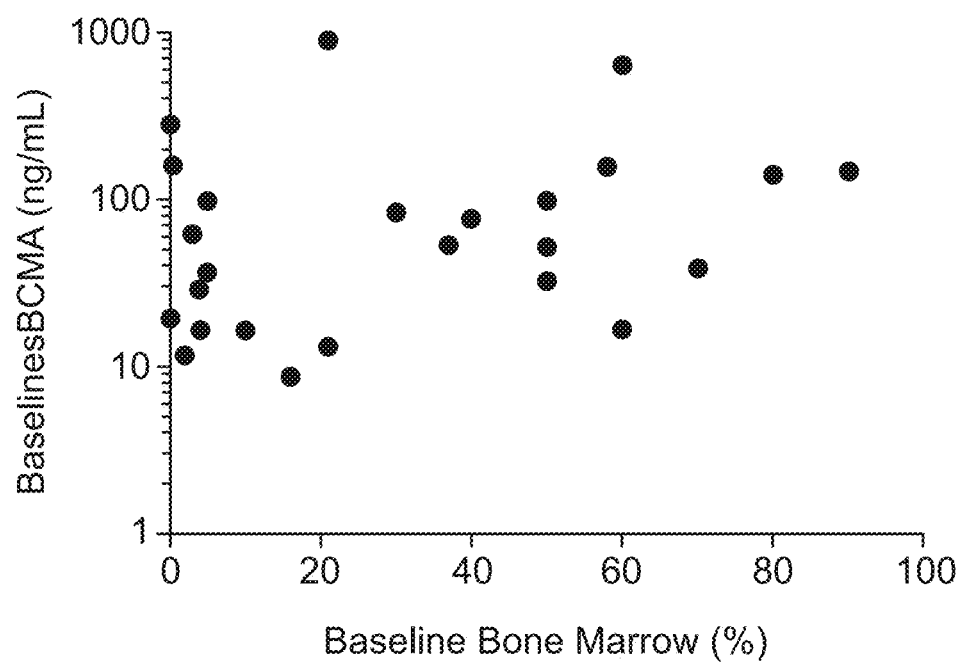
FIG. 28 illustrates data showing that levels of baseline sBCMA do not correlate with the baseline bone marrow percentage of tumor cells.
Figure 29:
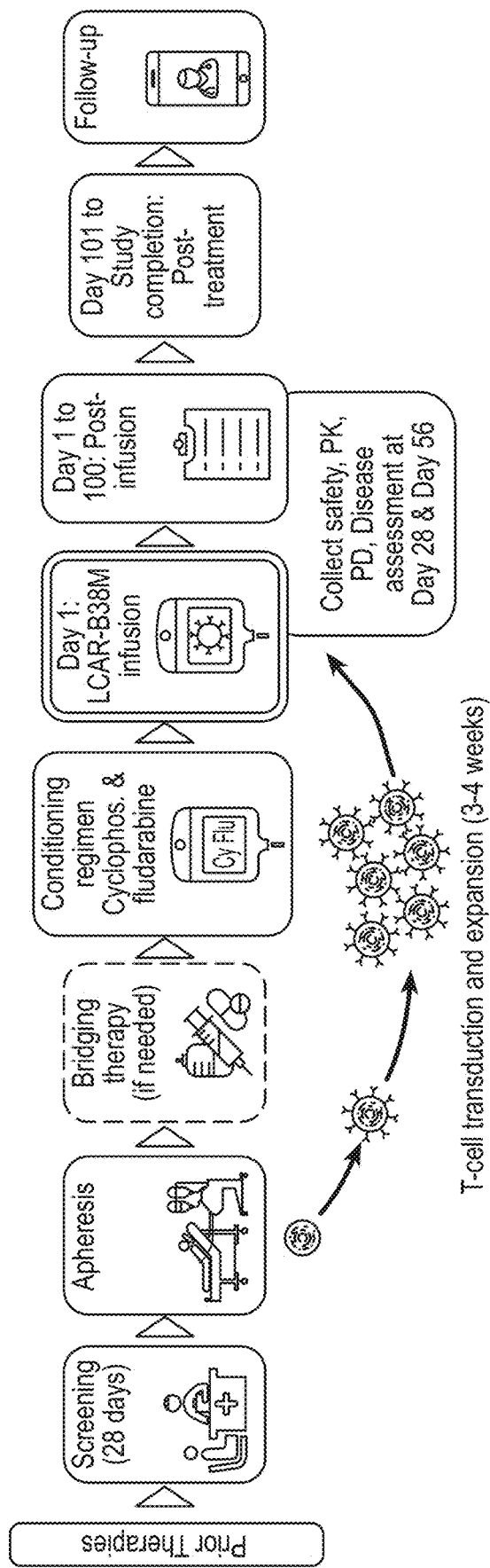
FIG. 29 illustrates a treatment protocol with LCAR-B38M, and illustrates that LCAR-B38M is a "living drug" in the dynamic environment of each individual patient.
Figure 30:
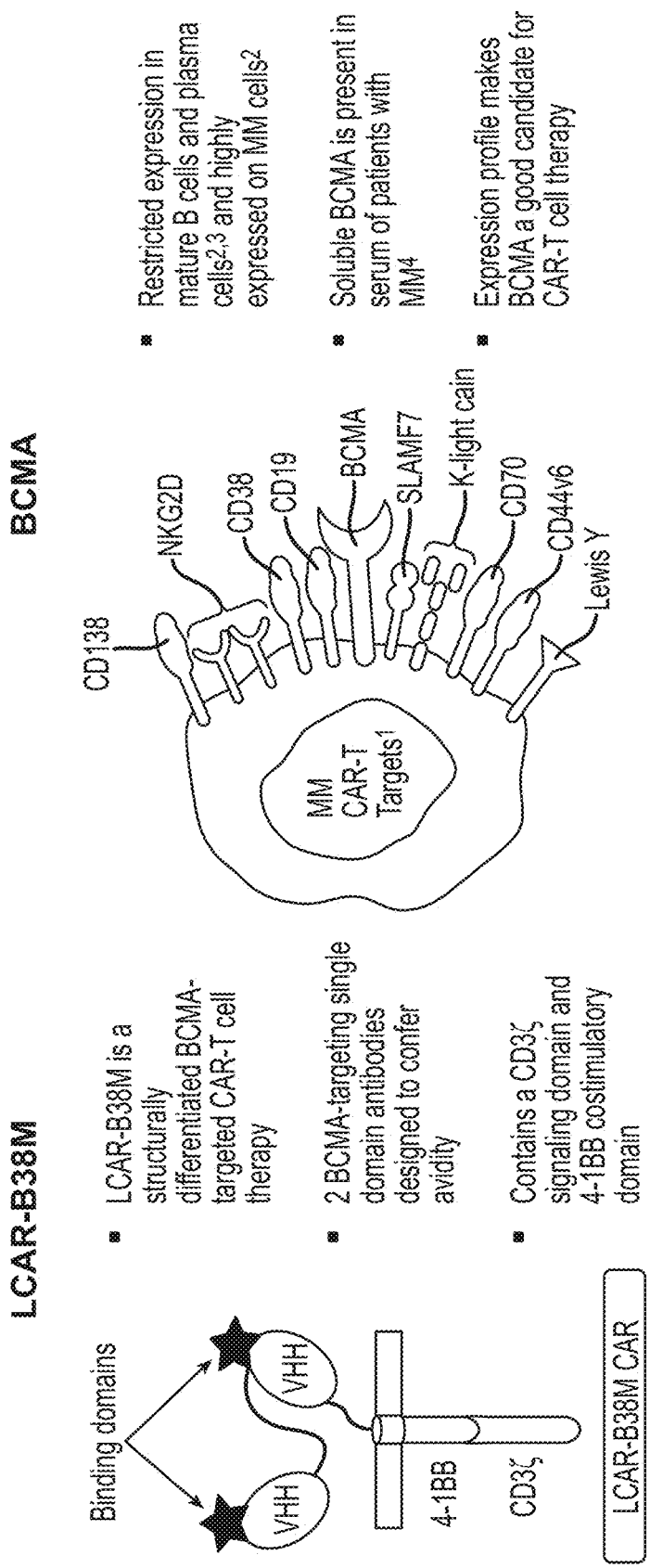
FIG. 30 illustrates LCAR-B38M is CAR-T cell therapy with two BCMA-targeting domains. See, D'Agostino Curr Hematol Malig Rep. 2017; 12:344; O'Connor J Exp Med. 2004; 199:91; Friedman Hum Gene Ther. 2018; 29:585. Sanchez Br J Haematol 2012; 158:727. BCMA=B-cell maturation antigen; CD=cluster of differentiation; MM=multiple myeloma; NKG2D=natural killer group 2D; SLAMF7=signaling lymphocytic activation molecule family member 7; VHH=single variable domain on a heavy chain.
Figure 31:
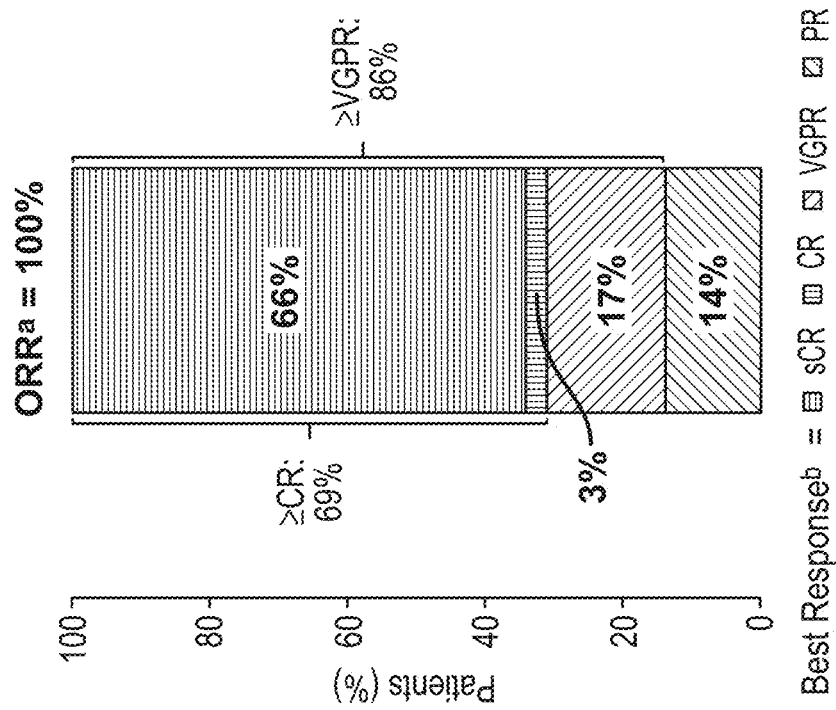
FIG. 31 illustrates overall response rate of LCAR-B38M treatment. a: PR or better; Independent Review Committee-assessed; b: No patient had stable disease or progressive disease as best response. CR=complete response; ORR=overall response rate; NGS=next generation sequencing; PR=partial response; sCR=stringent complete response; VGPR=very good partial response.
Figure 32:
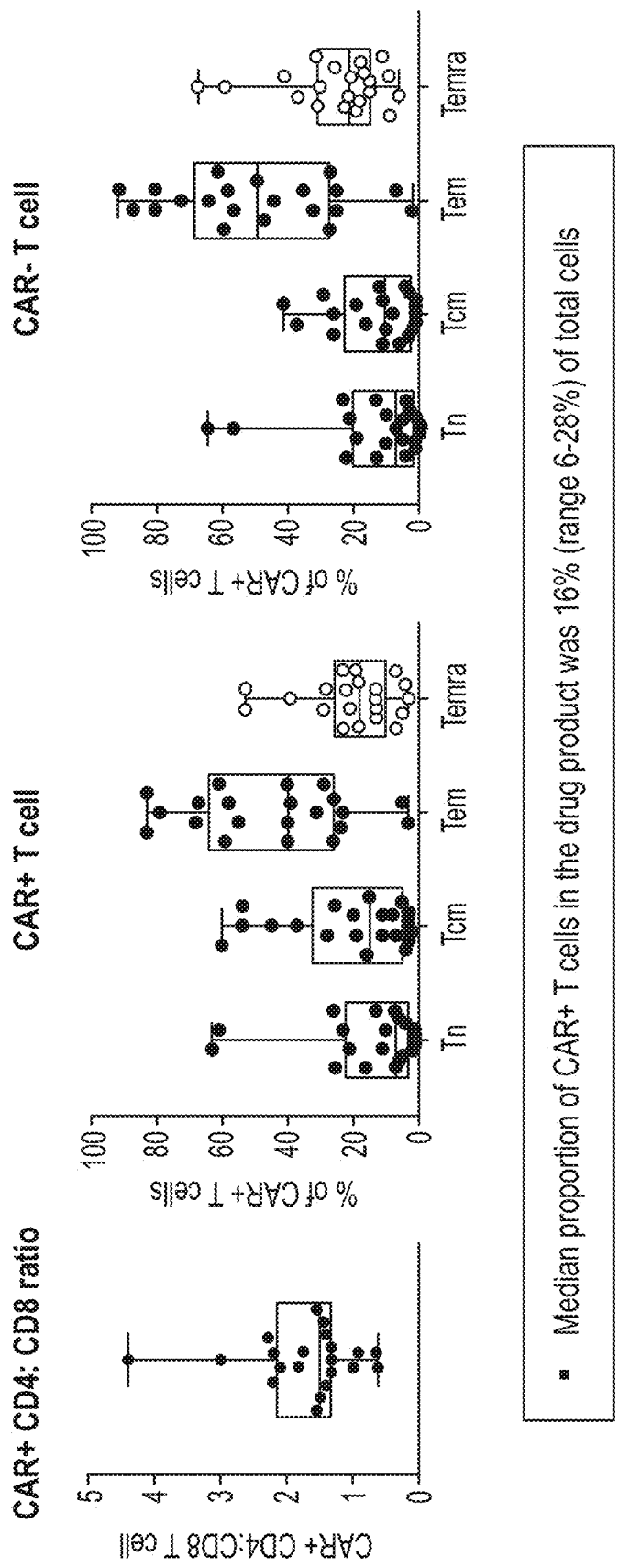
FIG. 32 illustrates that LCAR-B38M drug product is enriched in effector memory T cells. Tcm=central memory T cell; Tem=effector memory T cell; Temra=terminally differentiated T cell; Tn=naïve T cell.
Figure 33:
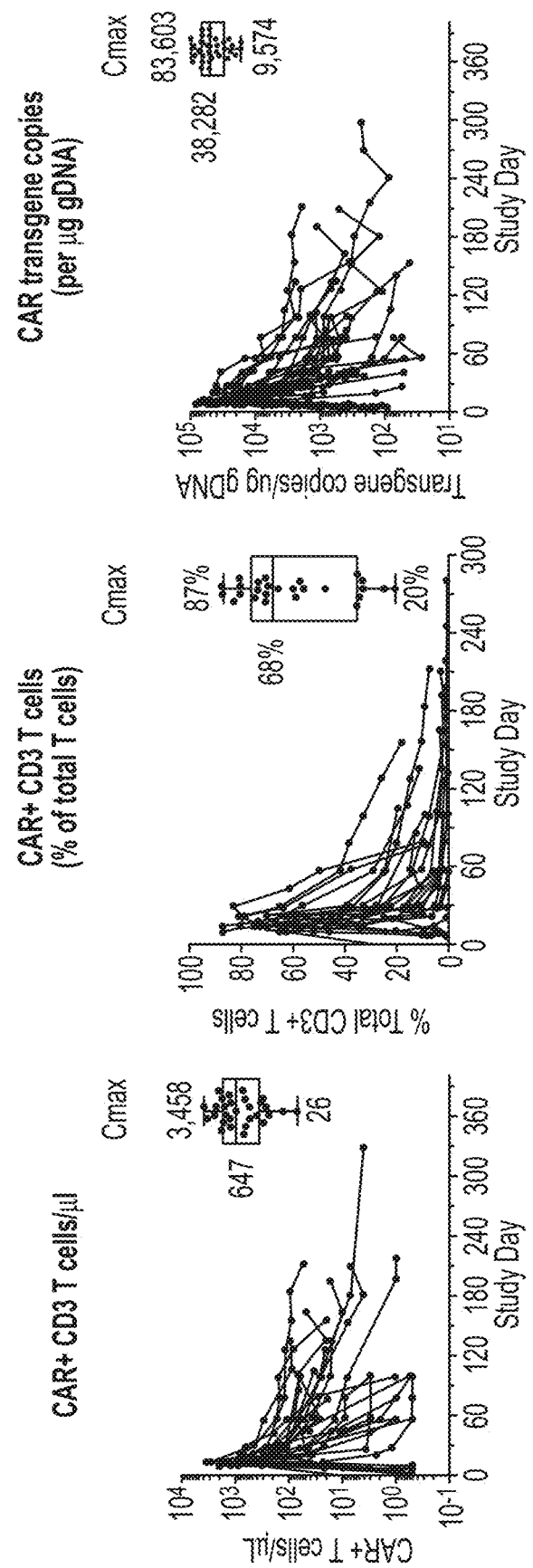
FIG. 33 illustrates that LCAR-B38M exhibits variable expansion and persistence. Detectable persistence in peripheral blood. gDNA=genomic DNA; LOQ=lower limit of quantification.
Figure 34:
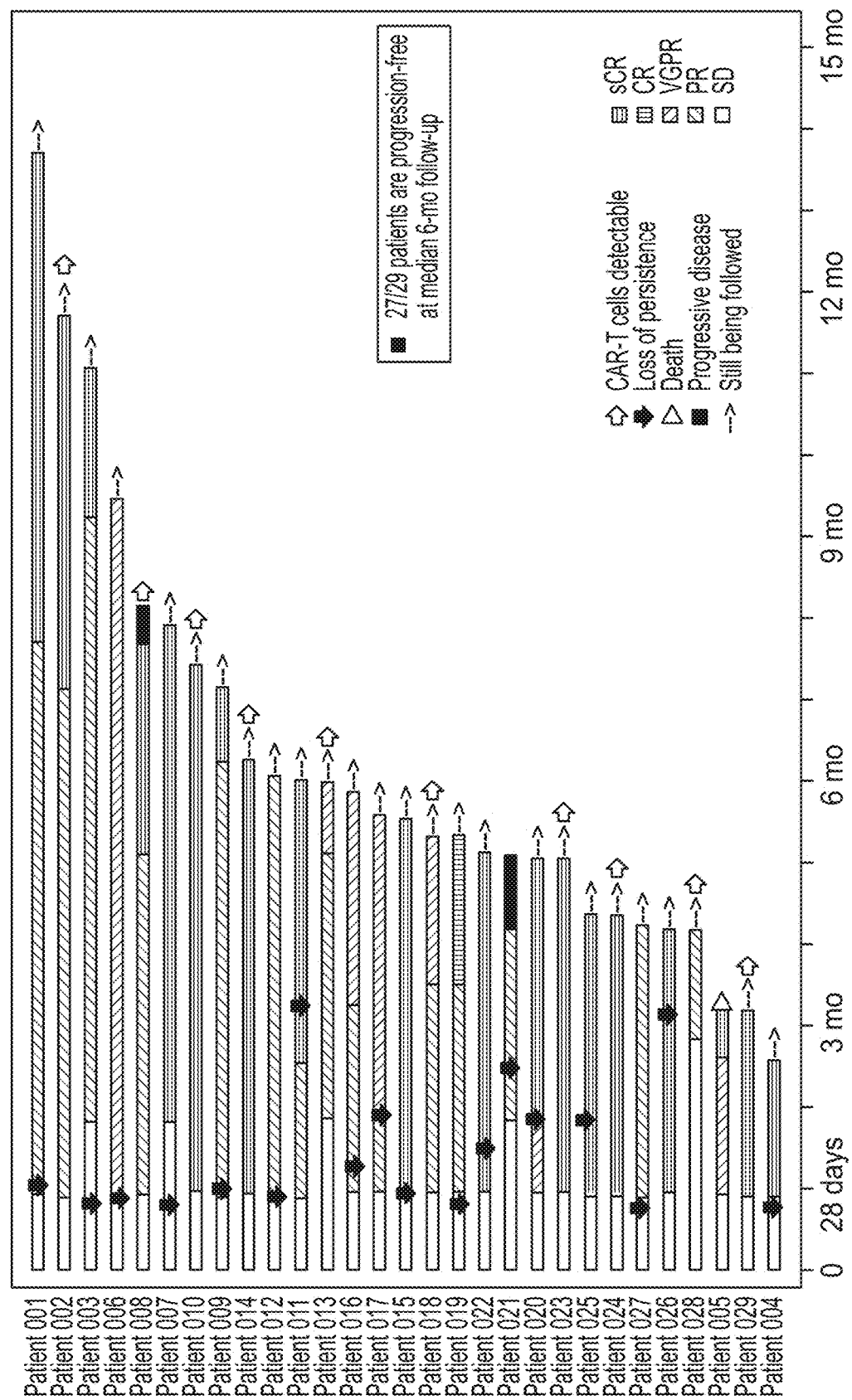
FIG. 34 illustrates durable responses after loss of persistence of LCAR-B38M in blood.
Figure 36:
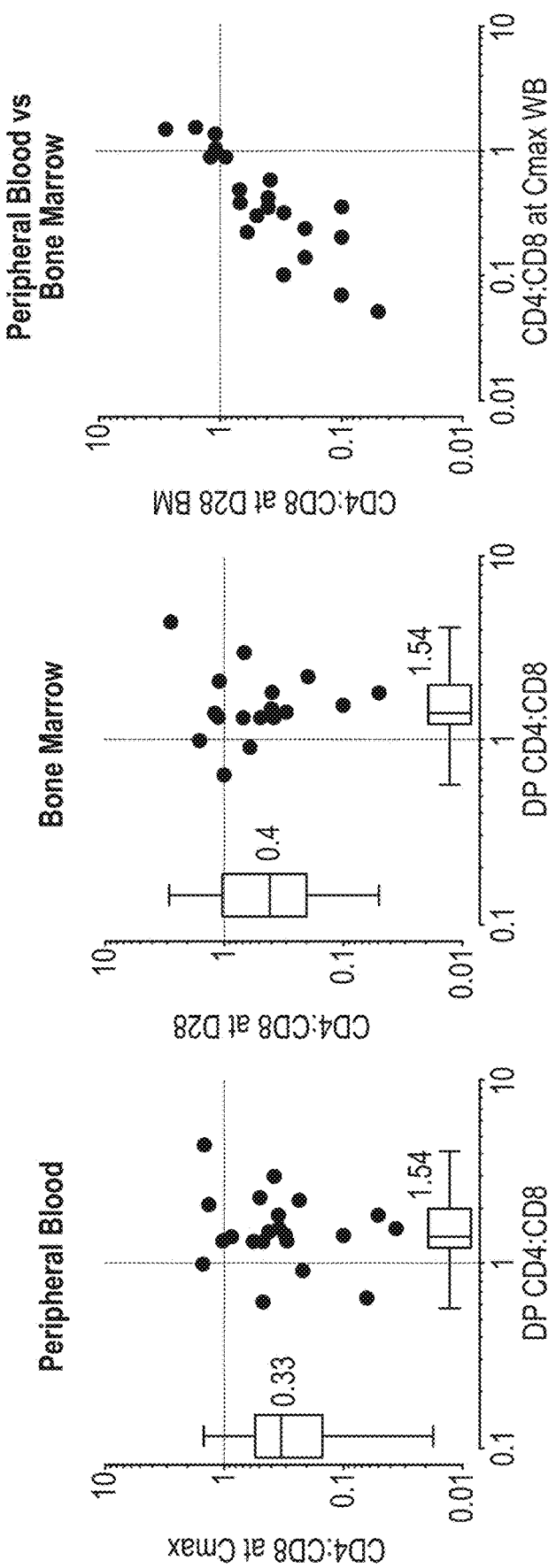
FIG. 36 illustrates preferential expansion of CAR+CD8 T cells in blood and bone marrow. DP=drug product prior to infusion; WB=whole blood.
Figure 37:
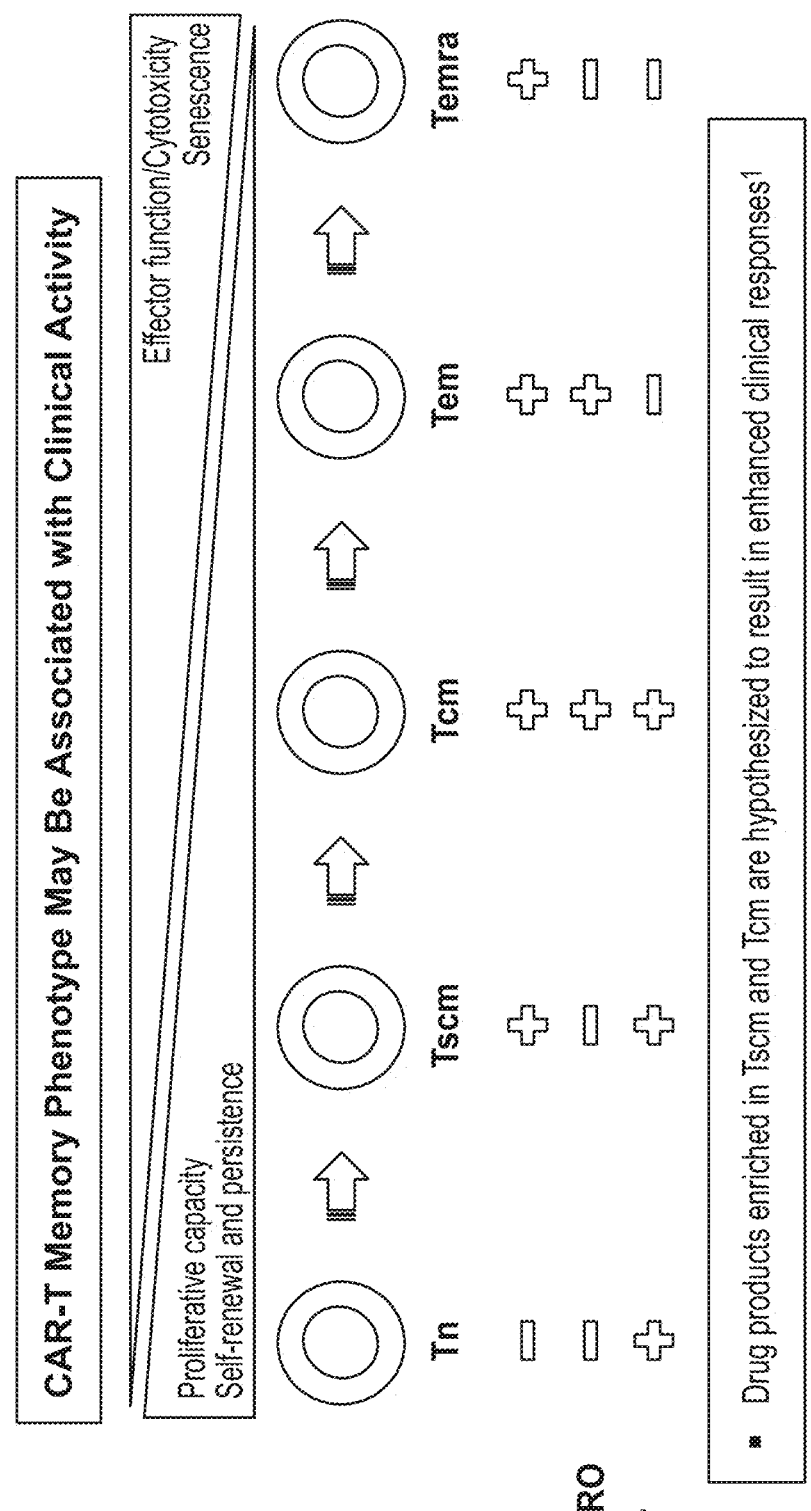
FIG. 37 illustrates that CAR-T memory phenotype may be associated with clinical activity. [1]Blaeschke Cancer Immunol Immunother 2018; 67:1053. Tscm=stem central memory T cell.
Figure 38:
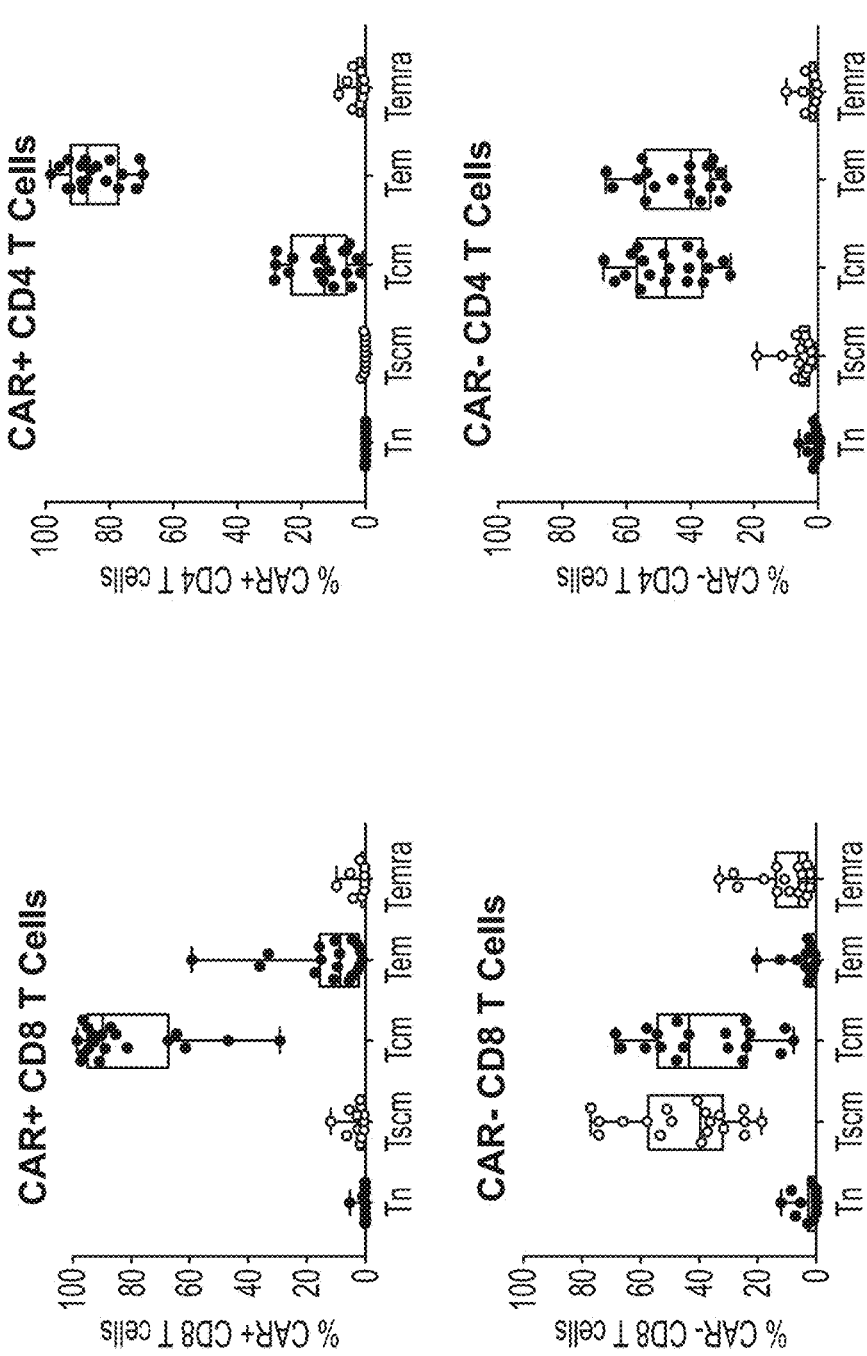
FIG. 38 illustrates that LCAR-B38M exhibits preferential expansion of CD8 central memory T cells. Analysis is at peak of expansion.
Figure 41:
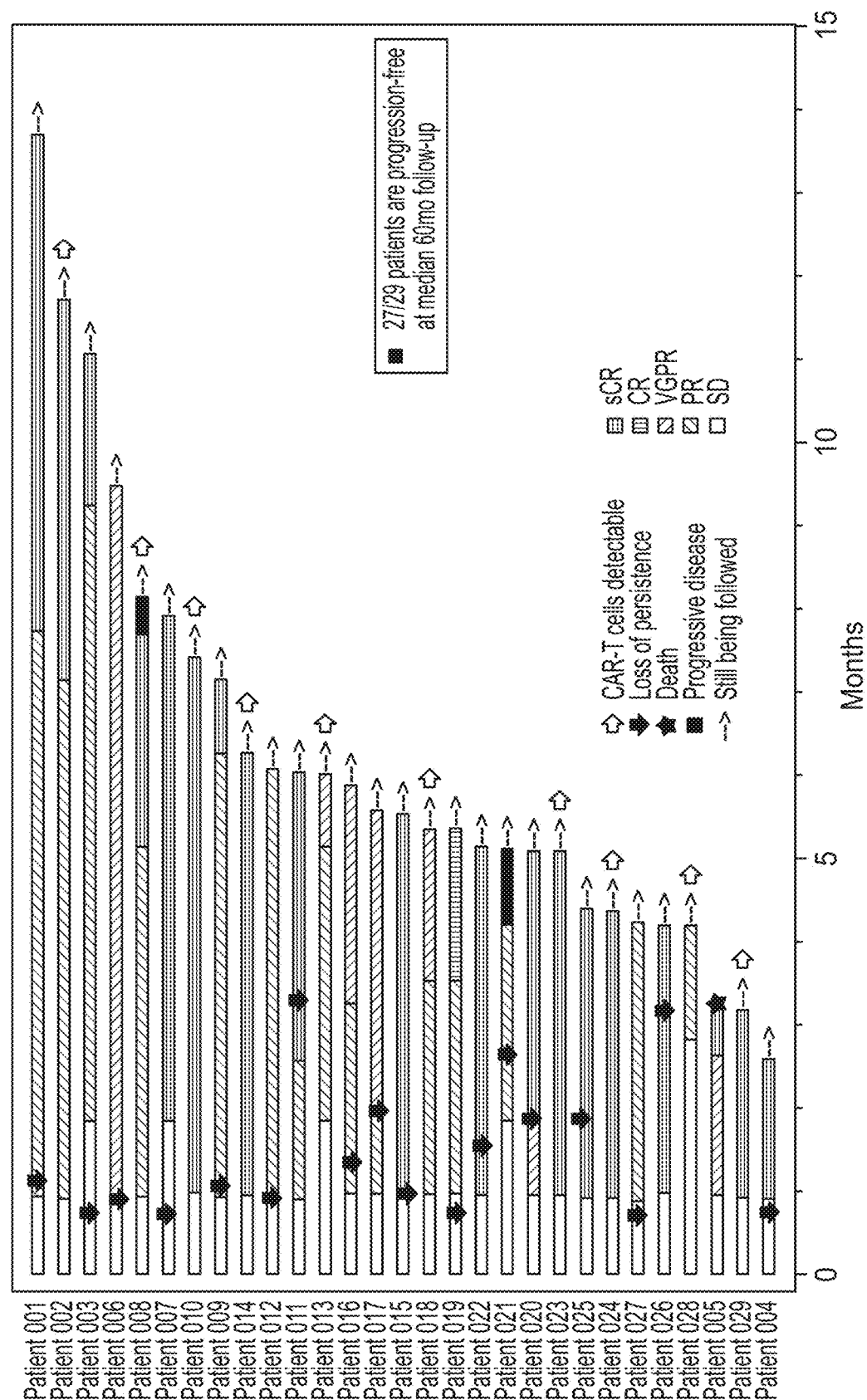
FIG. 41 illustrates durable responses after loss of persistence of LCAR-B38M in blood.

Assays of cytokines (e.g., IL-6, IFN-γ, IL-10, TNF-α, IL-2, and IL-2Rα) can be undertaken at various points during treatment, e.g., ten days before administration or infusion of the drug product (DP), at the time of administration or infusion of the DP, and any time after administration of the DP (e.g., 10 days, 20 days, 30 days, 40 days, 60 days, 80 days, and 100 days after DP administration). Without wishing to be bound by theory, IL-6 serum cytokine levels may be correlated with cytokine release syndrome but not with a clinical response, as shown in the data of FIGS. 26A and 26B.

Kits and Articles of Manufacture

Any of the compositions described herein may be comprised in a kit. in some embodiments, engineered immortalized CAR-T cells are provided in the kit, which also may include reagents suitable for expanding the cells, such as media.

In a non-limiting example, a chimeric receptor expression construct, one or more reagents to generate a chimeric receptor expression construct, cells for transfection of the expression construct, and/or one or more instruments to obtain immortalized T cells for transfection of the expression construct (such an instrument may be a syringe, pipette, forceps, and/or any such medically approved apparatus).

In some aspects, the kit comprises reagents or apparatuses for electroporation of cells.

In some embodiments, the kit comprises artificial antigen presenting cells.

The kits may comprise one or more suitably aliquoted compositions of the present invention or reagents to generate compositions of the invention. The components of the kits may be packaged either in aqueous media or in lyophilized form. The container means of the kits may include at least one vial, test tube, flask, bottle, syringe, or other container means, into which a component may be placed, and preferably, suitably aliquoted. Where there is more than one component in the kit, the kit also will generally contain a second, third, or other additional container into which the additional components may be separately placed. However, various combinations of components may be comprised in a vial. The kits of the present invention also will typically include a means for containing the chimeric receptor construct and any other reagent containers in close confinement for commercial sale. Such containers may include injection or blow molded plastic containers into which the desired vials are retained, for example.

EXAMPLES

The following example is provided to further describe some of the embodiments disclosed herein. The example is intended to illustrate, not to limit, the disclosed embodiments.

Example 1

Figure 2A:
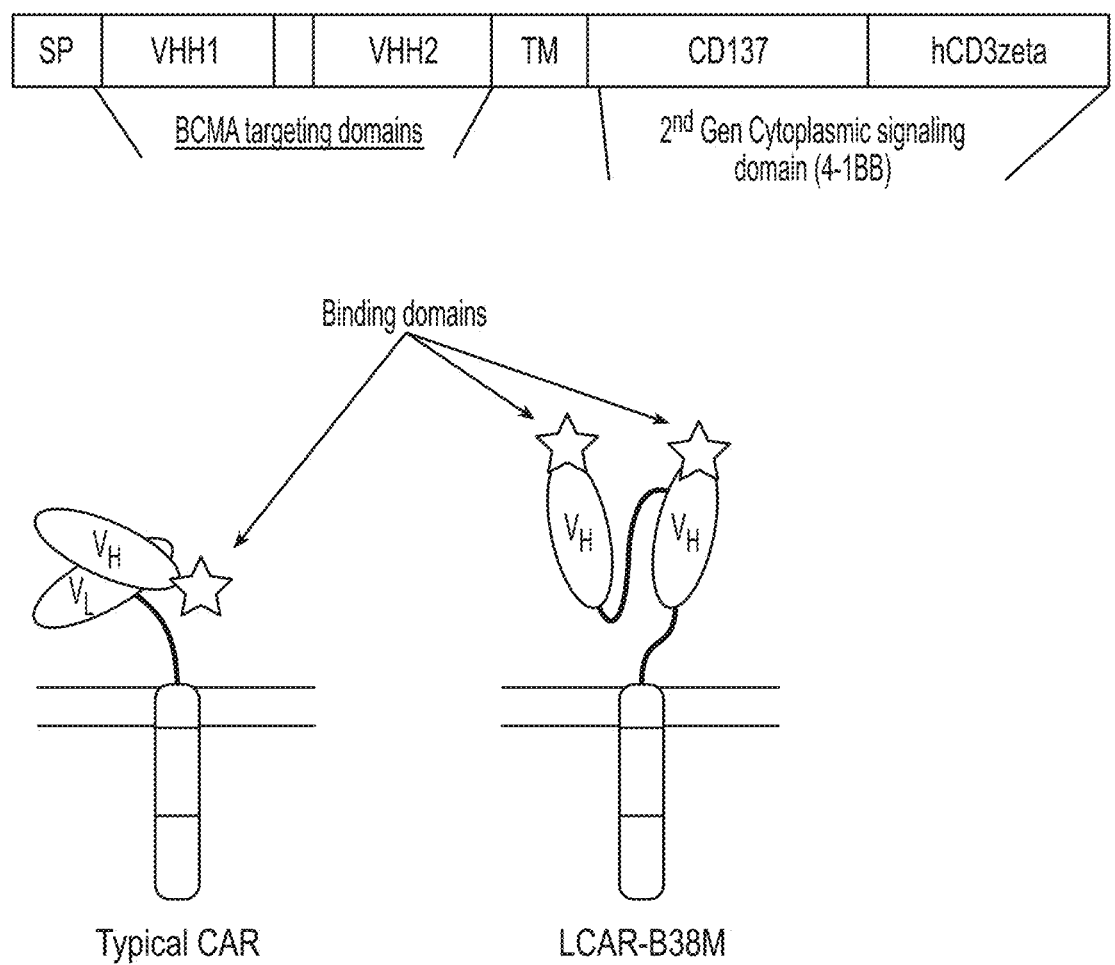
FIG. 2A shows the design of the LCAR-B38M CAR. LCAR-B38M comprises two VHH domains connected through a linker, as opposed to a single VL domain and a single VH domain found on various other CARs. LCAR-B38M comprises intracellular CD137 and human CD3ζ domains.

LCAR-B38M (JNJ-4528) is a chimeric antigen receptor T cell (CAR-T) therapy containing two B-cell maturation antigen (BCMA)-targeting single-domain antibodies designed to confer avidity. A map of the construct, and a schematic for LCAR-B38M is shown in FIG. 2A. The LCAR-B38M construct used to make the LCAR-B38M cells tested herein comprises the sequences listed in Table 2:

TABLE 2

| CAR element | Amino Acid sequence |
| --- | --- |
| CD8α signal peptide, CD8α SP | MALPVTALLLPLALLLHAARP (SEQ ID NO: 6) |
| BCMA binding domain | VHH1 (A37353) aa sequence<br>QVKLEESGGGLVQAGRSLRLSCAASEHTFSSHVMG<br>WFRQAPGKERESVAVIGWRDISTSYADSVKGRFTI<br>SRDNAKKTLYLQMNSLKPEDTAVYYCAARRIDAAD<br>FDSWGQGTQVTVSS (SEQ ID NO: 1)<br>G4S linker aa sequence<br>GGGGS (SEQ ID NO: 5)<br>VHH2 (A37917) aa sequence<br>EVQLVESGGGLVQAGGSLRLSCAASGRTFTMGWFR<br>QAPGKEREFVAAISLSPTLAYYAESVKGRFTISRD<br>NAKNTVVLQMNSLKPEDTALYYCAADRKSVMSIRP<br>DYWGQGTQVTVSS (SEQ ID NO: 3) |
| CD8α hinge | TTTPAPRPPTPAPTIASQPLSLRPEACRPAAGGAV<br>HTRGLDFACD (SEQ ID NO: 15) |
| CD8α transmembrane | IYIWAPLAGTCGVLLLSLVITLYC (SEQ ID NO: 8) |
| CD137 Cytoplasmic | KRGRKKLLYIFKQPFMRPVQTTQEEDGCSCRFPEE<br>EEGGCEL (SEQ ID NO: 12) |
| CD3ζ Cytoplasmic | RVKFSRSADAPAYQQGQNQLYNELNLGRREEYDVL<br>DKRRGRDPEMGGKPRRKNPQEGLYNELQKDKMAEA<br>YSEIGMKGERRRGKGHDGLYQGLSTATKDTYDALH<br>MQALPPR (SEQ ID NO: 10) |

Figure 2B:
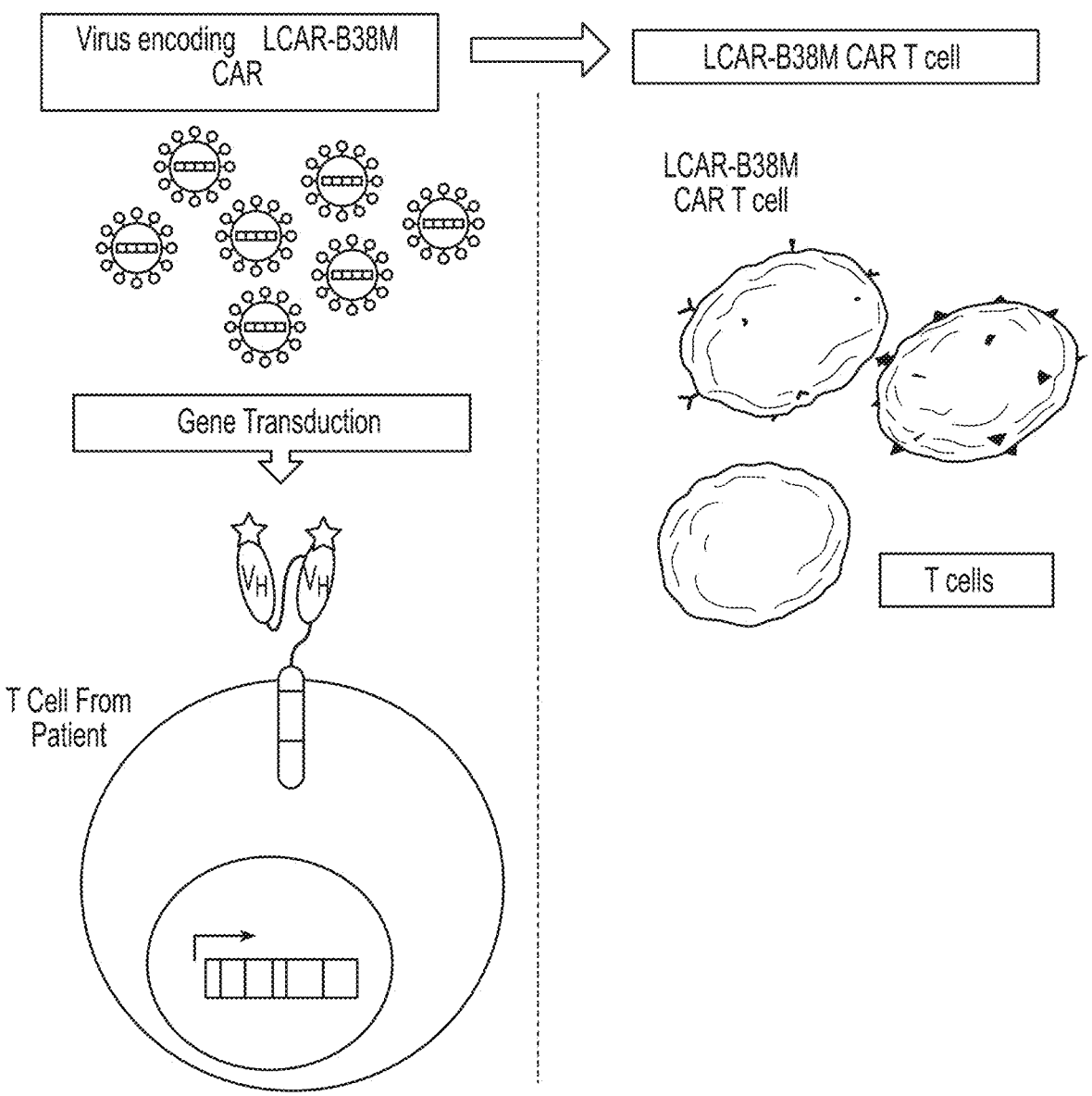
FIG. 2B shows a schematic for preparing virus encoding LCAR-B38M CAR, transduction of the virus into a T cell from the patient, and then preparation of CAR T cells expressing LCAR-B38M.
Figure 3:
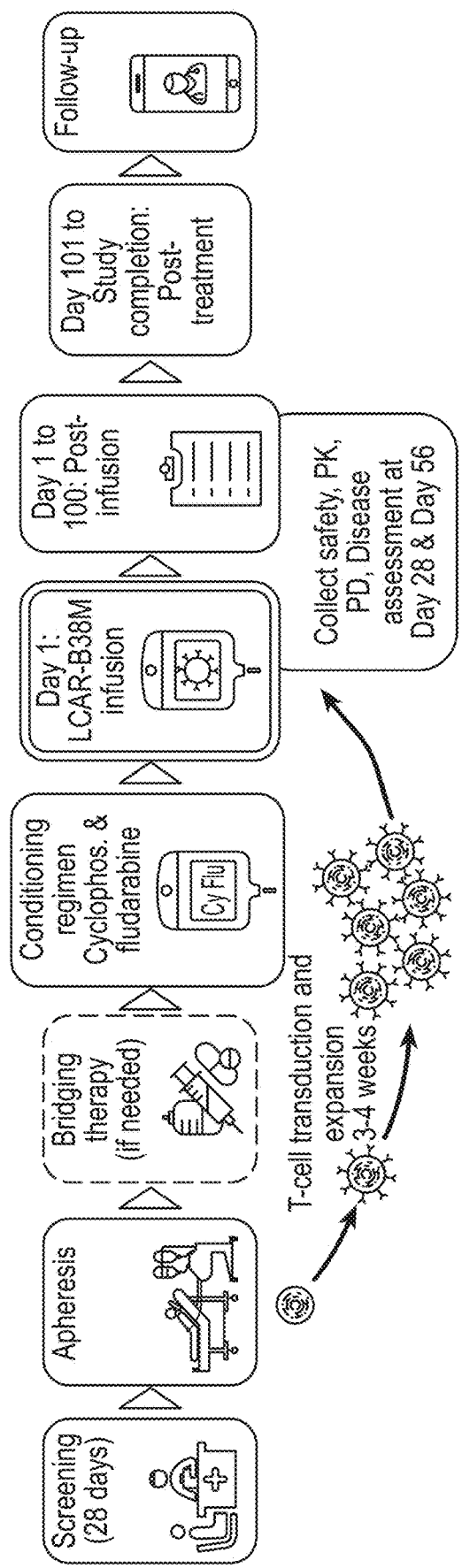
FIG. 3 shows a schematic of the MMY2001 study design for LCAR-B38M CAR T-cells (LCAR-B38M). The patient population includes those with relapsed or Refractory Multiple Myeloma, with 3 prior lines or double refractory to proteasome inhibitors (PI)/immunomodulatory drugs (IMiD) and prior PI, IMiD, uCD38 exposure. A primary objective is safety and establishment of recommended phase II dose (RP2D), such as studying incidence and severity of adverse events (Phase 1b). Another primary objective is efficacy: overall response rate (ORR)—partial response (PR) or better as defined by International Myeloma Working Group (IMWG) (Phase 2). The following are secondary objectives: Incidence and severity of adverse events (Phase 2), assessment of immunogenicity, PRO post-treatment and health-related quality of life (HRQoL) assessment, characterization of pharmacokinetics (PK) and pharmacodynamics (PD), and any further efficacy characterization.
Figure 6:
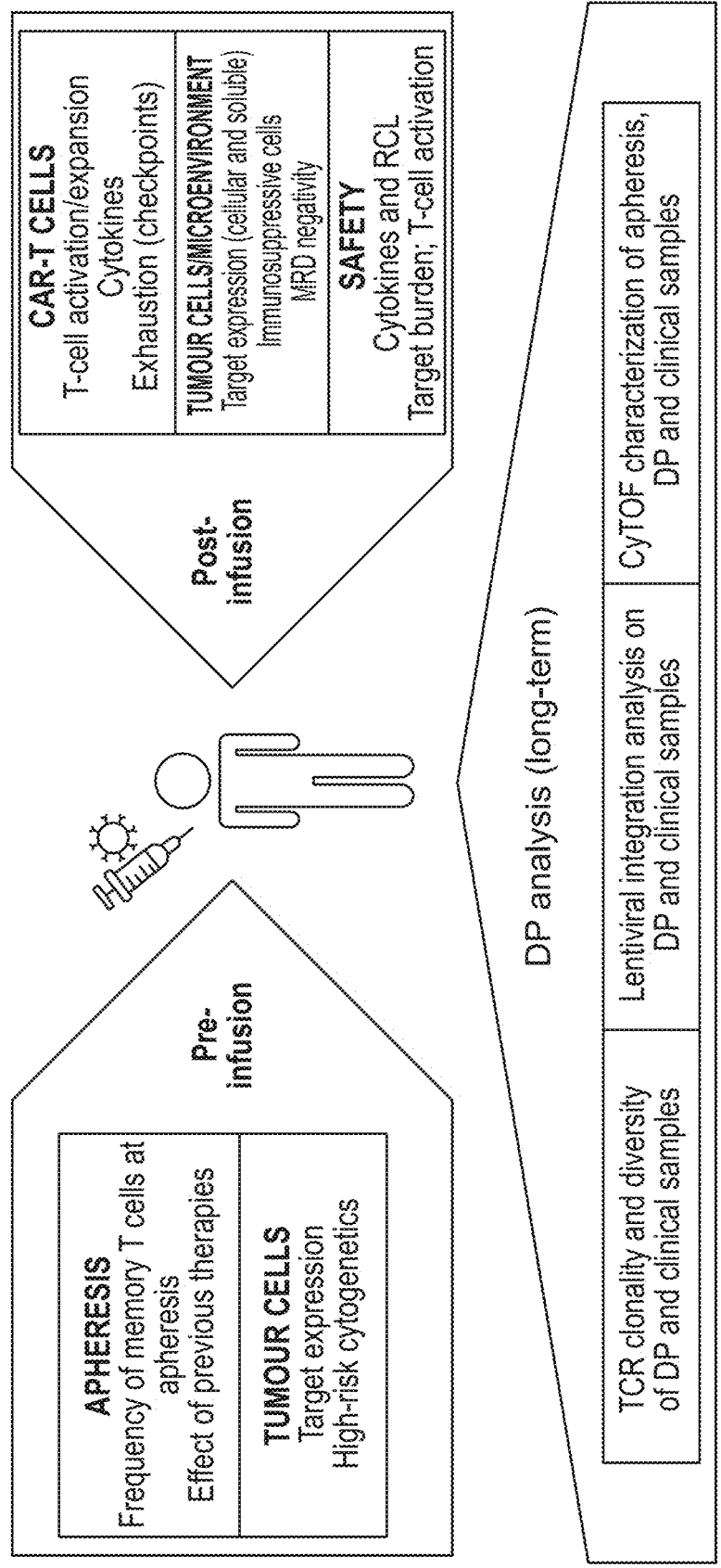
FIG. 6 summarizes translational research for CAR-T cell therapy in the study MMY2001.
Figure 7:
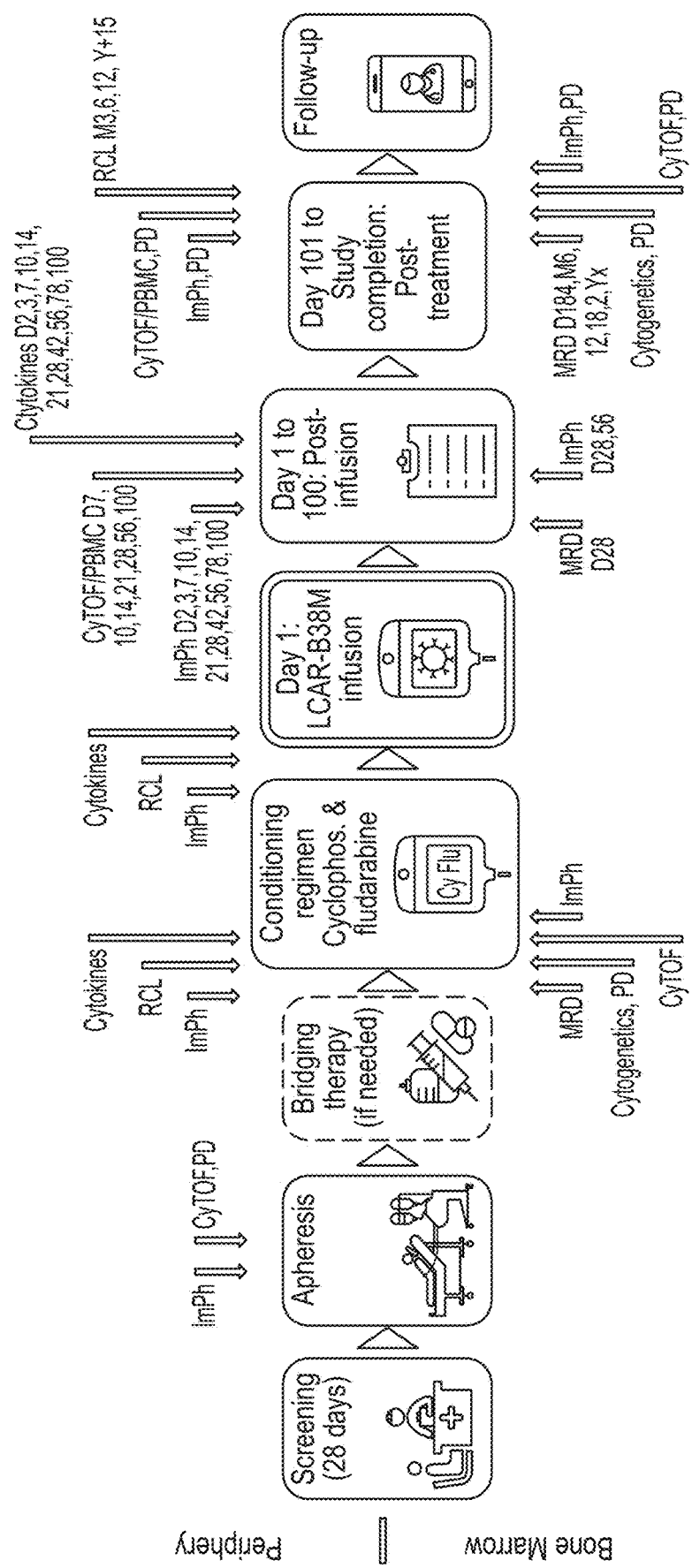
FIG. 7 summarizes the various biomarker assessments performed in the MMY2001 study.

Apheresis samples were collected from 25 patients, and Tcells were selected and transduced with a lentivirus encoding the BCMA CAR construct expressing the LCAR-B38M CAR. A schematic of the experiment is shown in FIG. 2B. The 25 patients were then followed in the MW2001 study as outlined in FIG. 3. The patient population included those with relapsed or Refractory Multiple Myeloma, with 3 prior lines or double refractory to PI/IMiD and prior PI, IMiD, αCD38 exposure. A primary objective of the MMY2001 study was safety and establishment of RP2D, such as studying incidence and severity of adverse events (Phase 1b). Another primary objective is efficacy: Objective Response Rate (ORR) as partial response (PR) or better as defined by IMWG (Phase 2). The following are secondary objectives: incidence and severity of adverse events (Phase 2), assessment of immunogenicity, PRO post-treatment and HRQoL assessment, characterization of PK and PD, and any further efficacy characterization. The clinical responses from the patients is summarized in FIG. 4.

While the T cells were transduced and expanded over an approximately 3-4 week period, the 25 patients underwent bridging therapy (as needed) and a conditioning regimen with cyclophosphamide and fludarabine. During this period, various assays of the patients' T cells were undertaken. Immune cell composition of both the apheresis samples and transduced cells following expansion (referred to herein as the "drug product" or "DP") was evaluated by multiparametric flow cytometry.

Figure 19:
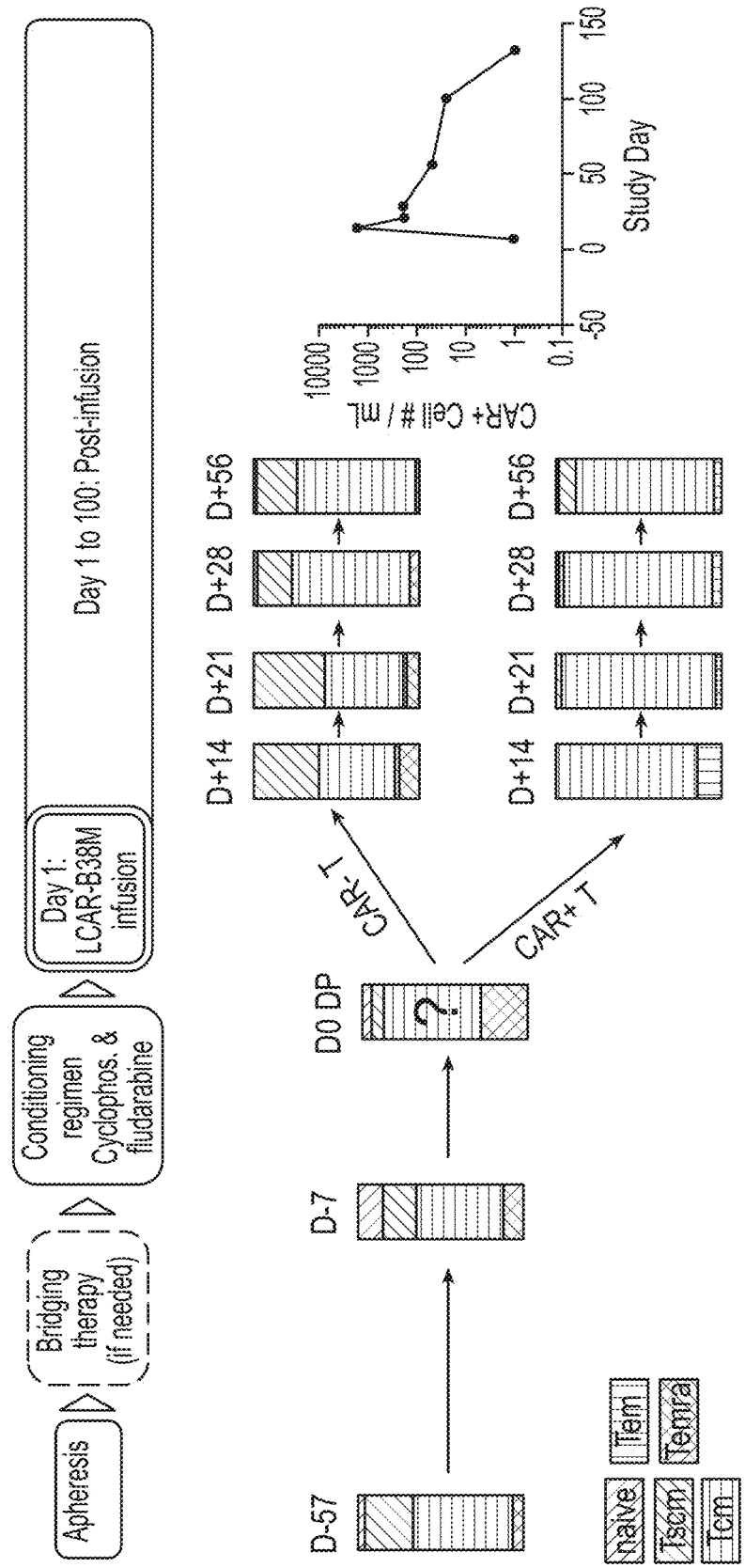
FIG. 19 shows the results of phenotypic characterization of patients' cells (in MMY2001) study before infusion at Days −57 and −7, and post-infusion of the MMY2001 CAR-T cells at days 14, 21, 28 and 56. The phenotypes of both the CAR-T+ and the CAR-T-cells were characterized at days 14, 21, 28 and 56. It is apparent that the CAR-T+ cells are substantially more enriched for central memory cells (Tcm) as compared to the CAR-T− cells. From day 21 to days 28 and 56, the CAR-T+ cells become more enriched for stem memory cells (Tscm) as compared with the Tcm cells.

The median proportion of CAR+ T cells in the DP was 16% (range 6-28%) of total cells, with a median proportion of 12% (range 4-22%) CD4+ CAR+ and 7% (range 3-20%) CD8+ CAR+ T cells. The CD4:CD8 ratio of CAR+ T cells in the DP was assayed, with results shown in FIG. 14B on the X-axis. The phenotype of patients' T cells was also assayed before infusion, as shown in FIG. 19. Significant variability between patients was observed in the composition of the DP regarding T cell subsets (i.e., naïve, Tscm, Tcm, Tem, Teff, and Temra) although this profile was comparable in the CAR- and CAR+ T cell subpopulations within each patient.

Patients were administered a single infusion of the LCAR-B38M DP at a target dose of $0.75 \times 10^6$ CAR+ T cells/kg (target range $0.5-1.0 \times 10^6$) (see Table 3 (Phase 1b)). Of the 21 patients with a postbaseline disease evaluation, the overall response rate was 91% at a median follow-up of 3 months (range 1-10). Among the 15 patients with post-infusion day 28 evaluable bone marrow (BM) samples by next generation flow cytometry and/or next generation sequencing, 10 were minimal residual disease negative at the 10−5 level of sensitivity, 2 at 10−4 level of sensitivity, and 3 had unidentified clones. All patients expressed BCMA in BM tumor cells at baseline, as assessed by flow cytometry, although levels varied among patients. Clinical responses appear independent of BM BCMA expression.

The Cmax was assayed, as well as the degree of expansion and persistence of LCAR-B38M in whole blood over the study period. Without wishing to be bound by theory, Cmax associates with response (duration or depth). The degree of sufficiency and insufficiency of cell expansion at peak can provide information to improve dose scalation. Persistence associates with response (duration or depth). The degree of sufficiency and insufficiency of persistence can provide information to improve dose regimen. The features in the drug product (DP) also can provide information on expansion or persistence.

Figure 8A:
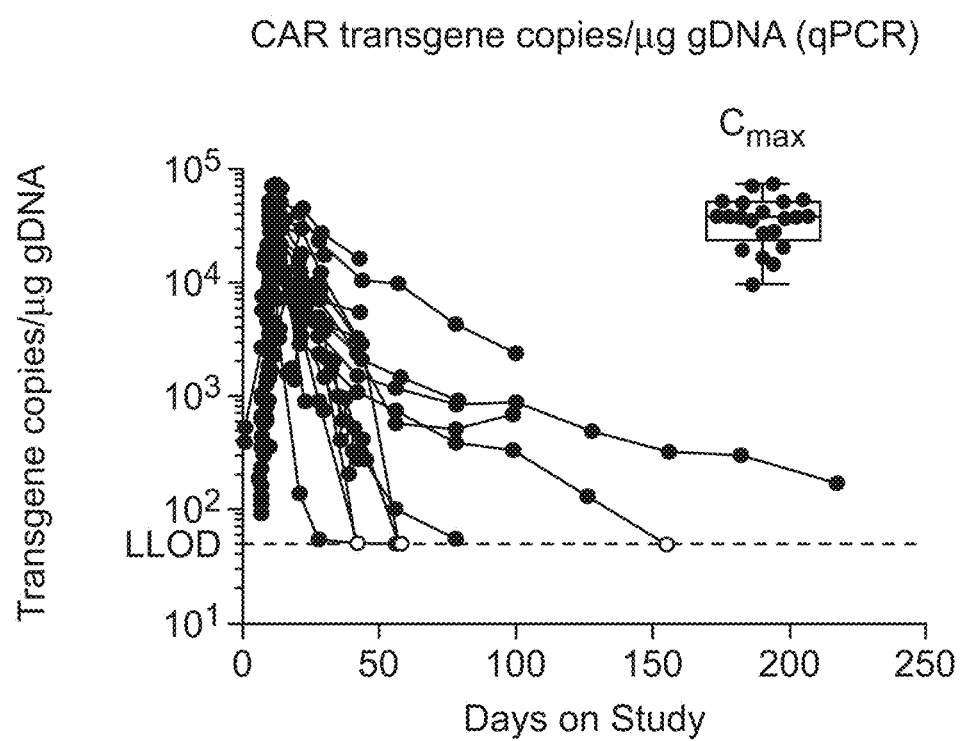
FIG. 8A is a graph showing, for each patient in the MMY2001 study, the results of a qPCR assay for the number of transgene copies per microgram gDNA. The Cmax and time of peak of expansion (Tmax) can be ascertained from the graph. The Cmax is highly variable among patients, while the Tmax is consistent among patients. The empty dots indicate that the number of CAR+ T cells in 11 of the 16 patients with at least eight weeks followup are less than the lower limit of quantitation (LLOQ) (5 cells/µl; range 2-7).
Figure 8B:
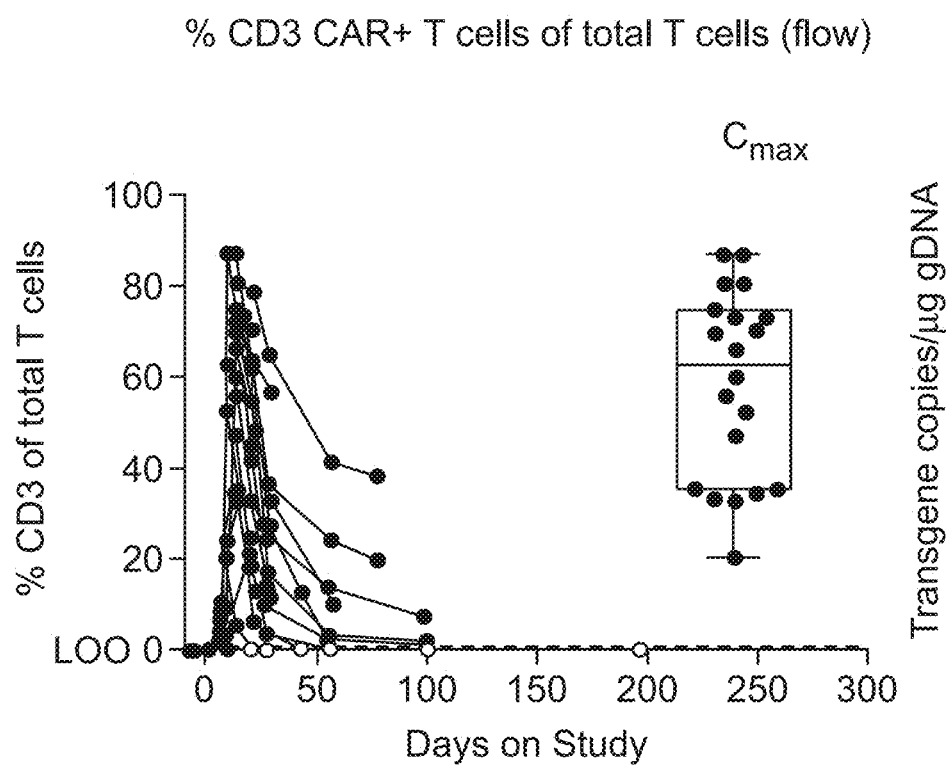
FIG. 8B is a graph showing, for each patient in the MMY2001 study, the results of a flow cytometry assay for the percentage of CD3 CAR+ T cells in total T cells. The Cmax and time of peak of expansion (Tmax) can be ascertained from the graph. The Cmax is highly variable among patients, while the Tmax is consistent among patients. The empty dots indicate that the number of CAR+ T cells in 11 of the 16 patients with at least eight weeks followup are less than LLOQ (5 cells/µl; range 2-7).
Figure 8C:
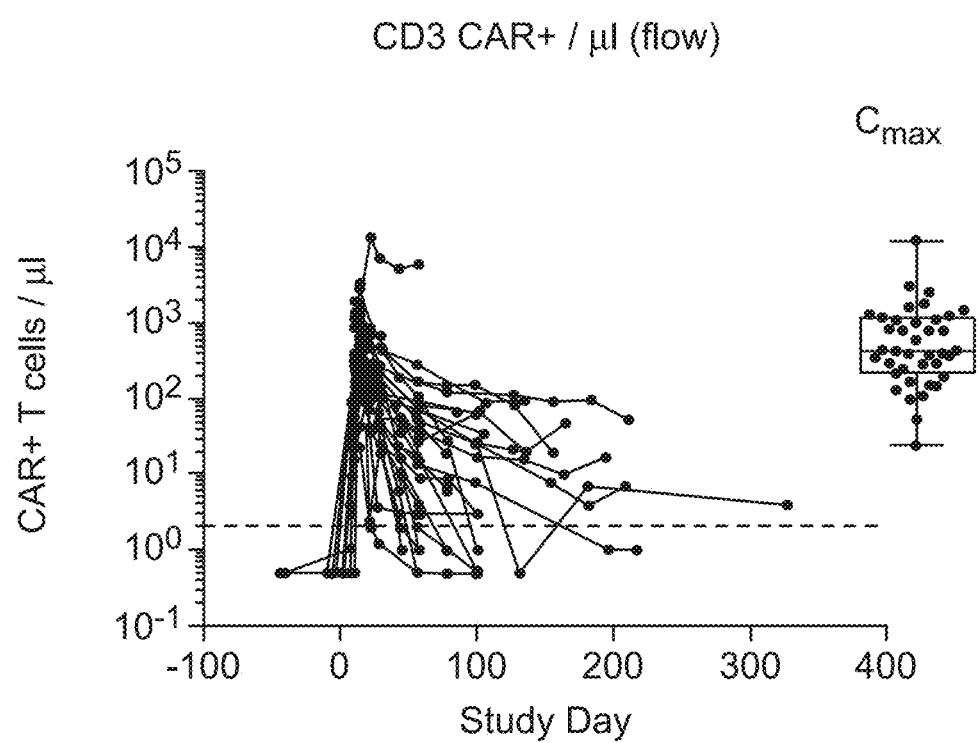
FIG. 8C is a graph showing, for each patient in the MMY2001 study, the results of a flow cytometry assay indicating the number of CAR+CD3 T cells per microliter. The Cmax and time of peak of expansion (Tmax) can be ascertained from the graph. The Cmax is highly variable among patients, while the Tmax is consistent among patients. The empty dots indicate that the number of CAR+ T cells in 11 of the 16 patients with at least eight weeks followup are less than LLOQ (5 cells/µl; range 2-7).
Figure 9A:
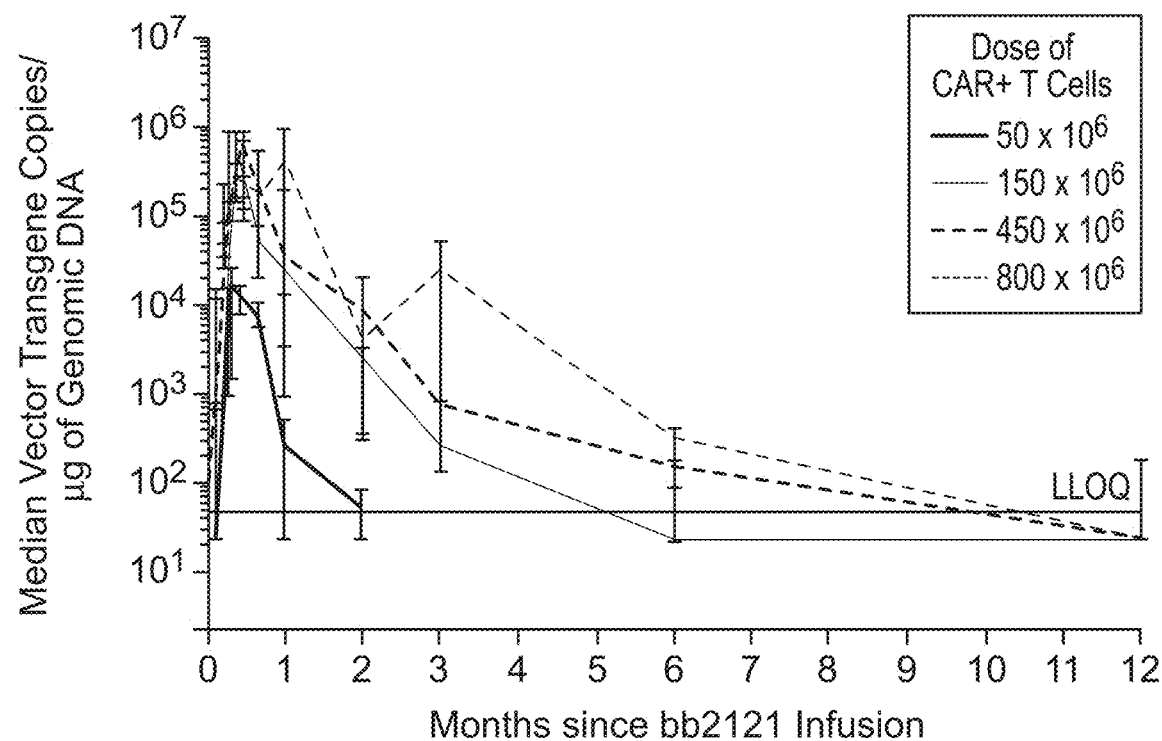
FIG. 9A shows the results of an assay indicating that bb2121 CAR-T expansion and persistence are dose-dependent. $5.0 \times 10^7$ cells did not persist above LLOQ after 2 months. Greater persistence was seen with $1.50 \times 10^8$-$8.00 \times 10^8$ cells.
Figure 9B:
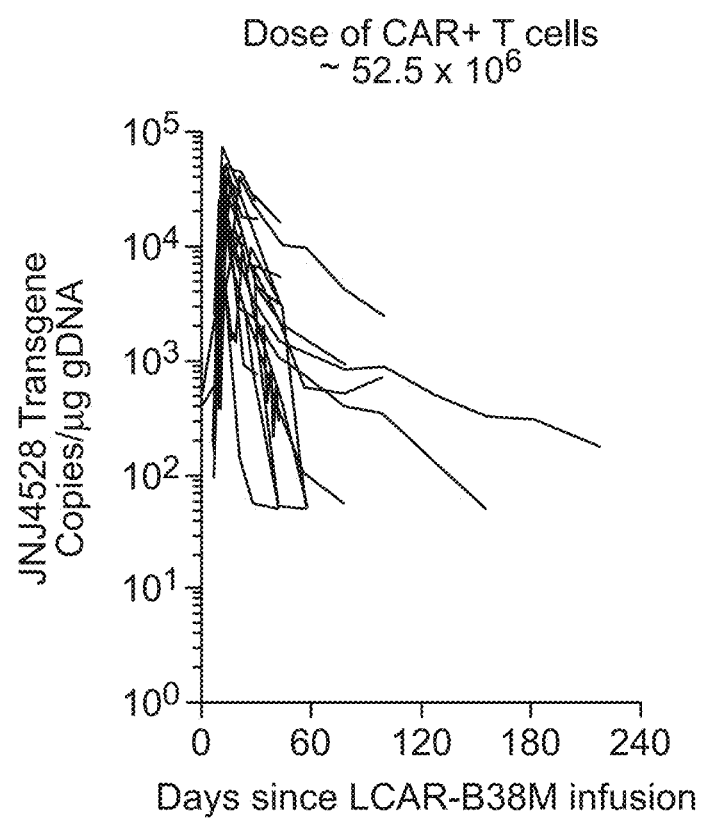
FIG. 9B shows the results of an assay of LCAR-B38M persistence at $5.25 \times 10^7$ cells, which corresponds to $0.75 \times 10^6$ CAR-positive viable T cells/kg. The persistence is similar that seen with $5.0 \times 10^7$ cells in the bb2121 assay of FIG. 9A.
Figure 10B:
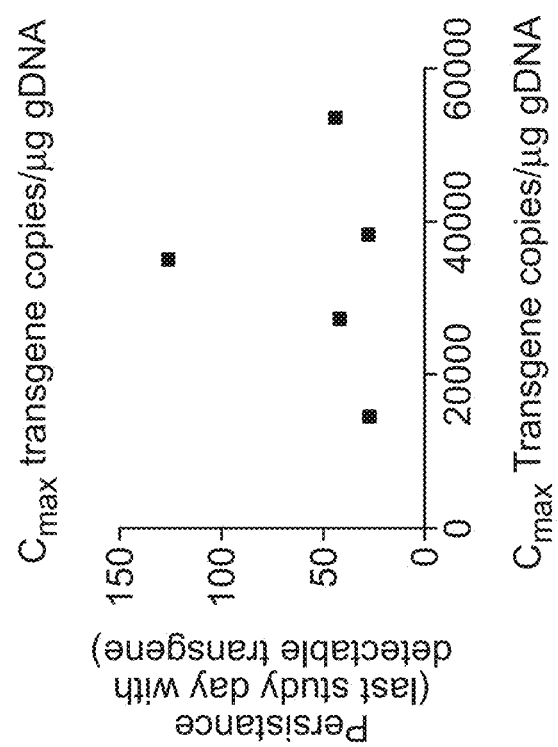
FIGS. 10A and 10B are graphs showing persistence versus an indication of CAR-T cell expansion. The X-axis of the graph of FIG. 10A shows Cmax of assay of CAR+ T cell as percentage of T cells. The X-axis of the graph of FIG. 10B shows the Cmax of assay of transgene copies per microgram of gDNA. The degree of CAR-T cell expansion does not predict persistence.
Figure 10A:
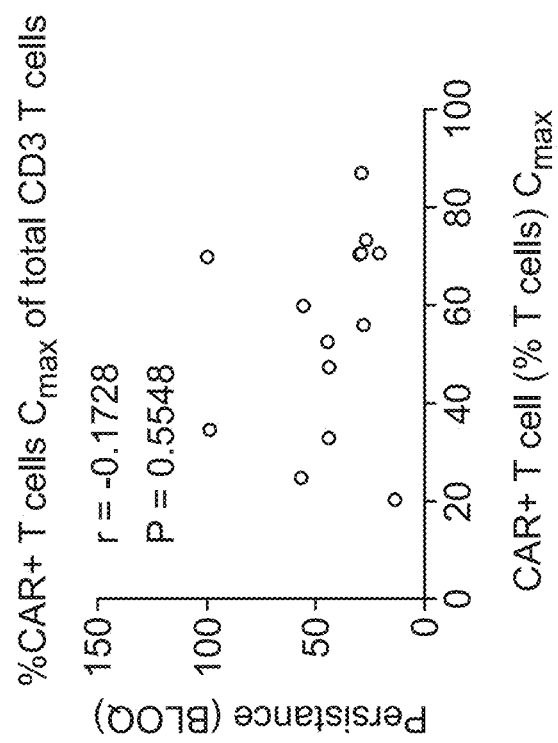
Figure 11A:
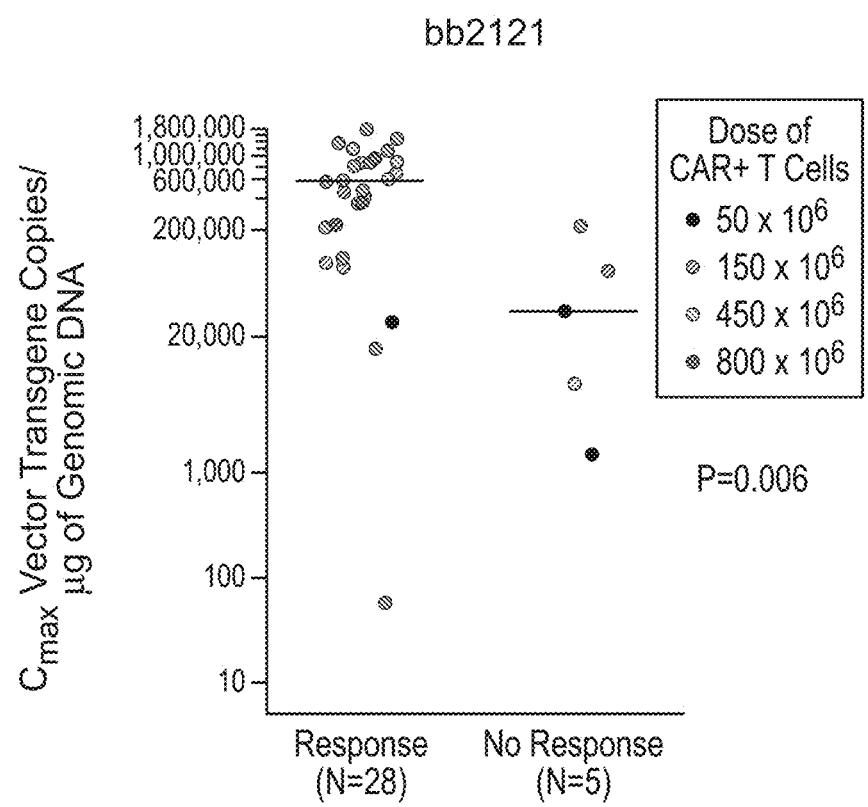
FIG. 11A is a graph plotting the Cmax (as determined by vector transgene copies per microgram of genomic DNA) of responders and non-responders to bb2121 CAR-T therapy. A relationship between Cmax and response for bb2121 can be seen.
Figure 11B:
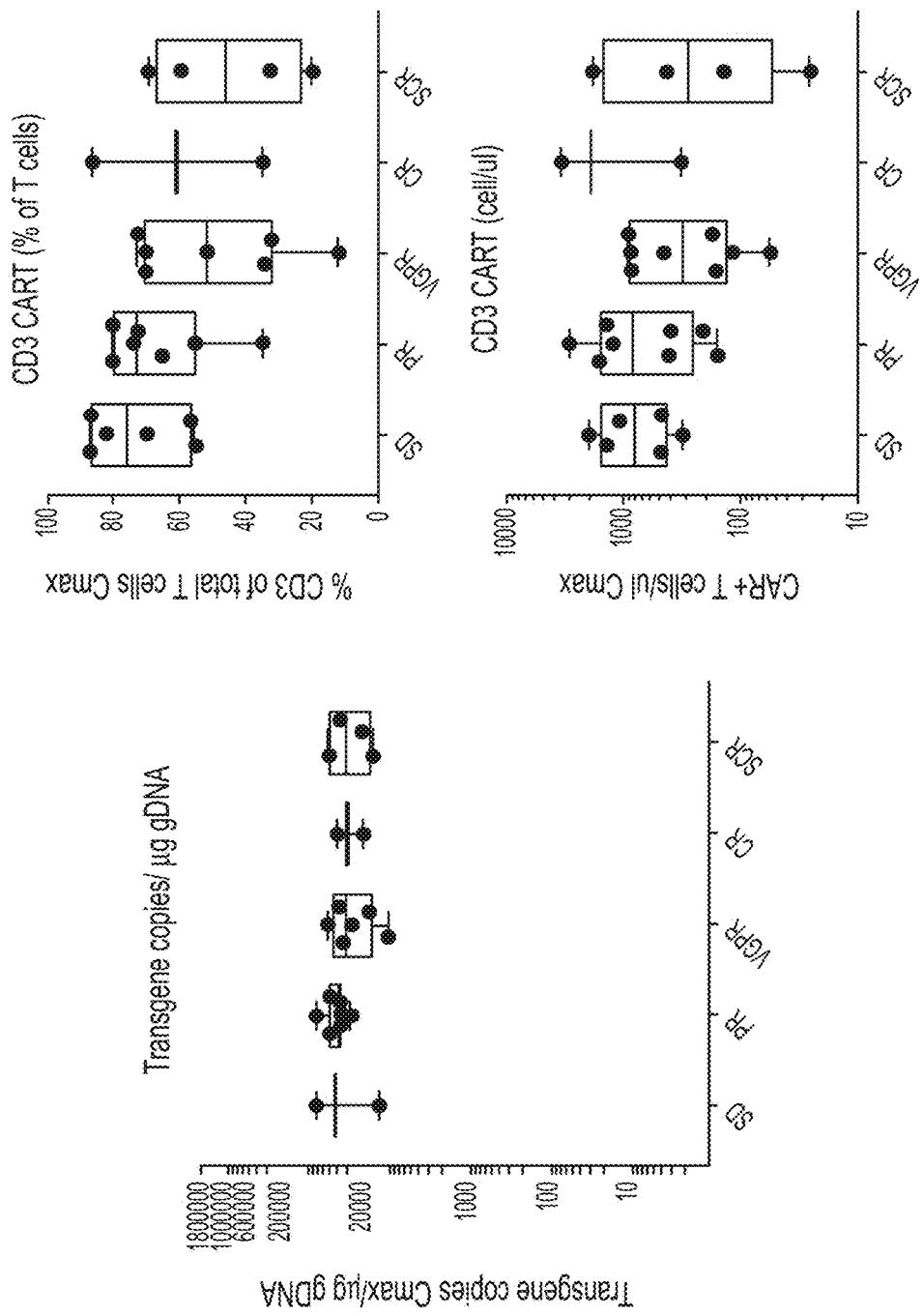
FIG. 11B illustrates graphs plotting the Cmax (as determined by both qPCR and flow cytometry assays) of various classes of responders to LCAR-B38M CAR-T therapy (SD, PR, VGPR, CR and sCR). Unlike bb2121, there is no correlation between clinical response and either of Cmax or persistence.
Figure 11D:
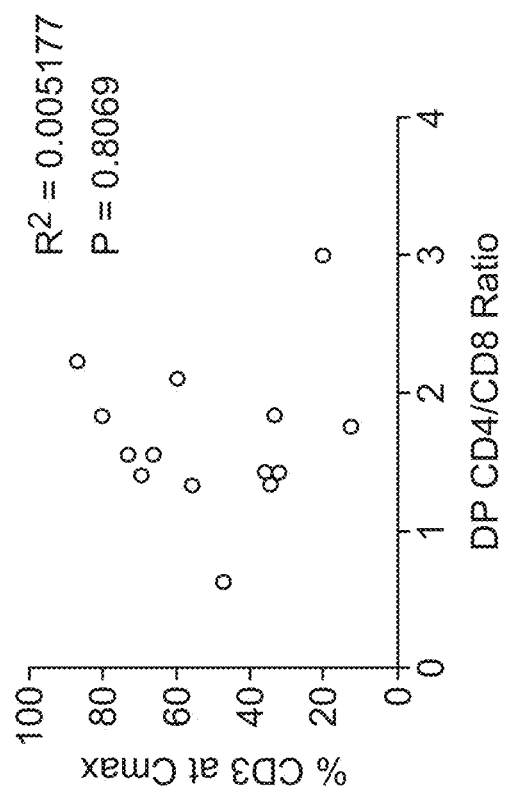
FIG. 11D is a graph plotting percentage CD3 at Cmax versus the DP CD4/CD8 ratio. The DP CD4/CD8 ratio is not correlated with expansion.
Figure 11C:
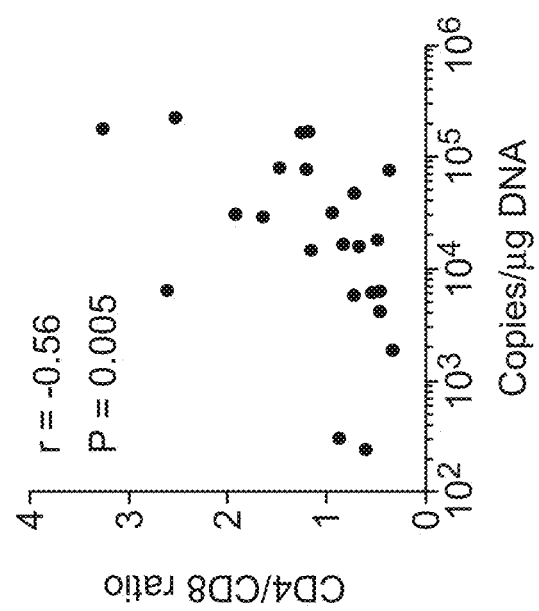
FIG. 11C is a graph plotting the double positive (DP) CD4/CD8 ratio versus copies/microgram DNA.
Figure 13A:
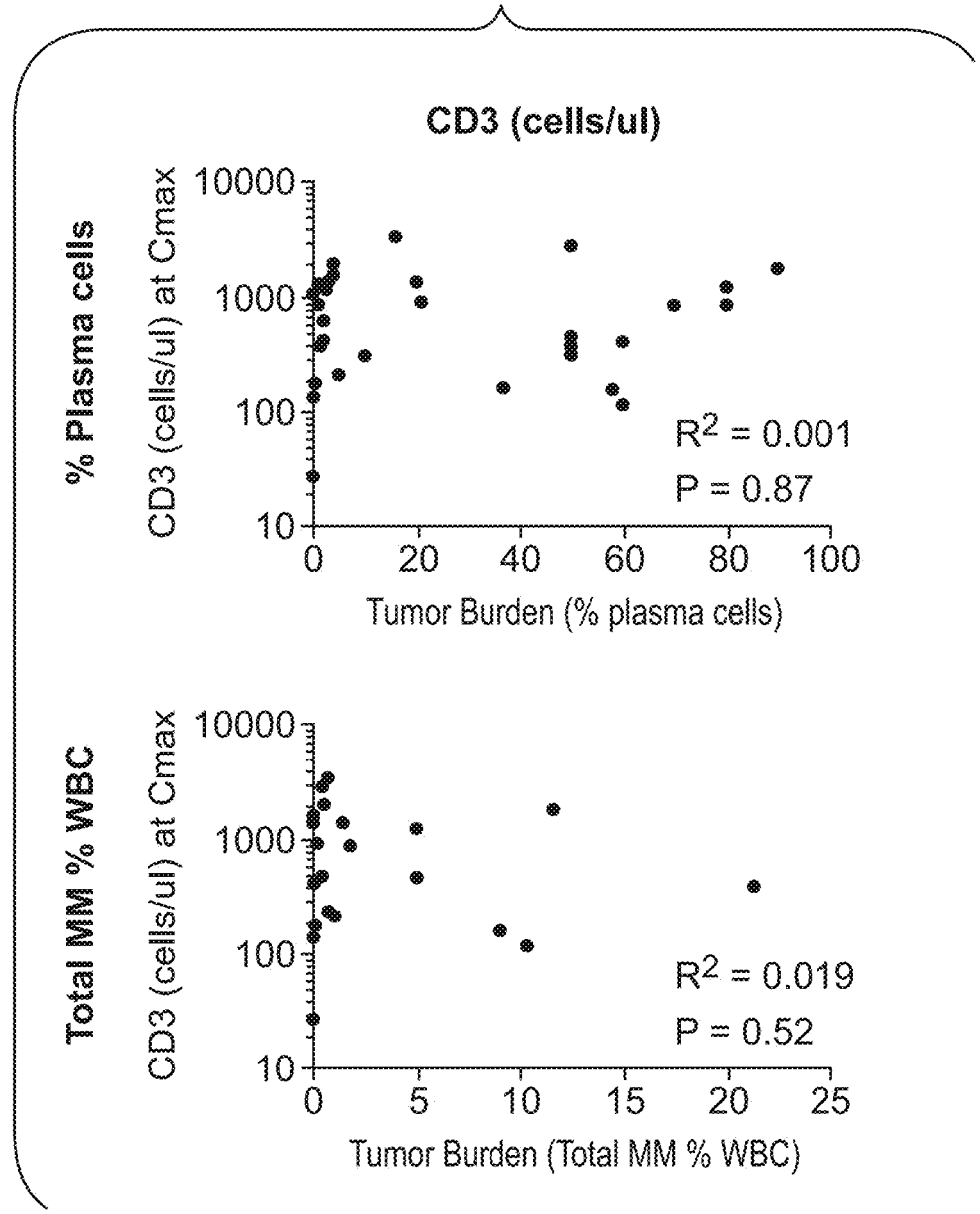
FIG. 13A shows graphs plotting the concentration of CD3 cells per microliter at Cmax versus the tumor burden. The results show that tumor burden does not correlate with LCAR-B38M expansion (Cmax).
Figure 13B:
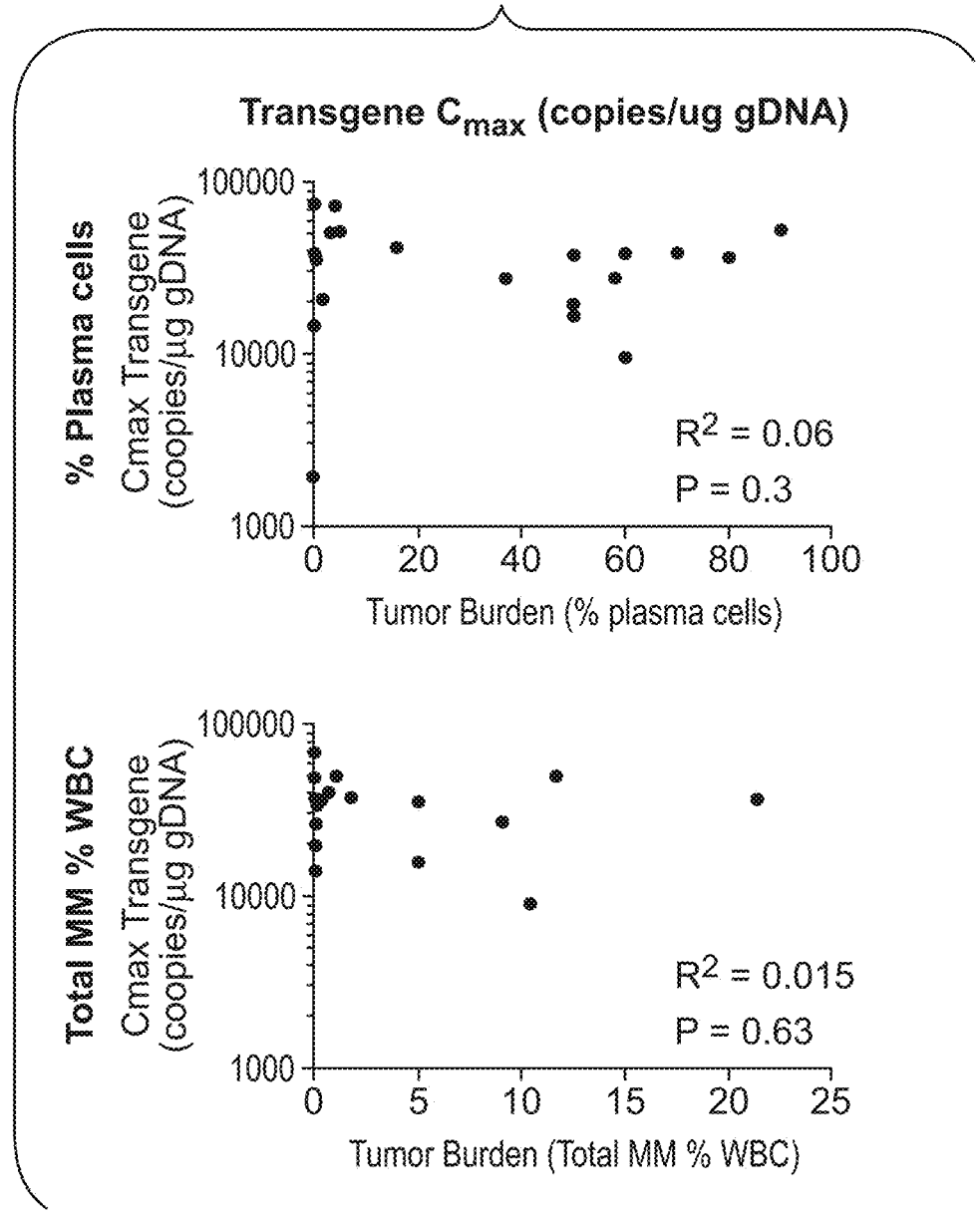
FIG. 13B shows graphs plotting the copies of transgene per microgram of gDNA at Cmax versus the tumor burden. The results show that tumor burden does not correlate with LCAR-B38M expansion as indicated by Cmax.

Following infusion, CAR+ T cells expanded reaching a peak between 20-87% of the total T cells in blood between days 10-14 post-infusion, as shown in FIG. 8B. A qPCR assay showing the number of transgene copies per microgram gDNA was also performed, as shown in FIG. 8A. The Cmax was highly variable among patients, while the Tmax is consistent among patients. The CD4:CD8 ratio and the proportion of T cell memory subsets in the final DP did not correlate with peak CAR+ T cell expansion. Peak CAR+ T cell expansion did not correlate with response. Number of CAR+ T cells/μl in 15/28 patients with at least 11 weeks follow-up are <LOQ (2 cells/μl) at 11 weeks, as shown in FIGS. 8A-8C. Although preliminary, no difference was observed in the response rate between these patients compared with patients with measurable CAR+ T cells after 8 weeks. A similar trend was observed when expansion and persistence were assessed by measuring transgene levels, as shown by the data in FIGS. 10A, 10B and 11B. Unlike comparative bb2121 CAR, there is no correlation between clinical response and either of Cmax or persistence.

Figure 14B:
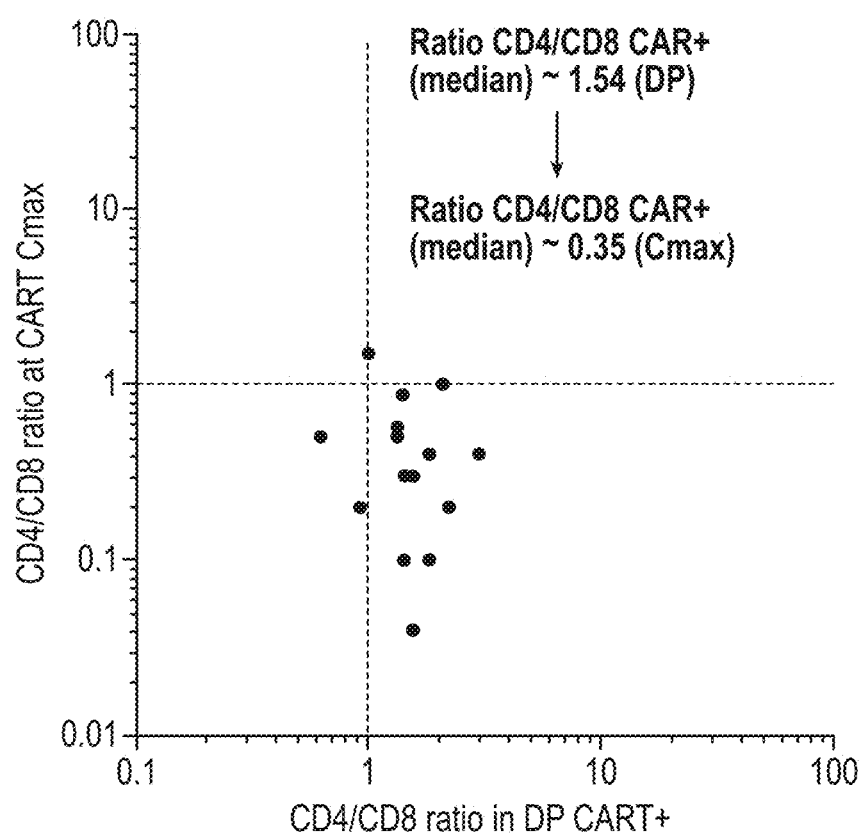
FIG. 14B is a graph showing the CD4:CD8 ratio at peak CAR T-cell expansion (Y-axis) versus CD4:CD8 ratio in the DP CART+ product (X-axis). The median CD4:CD8 ratio in the DP cells is 1.54. The median CD4:CD8 ratio in the cells at Cmax is 0.35.
Figure 15:
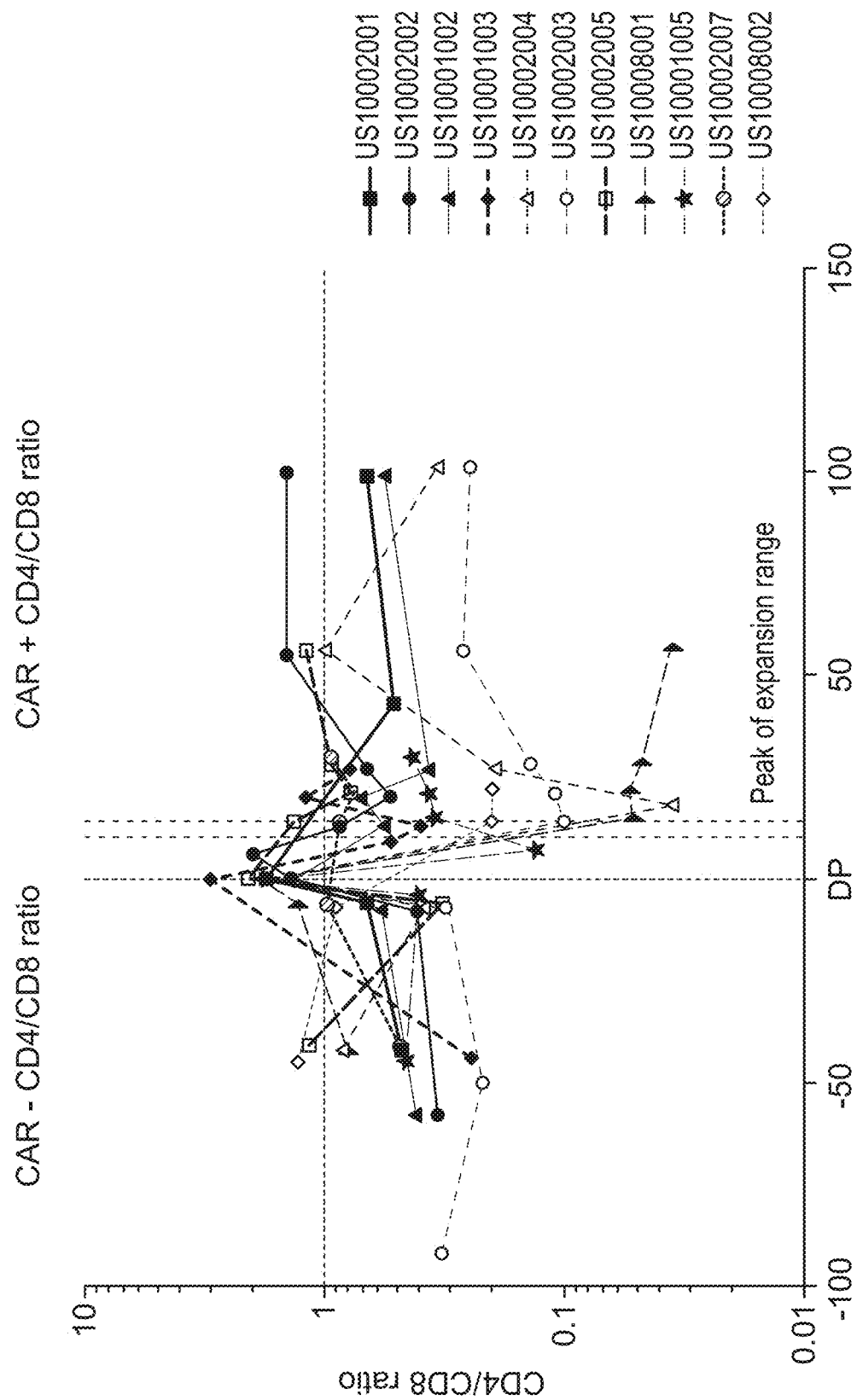
FIG. 15 is a graph showing the CD4:CD8 ratio for LCAR-B38M, in various patients in the MMY2001 study on certain days before and after infusion (day zero). In most patients, the CD4:CD8 ratio was below 1 at peak expansion.
Figure 16:
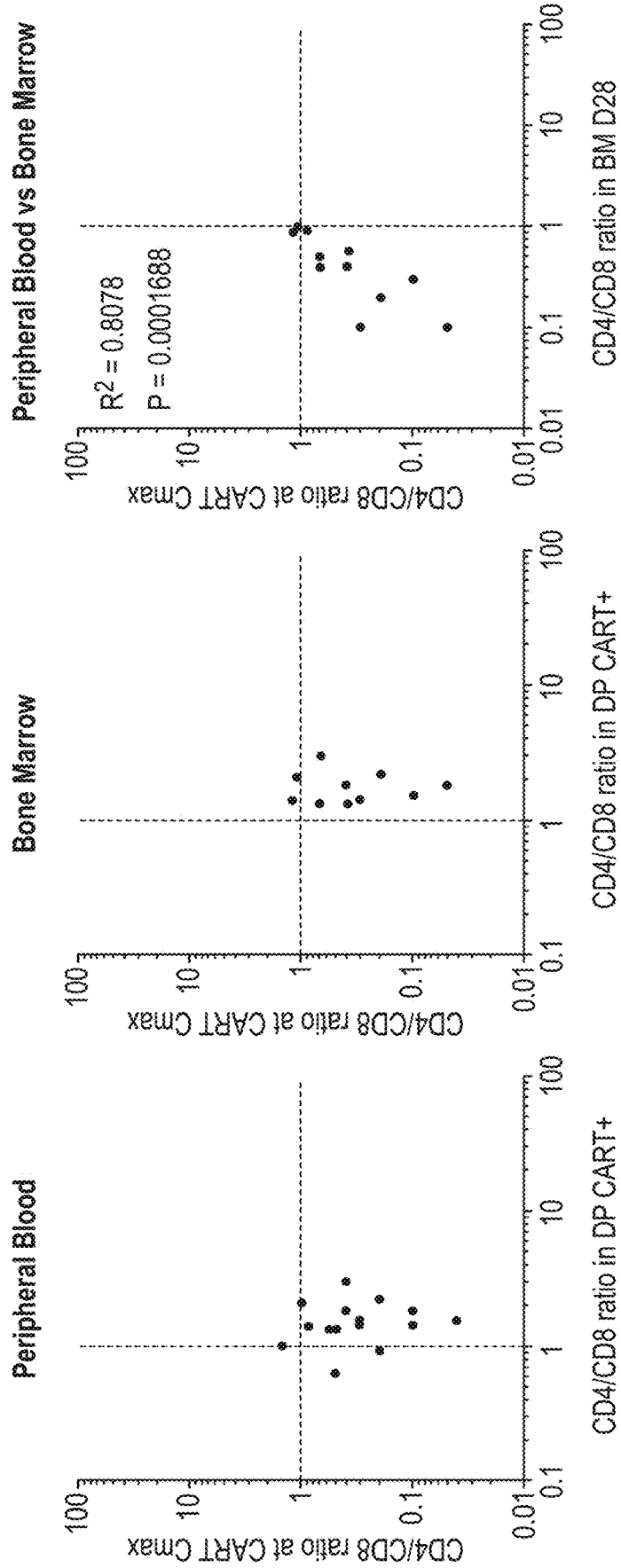
FIGS. 16A-16C show that LCAR-B38M is enriched in CD8 CAR+ T cells at the peak of expansion in bone marrow.
Figure 20A:
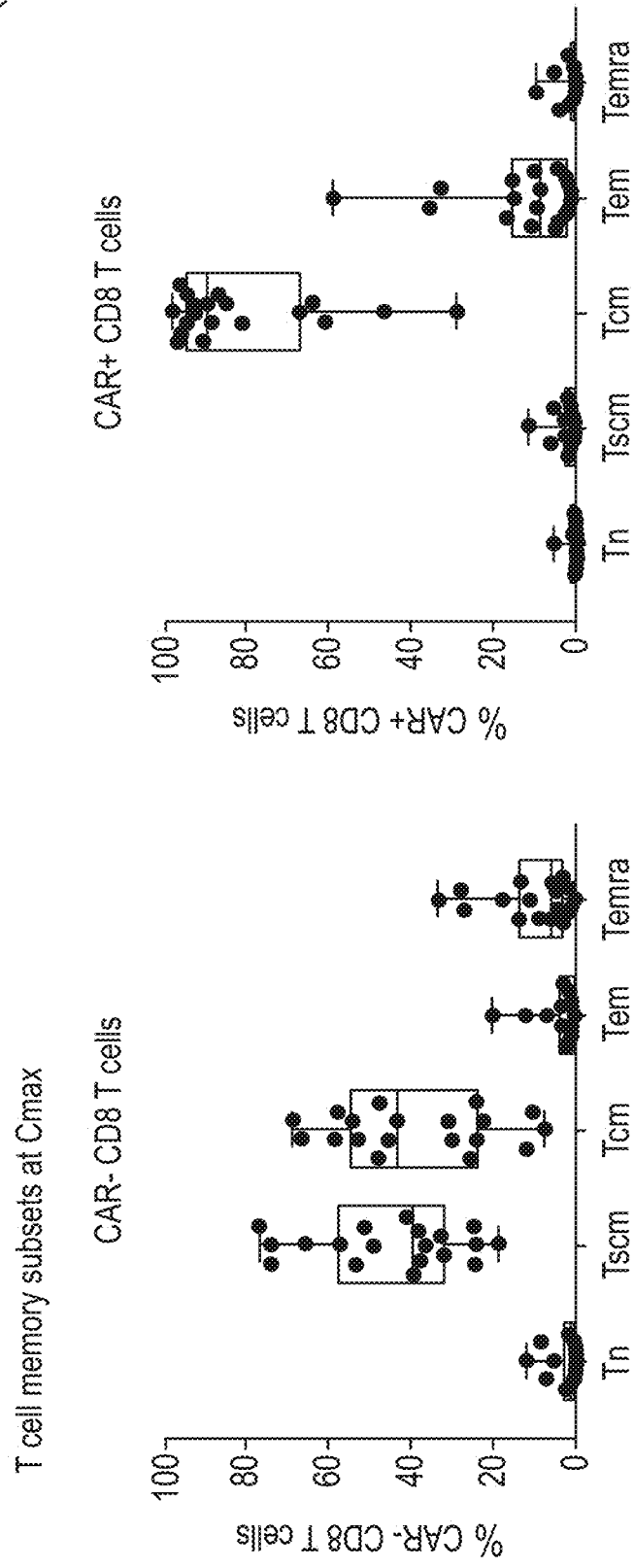
FIG. 20A shows the results of phenotypic characterization of various patients' CD8 T cells (CD27+) in MMY2001 study at Cmax. In most patients, most of the CAR+CD8+ T cells are central memory cells at Cmax.
Figure 20B:
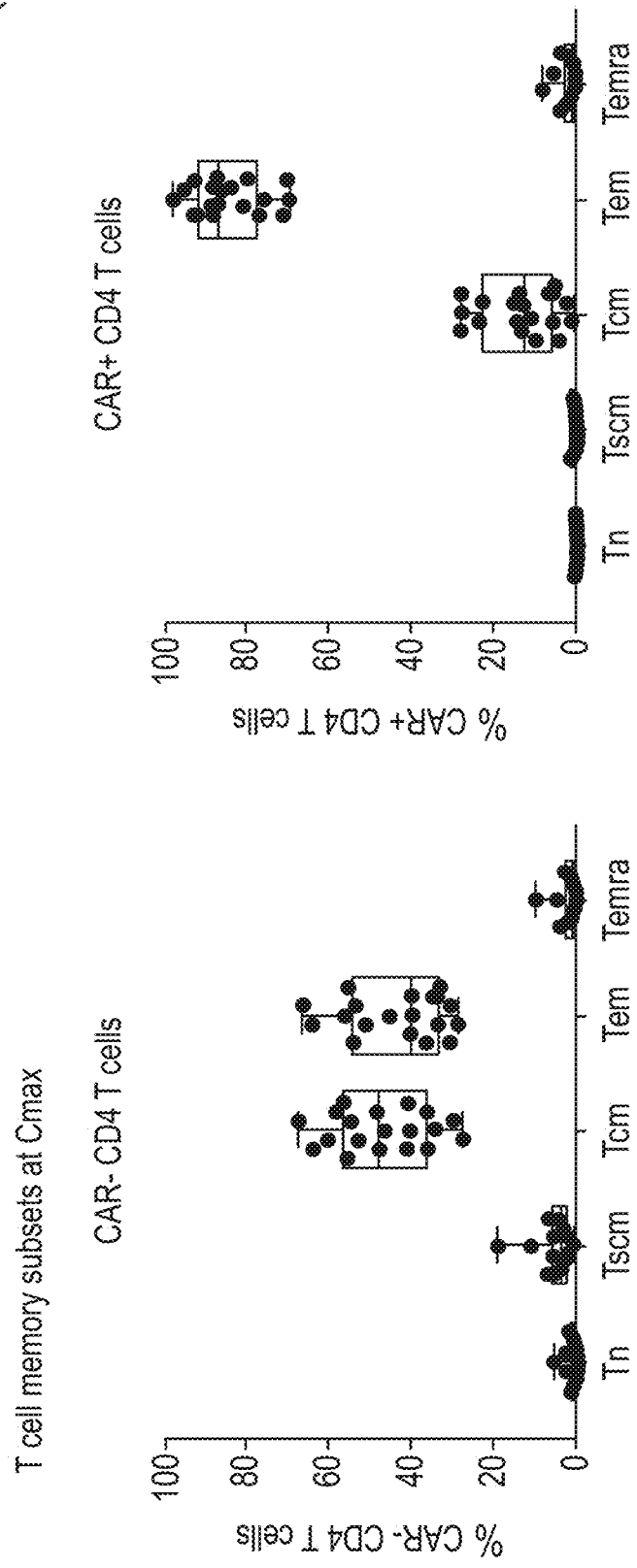
FIG. 20B shows the results of phenotypic characterization of various patients' CD4 T cells in MMY2001 study at Cmax. Most of the CAR+CD4+ T cells are effector memory cells at Cmax.
Figure 42:
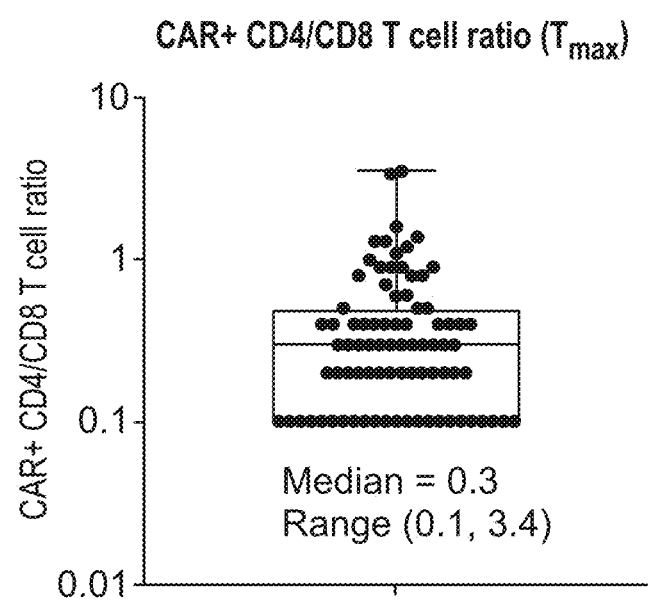
FIG. 42 illustrates CAR+CD4/CD8 ratio at T cells Cmax (Tmax).

While both CD4+ and CD8+ CAR+ T cells expanded in vivo, the CD4:CD8 CAR+ ratio decreased at peak expansion compared with the final DP (from a median of 1.54 to 0.35, as shown in FIG. 14B), indicating a preferential expansion of CD8+ CAR+ T cells in blood. Calculation based on exploratory analysis indicates that the CD4/CD8 ratio at the time of CAR+ T cells Cmax (Tmax) has a median of 0.29 and a range of 0.08-3.4 (see FIG. 42). At peak expansion, CD8+ CAR+ T cells showed predominantly a central memory (Tcm) phenotype (CCR7+CD45RO+; median of 90% [range 29.3-98.5%], as shown in FIG. 20A). In contrast, CD4+ CAR+ T cells were enriched in effector memory (Tem) cells (CCR7-CD45RO+; median of 87% [range 69.5-98.1%], as shown in FIG. 20B) at peak expansion. A similar trend in the CD4:CD8 ratio, as well as the T cell memory subset composition, was observed in BM of all 11 patients with evaluable samples at day 28.

As shown in FIGS. 20A and 20B, CD8+ CAR− T cells showed an approximate 50:50 ratio of stem memory (Tscm): Tcm subsets while CD4+ CAR− T cells showed an approximate 50:50 ratio of Tcm:Tem subsets, indicating a differential T cell maturation course for CD4+ and CD8+ CAR+ and CAR− T cells.

The ratio of cells that are CD8+CD45ORO− CD27+ is predictive of clinical response, as shown in FIG. 20C. Patients with CR or PRTD had a higher percentage of CD8+CD45ORO− CD27+ cells than those who had PR or NR. FIG. 20D illustrates graphs showing the correlation of percentage CD8 stem cell memory T cells (left panel) or naïve T cells (right panel) in each patient grouped by clinical response.

Figure 21B:
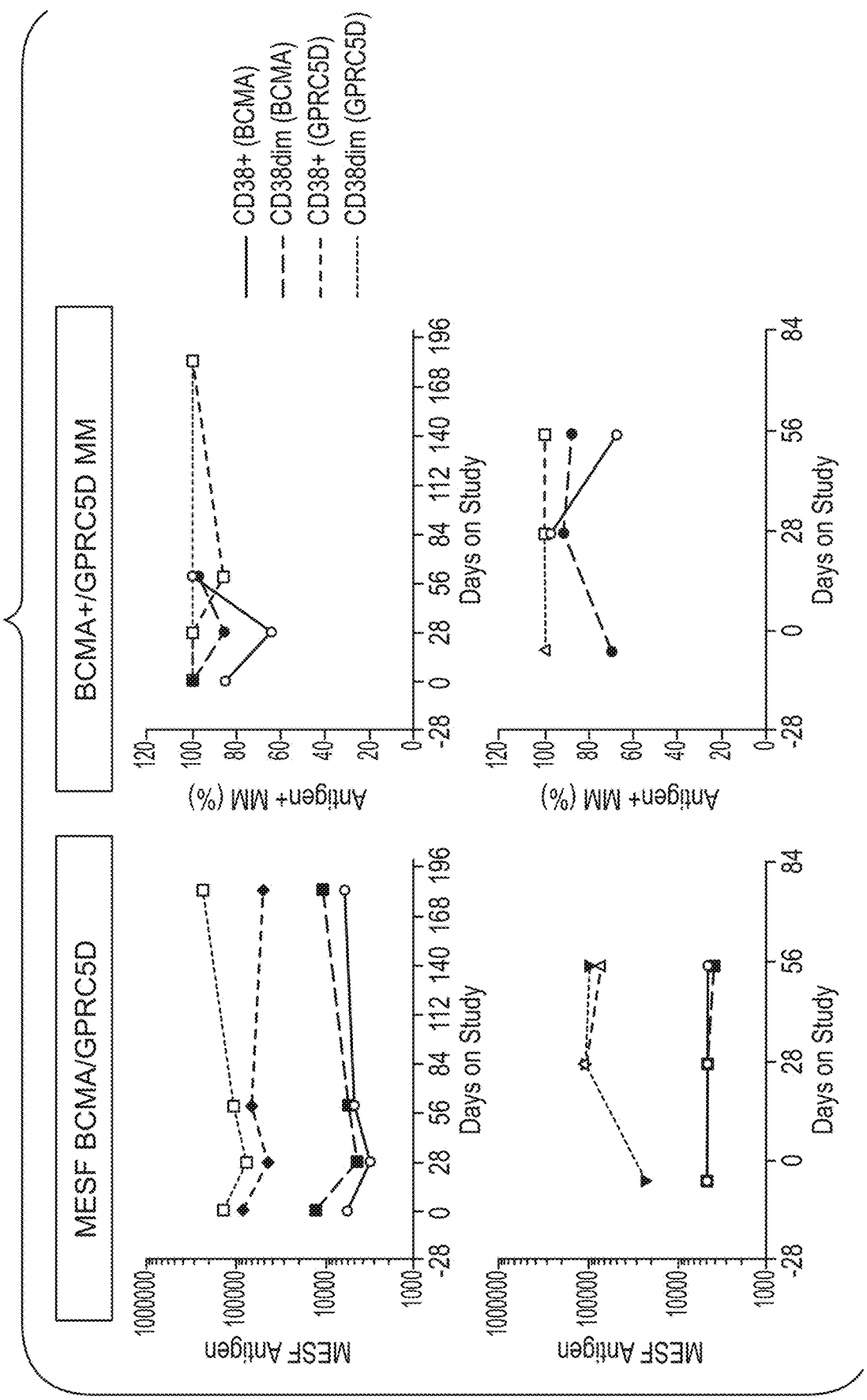
FIG. 21B depicts graphs showing the amount of MESF antigen, and percentage of antigen plus MM, detected in CD38+ and CD38 dim BCMA and GPRC5D leukocytes over the study period. The CD38+ BCMA cells, the CD38dim BCMA cells, the CD38+ GPRC5D cells, and the CD38dim GPRC5D cells are as indicated in the figure.

The ratio of cells that were multiple myeloma cells versus total leukocytes over the study period was assayed, with results shown in FIG. 21A. By day 56, the ratio of multiple myeloma cells to total leukocytes declined to level below that at the time of infusion (day 0).

Figure 22:
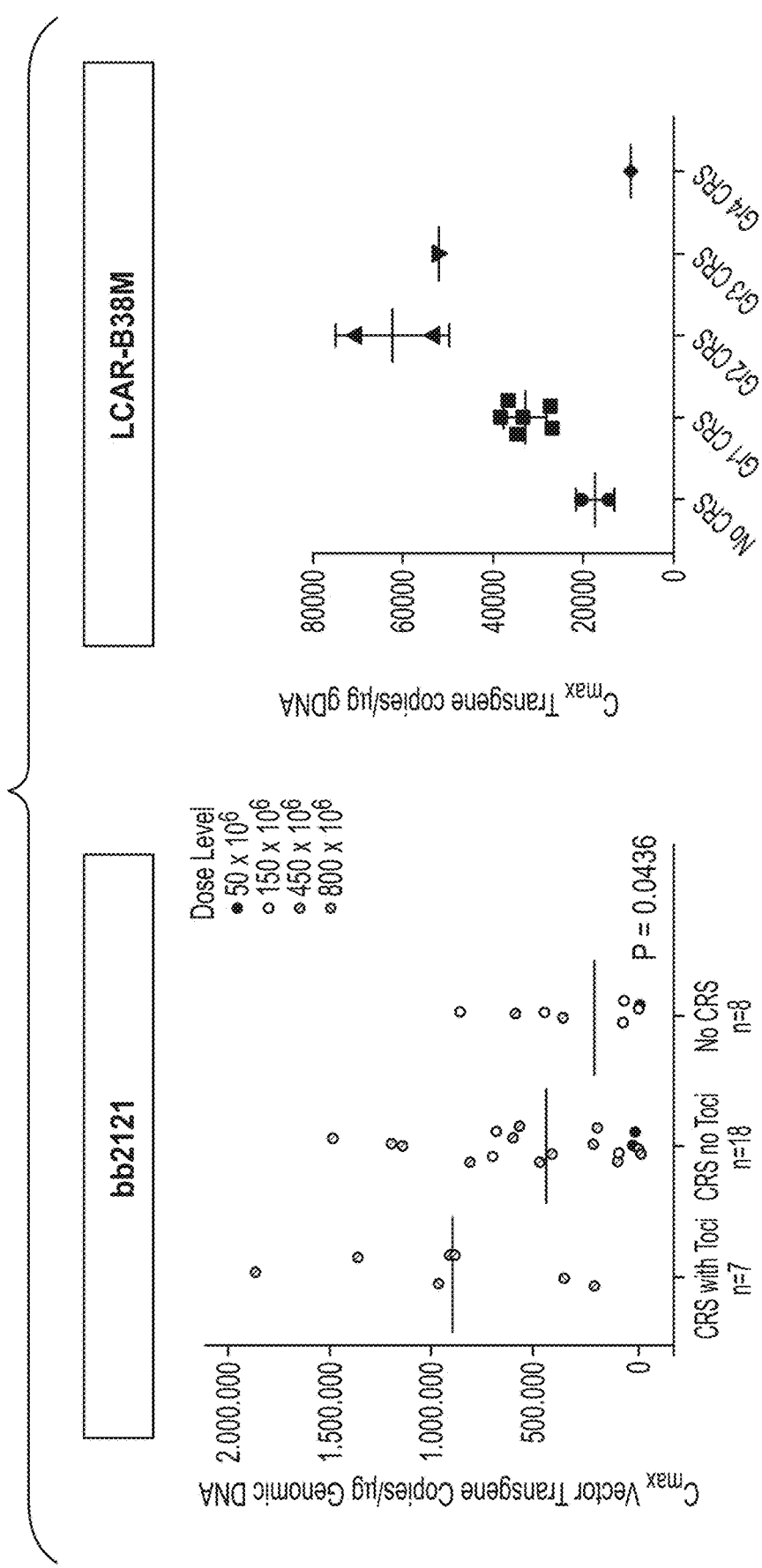
FIG. 22 illustrates data showing that similar to bb2121, the expansion of LCAR-B38M (as measured by Cmax of transgene copies per microgram of genomic DNA) correlates with CRS grade.
Figure 23:
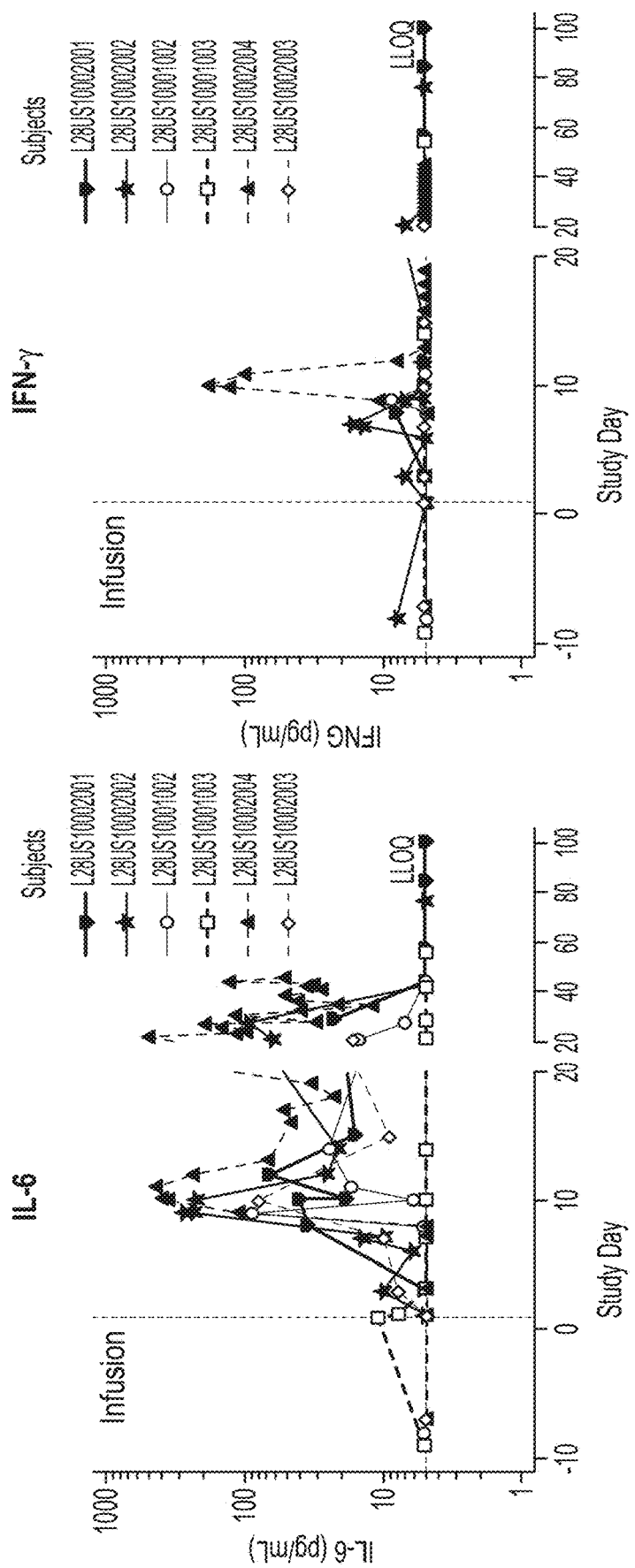
FIG. 23 shows two graphs indicating the amount of each of two serum proinflammatory cytokines IL6 and IFN-γ in individual subjects over the study period. The amount of IL-6 increased in most patients after infusion.
Figure 24:
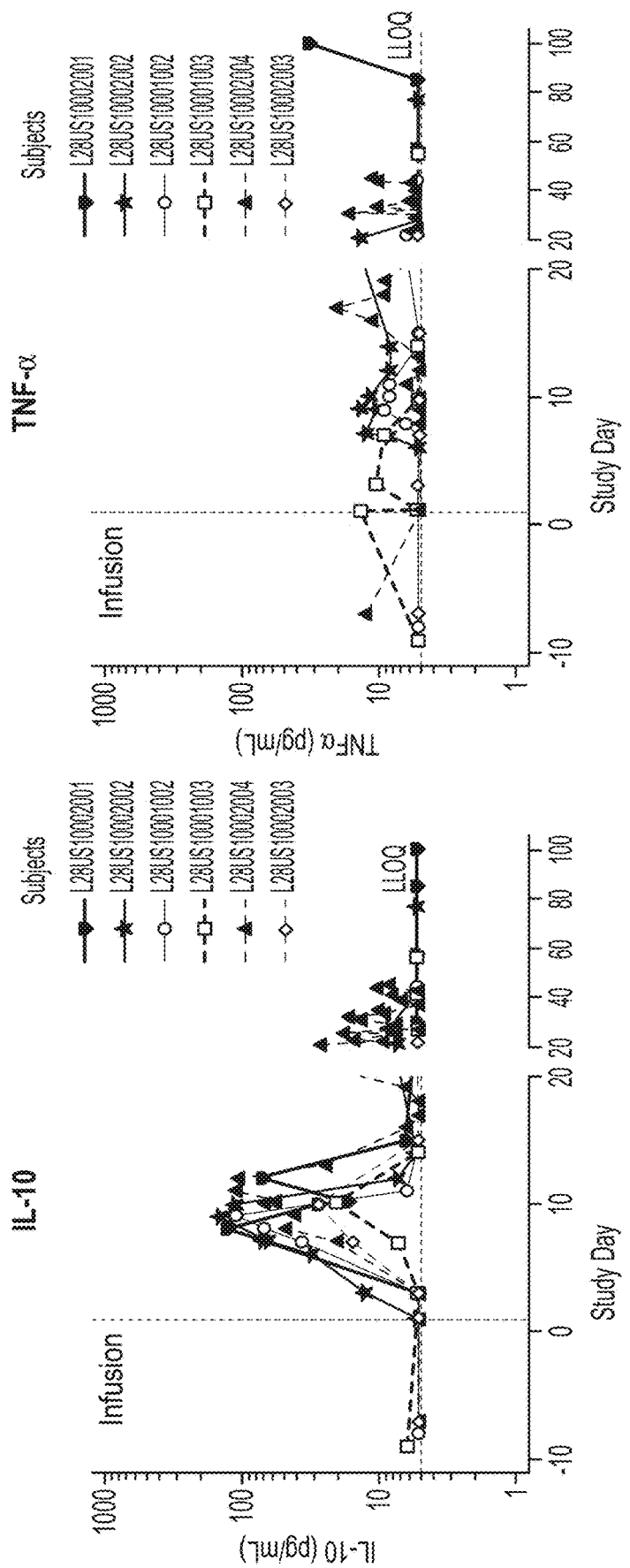
FIG. 24 shows two graphs indicating the amount of each of two serum proinflammatory cytokines IL-10 and TNF-α in individual subjects over the study period. The amount of both increased in most patients after infusion.
Figure 25:
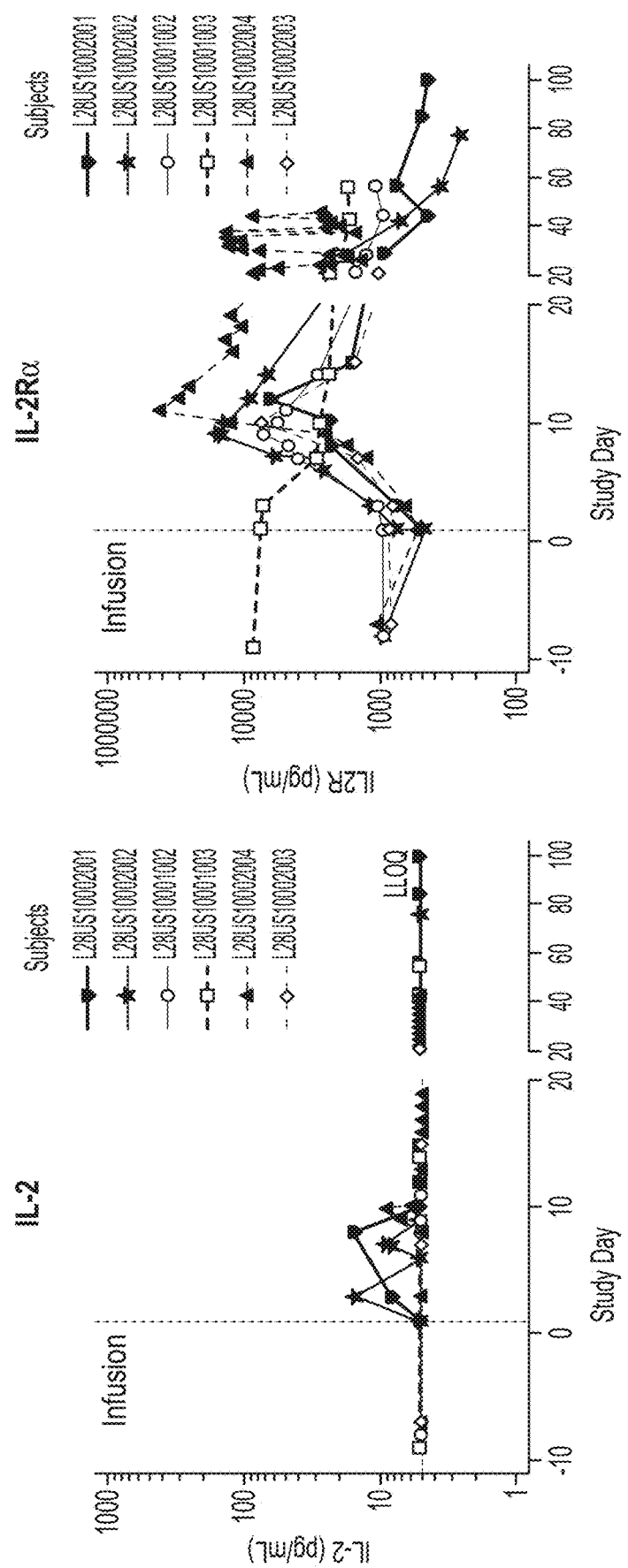
FIG. 25 shows two graphs indicating the amount of each of two serum proinflammatory cytokines IL-2 and IL-2Rα in individual subjects over the study period.

It was hypothesized that peripheral pro-inflammatory cytokine levels correlate with CAR+ T cells expansion, T cell subsets and the patient toxicity profile. CRS and HLH/MAS can correlate with high levels of peripheral cytokines (IL-6, IL2-RA). IL-6 levels may correlate with peak expansion of CAR-T cells (Fraietta et al., 2018 Nature medicine 24, 563-571). Selected serum cytokines may be indicative of MoA and T cell subset frequencies. An assessment of peripheral cytokines at CAR-T cell expansion and CRS onset was tested. As shown in FIGS. 23-25, expansion of CAR+ T cells correlated with increases in serum cytokines levels (i.e., IL-6, IFN-γ, IL-10) which peaked around day 10, coinciding with maximal expansion of CAR+ T cells. A correlation between the expansion of LCAR-B38M with the grade of cytokine release syndrome was seen, as shown in the assay of FIG. 22. Generally, increases in some proinflammatory cytokines (i.e., IL-6) correlated with onset of cytokine release syndrome symptoms (median time to onset of 7 days [range 2-12]), as shown in FIG. 26A.

Figure 21C:
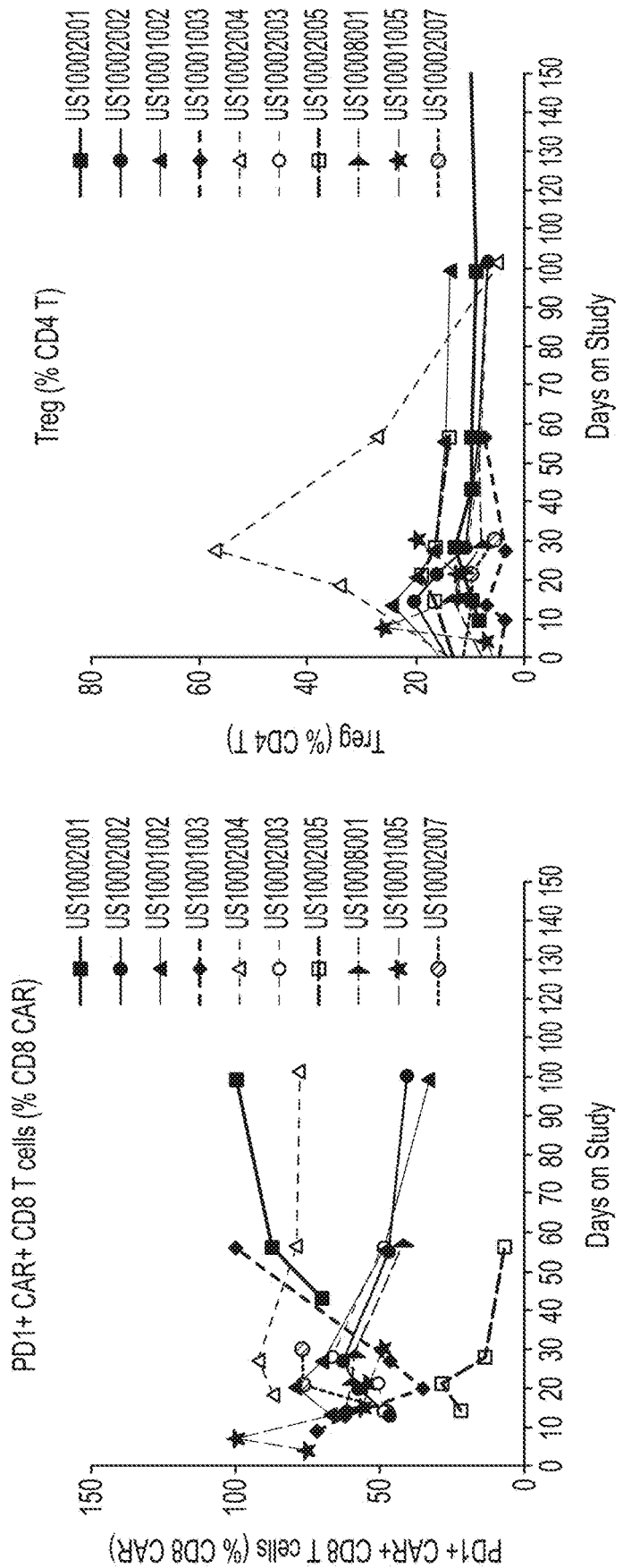
FIG. 21C depicts a graph showing the percentage of PD1+ CAR+CD8+ T cells (as a percentage of CD8 CAR) and a graph showing Treg as a percentage of CD4 T cells, both in individual patients over the study period. The results provide insight into CAR-T exhaustion and regulatory mechanisms.

Additional assays were performed. An assay of the percentage of PD1+ CAR+CD8+ T cells, as compared to CD8 CAR, and an assay of the percentage of CD4 T cells was performed on several days throughout the study period for each patient, with results shown in FIG. 21C. The results can provide insight into CAR-T exhaustion and regulatory mechanisms.

The above findings suggest that LCAR-B38M is a differentiated CAR-T cell therapy that is highly active at a relatively low dose, as compared with other CAR-T therapies. Without wishing to be bound by theory, the high activity of LCAR-B38M at a relatively low dose is potentially related to a preferential and consistent in vivo expansion of CD8+ CAR+ T cells displaying a central memory phenotype.

Table 3 below summarizes the infusion procedure performed in the MMY2001 study presented above and in a related Phase 2 study.

TABLE 3

Summary of JNJ-4528 Infusion; All Treated Analysis Set (Study MMY2001)

|  | Phase 1b | Phase 2 | Phase 1b + Phase 2 |
|---|---|---|---|
| Analysis set: all treated | 29 | 68 | 97 |
| Time since initial apheresis to JNJ-4528 Infusion (days) | | | |
| N | 29 | 68 | 97 |
| Mean (SD) | 52.2 (17.74) | 52.3 (19.74) | 52.2 (19.07) |
| Median | 44.0 | 47.0 | 47.0 |
| Range | (42; 120) | (41; 167) | (41; 167) |
| Time from apheresis to JNJ-4528 Infusion (days)[a] | | | |
| N | 29 | 68 | 97 |
| Mean (SD) | 49.0 (15.00) | 52.3 (19.74) | 51.3 (18.44) |
| Median | 44.0 | 47.0 | 46.0 |
| Range | (41; 120) | (41; 167) | (41; 167) |
| Duration of JNJ-4528 infusion (minutes) | | | |
| N | 29 | 68 | 97 |
| Mean (SD) | 21.2 (6.29) | 20.3 (11.86) | 20.6 (10.48) |
| Median | 20.0 | 17.0 | 19.0 |
| Range | (14; 38) | (5; 71) | (5; 71) |
| Total volume infused (mL) | | | |
| N | 29 | 68 | 97 |
| Mean (SD) | 66.6 (10.45) | 69.1 (16.28) | 68.4 (14.77) |
| Median | 70.0 | 70.0 | 70.0 |
| Range | (30; 70) | (30; 140) | (30; 140) |

TABLE 3-continued

Summary of JNJ-4528 Infusion; All Treated Analysis Set (Study MMY2001)

|  | Phase 1b | Phase 2 | Phase 1b + Phase 2 |
|---|---|---|---|
| Total CAR-positive viable T cells infused (x10E6 cells) | | | |
| N | 29 | 68 | 97 |
| Mean (SD) | 59.81 (13.409) | 54.69 (13.696) | 56.22 (13.744) |
| Median | 59.00 | 51.45 | 54.30 |
| Range | (35.7; 82.0) | (23.5; 93.1) | (23.5; 93.1) |
| JNJ-4528 dose formulated (x10E6 cells/kg)[b] | | | |
| N | 29 | 68 | 97 |
| Mean (SD) | 0.698 (0.0844) | 0.694 (0.0821) | 0.695 (0.0823) |
| Median | 0.709 | 0.687 | 0.693 |
| Range | (0.54; 0.88) | (0.52; 0.94) | (0.52; 0.94) |
| JNJ-4528 dose administered (x10E6 cells/kg)[c] | | | |
| N | 29 | 68 | 97 |
| Mean (SD) | 0.710 (0.877) | 0.710 (0.0904) | 0.710 (0.0892) |
| Median | 0.722 | 0.707 | 0.709 |
| Range | (0.52; 0.89) | (0.51; 0.95) | (0.51; 0.95) |

[a] The apheresis that resulted in complete manufacturing of JNJ-4528 is used if there are multiple apheresis attempts.
[b] CAR-positive viable T cells adjusted by weight at apheresis.
[c] CAR-positive viable T cells adjusted by weight at JNJ-4528 infusion (on or within 1 day prior to JNJ-4528 infusion day).
Note:
Duration of infusion includes both actual infusion time and interruption time, if any.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

```
Sequences
LCAR-B38M CD8α signal peptide, CD8α SP amino acid
                                          (SEQ ID NO: 6)
MALPVTALLLPLALLLHAARP LCAR-B38M BCMA binding domain, VHH1 amino acid
sequence
                                          (SEQ ID NO: 1)
QVKLEESGGGLVQAGRSLRLSCAASEHTFSSHVMGWFRQAPGKERESVAV

IGWRDISTSYADSVKGRFTISRDNAKKTLYLQMNSLKPEDTAVYYCAARR

IDAADFDSWGQGTQVTVSS

LCAR-B38M BCMA binding domain, G45 linker amino
acid sequence
                                          (SEQ ID NO: 5)
GGGGS LCAR-B38M BCMA binding domain, VHH2 amino acid
sequence
                                          (SEQ ID NO: 3)
EVQLVESGGGLVQAGGSLRLSCAASGRTFTMGWFRQAPGKEREFVAAISL

SPTLAYYAESVKGRFTISRDNAKNTVVLQMNSLKPEDTALYYCAADRKSV

MSIRPDYWGQGTQVTVSS

LCAR-B38M CD8α hinge amino acid sequence
                                         (SEQ ID NO: 15)
TTTPAPRPPTPAPTIASQPLSLRPEACRPAAGGAVHTRGLDFACD LCAR-B38M CD8α transmembrane amino acid sequence
                                          (SEQ ID NO: 8)
IYIWAPLAGTCGVLLLSLVITLYC -continued
LCAR-B38M CD137 Cytoplasmic amino acid sequence
                                         (SEQ ID NO: 12)
KRGRKKLLYIFKQPFMRPVQTTQEEDGCSCRFPEEEEGGCEL LCAR-B38M CD3ζ Cytoplasmic amino acid sequence
                                         (SEQ ID NO: 10)
RVKFSRSADAPAYQQGQNQLYNELNLGRREEYDVLDKRRGRDPEMGGKPR

RKNPQEGLYNELQKDKMAEAYSEIGMKGERRRGKGHDGLYQGLSTATKDT

YDALHMQALPPR

LCAR-B38M CD8α signal peptide CD8α SP nucleic
acid sequence
                                          (SEQ ID NO: 7)
ATGGCTCTGCCCGTCACCGCTCTGCTGCTGCCTCTGGCTCTGCTGCTGCA

CGCTGCTCGCCCT

LCAR-B38M BCMA binding domain, VHH1 nucleic acid
sequence
                                          (SEQ ID NO: 2)
CAGGTCAAACTGGAAGAATCTGGCGGAGGCCTGGTGCAGGCAGGACGGAG

CCTGCGCCTGAGCTGCGCAGCATCCGAGCACACCTTCAGCTCCCACGTGA

TGGGCTGGTTTCGGCAGGCCCCAGGCAAGGAGAGAGAGAGCGTGGCCGTG

ATCGGCTGGAGGGACATCTCCACATCTTACGCCGATTCCGTGAAGGGCCG

GTTCACCATCAGCCGGGACAACGCCAAGAAGACACTGTATCTGCAGATGA

ACAGCCTGAAGCCCGAGGACACCGCCGTGTACTATTGCGCAGCAAGGAGA

ATCGACGCAGCAGACTTTGATTCCTGGGGCCAGGGCACCCAGGTGACAGT

GTCTAGC

LCAR-B38M BCMA binding domain, G4S linker (SEQ ID
NO: 5) nucleic acid sequence
                                         (SEQ ID NO: 16)
GGAGGAGGAGGATCT
```

LCAR-B38M BCMA binding domain, VHH2 nucleic acid
sequence
(SEQ ID NO: 4)
GAGGTGCAGCTGGTGGAGAGCGGAGGCGGCCTGGTGCAGGCCGGAGGCTC

TCTGAGGCTGAGCTGTGCAGCATCCGGAAGAACCTTCACAATGGGCTGGT

TTAGGCAGGCACCAGGAAAGGAGAGGGAGTTCGTGGCAGCAATCAGCCTG

TCCCCTACCCTGGCCTACTATGCCGAGAGCGTGAAGGGCAGGTTTACCAT

CTCCCGCGATAACGCCAAGAATACAGTGGTGCTGCAGATGAACTCCCTGA

AACCTGAGGACACAGCCCTGTACTATTGTGCCGCCGATCGGAAGAGCGTG

ATGAGCATTAGACCAGACTATTGGGGCAGGGAACACAGGTGACCGTGAG

CAGC

LCAR-B38M CD8α hinge nucleic acid sequence
(SEQ ID NO: 14)
ACCACGACGCCAGCGCCGCGACCACCAACACCGGCGCCCACCATCGCGTC

GCAGCCCCTGTCCCTGCGCCCAGAGGCGTGCCGGCCAGCGGCGGGGGCG

CAGTGCACACGAGGGGGCTGGACTTCGCCTGTGAT

LCAR-B38M CD8α transmembrane nucleic acid sequence
(SEQ ID NO: 9)
ATCTACATCTGGGCGCCCTTGGCCGGGACTTGTGGGGTCCTTCTCCTGTC

ACTGGTTATCACCCTTTACTGC

LCAR-B38M CD137 Cytoplasmic nucleic acid sequence
(SEQ ID NO: 13)
AAACGGGGCAGAAAGAAACTCCTGTATATATTCAAACAACCATTTATGAG

ACCAGTACAAACTACTCAAGAGGAAGATGGCTGTAGCTGCCGATTTCCAG

AAGAAGAAGAAGGAGGATGTGAACTG

LCAR-B38M CDζ Cytoplasmic nucleic acid sequence
(SEQ ID NO: 11)
AGAGTGAAGTTCAGCAGGAGCGCAGACGCCCCCGCGTACCAGCAGGGCCA

GAACCAGCTCTATAACGAGCTCAATCTAGGACGAAGAGAGGAGTACGATG

TTTTGGACAAGAGACGTGGCCGGGACCCTGAGATGGGGGGAAAGCCGAGA

AGGAAGAACCCTCAGGAAGGCCTGTACAATGAACTGCAGAAAGATAAGAT

GGCGGAGGCCTACAGTGAGATTGGGATGAAAGGCGAGCGCCGGAGGGGCA

AGGGGCACGATGGCCTTTACCAGGGTCTCAGTACAGCCACCAAGGACACC

TACGACGCCCTTCACATGCAGGCCCTGCCCCCTCGCTAA

---

The invention claimed is:

1. A method of treating a subject who has a cancer, comprising administering to the subject a dose of cells comprising a chimeric antigen receptor (CAR) polypeptide comprising:
   a) an extracellular antigen binding domain comprising a first B-cell maturation antigen (BCMA) binding moiety and a second BCMA binding moiety;
   b) a transmembrane domain; and
   c) an intracellular signaling domain,
   wherein the cells are T cells,
   wherein the first BCMA binding moiety comprises the amino acid sequence of (SEQ ID NO: 1)
   QVKLEESGGGLVQAGRSLRLSCAASEHTFSSHVMGWFRQAPGKERESVAV
   IGWRDISTSYADSVKGRFTISRDNAKKTLYLQMNSLKPEDTAVYYCAARR
   IDAADFDSWGQGTQVTVSS, wherein the second BCMA binding moiety comprises the amino acid sequence of (SEQ ID NO: 3)
   EVQLVESGGGLVQAGGSLRLSCAASGRTFTMGWFRQAPGKEREFVAAISL
   SPTLAYYAESVKGRFTISRDNAKNTVVLQMNSLKPEDTALYYCAADRKSV
   MSIRPDYWGQGTQVTVSS, wherein the cancer is refractory or relapsed multiple myeloma, wherein the dose comprises $5.0 \times 10^5$ to $1.0 \times 10^6$ of the T cells per kilogram of the mass of the subject, wherein the method comprises administering to the subject a single dose of the T cells by infusion during the course of the treatment, and wherein the subject has received multiple prior lines of therapy comprising a proteasome inhibitor, an immunomodulatory agent, and an anti-CD38 monoclonal antibody.

2. The method of claim 1, wherein the cells are expanded in vitro prior to infusion.

3. The method of claim 1, wherein the T cells are heterologous T cells.

4. The method of claim 1, wherein the dose comprises $5.5 \times 10^5$ to $8 \times 10^5$ of the T cells per kilogram of the mass of the subject.

5. The method of claim 1, wherein the dose comprises about $7.5 \times 10^5$ of the T cells per kilogram of the mass of the subject.

6. The method of claim 1, wherein the dose comprises $1 \times 10^6$ to $1 \times 10^8$ of the total amount of the T cells.

7. The method of claim 1, wherein the dose comprises $2 \times 10^7$ to $8 \times 10^7$ of the total amount of the T cells.

8. The method of claim 1, wherein the dose comprises about $5.25 \times 10^7$ of the total amount of the T cells.

9. The method of claim 1, wherein the method comprises administering the dose of the T cells resulting in $5.0 \times 10^5$ to $1.0 \times 10^6$ of the T cells per kilogram of the mass of the subject.

10. The method of claim 1, wherein the method comprises administering the dose of the T cells resulting in $5.5 \times 10^5$ to $8 \times 10^5$ of the T cells per kilogram of the mass of the subject.

11. The method of claim 1, wherein the method comprises administering the dose of the T cells resulting in about $7.5 \times 10^5$ of the T cells per kilogram of the mass of the subject.

12. The method of claim 1, wherein the method comprises administering the dose of the T cells resulting in $1 \times 10^6$ to $1 \times 10^8$ of the T cells in the subject.

13. The method of claim 1, wherein the method comprises administering the dose of the T cells resulting in $2 \times 10^7$ to $8 \times 10^7$ of the T cells in the subject.

14. The method of claim 1, wherein the method comprises administering the dose of the T cells resulting in about $5.25 \times 10^7$ of the T cells in the subject.

15. The method of claim 1, wherein the method comprises administering the dose of the T cells intravenously.

16. The method of claim 1, wherein the T cells comprise CD4+T cells and CD8+T cells and a ratio of the CD4+T cells to the CD8+T cells to CD8+T cells in the dose of the T cells is less than 4.

17. The method of claim 16, wherein the ratio of the CD4+T cells to the CD8+T cells in the dose of the T cells is less than 2.

18. The method of claim 17, wherein the ratio of the CD4+T cells to the CD8+T cells in the dose of the T cells is less than 1.8.

19. The method of claim 18, wherein the ratio of the CD4+T cells to the CD8+T cells in the dose of the T cells is less than 1.7.

20. The method of claim 19, wherein the ratio of the CD4+T cells to the CD8+T cells in the dose of the T cells is less than 1.6.

21. The method of claim 20, wherein the ratio of the CD4+T cells to the CD8+T cells in the dose of the T cells is less than 1.4.

22. The method of claim 21, wherein the ratio of the CD4+T cells to the CD8+T cells in the dose of the T cells is less than 1.2.

23. The method of claim 22, wherein the ratio of the CD4+T cells to the CD8+T cells in the dose of the T cells is less than 1.0.

24. The method of claim 1, wherein the T cells comprise CD4+T cells and CD8+T cells and a ratio of CD4+T cells comprising the CAR polypeptide at Cmax to CD8+T cells comprising the CAR polypeptide at Cmax in the subject is less than 3.5.

25. The method of claim 1, wherein the T cells comprise CD4+T cells and CD8+T cells and a ratio of CD4+T cells comprising the CAR polypeptide at Cmax to CD8+T cells comprising the CAR polypeptide at Cmax in the subject is less than 2.0.

26. The method of claim 25, wherein the ratio of the CD4+T cells comprising the CAR polypeptide at Cmax to the CD8+T cells comprising the CAR polypeptide at Cmax in the subject is less than 1.2.

27. The method of claim 26, wherein the ratio of the CD4+T cells comprising the CAR polypeptide at Cmax to the CD8+T cells comprising the CAR polypeptide at Cmax in the subject is less than 0.8.

28. The method of claim 27, wherein the ratio of the CD4+T cells comprising the CAR polypeptide at Cmax to the CD8+T cells comprising the CAR polypeptide at Cmax in the subject is less than 0.6.

29. The method of claim 28, wherein the ratio of the CD4+T cells comprising the CAR polypeptide at Cmax to the CD8+T cells comprising the CAR polypeptide at Cmax in the subject is less than 0.4.

30. The method of claim 29, wherein the ratio of the CD4+T cells comprising the CAR polypeptide at Cmax to the CD8+T cells comprising the CAR polypeptide at Cmax in the subject is less than 0.3.

31. The method of claim 1, wherein the first BCMA binding moiety and/or the second BCMA binding moiety is an anti-BCMA single domain antibody (sdAb).

32. The method of claim 31, wherein the first BCMA binding moiety is a first anti-BCMA sdAb and the second BCMA binding moiety is a second anti-BCMA sdAb.

33. The method of claim 1, wherein the first BCMA binding moiety comprises a polypeptide encoded by the nucleic acid sequence of (SEQ ID NO: 2)
CAGGTCAAACTGGAAGAATCTGGCGGAGGCCTGGTGCAGGCAGGACGGAG

CCTGCGCCTGAGCTGCGCAGCATCCGAGCACACCTTCAGCTCCCACGTGA

TGGGCTGGTTTCGGCAGGCCCCAGGCAAGGAGAGAGAGAGCGTGGCCGTG

ATCGGCTGGAGGGACATCTCCACATCTTACGCCGATTCCGTGAAGGGCCG

GTTCACCATCAGCCGGGACAACGCCAAGAAGACACTGTATCTGCAGATGA

ACAGCCTGAAGCCCGAGGACACCGCCGTGTACTATTGCGCAGCAAGGAGA

ATCGACGCAGCAGACTTTGATTCCTGGGGCCAGGGCACCCAGGTGACAGT

GTCTAGC.

34. The method of claim 1, wherein the second BCMA binding moiety comprises a polypeptide encoded by the nucleic acid sequence of (SEQ ID NO: 4)
GAGGTGCAGCTGGTGGAGAGCGGAGGCGGCCTGGTGCAGGCCGGAGGCTC

TCTGAGGCTGAGCTGTGCAGCATCCGGAAGAACCTTCACAATGGGCTGGT

TTAGGCAGGCACCAGGAAAGGAGAGGGAGTTCGTGGCAGCAATCAGCCTG

TCCCCTACCCTGGCCTACTATGCCGAGAGCGTGAAGGGCAGGTTTACCAT

CTCCCGCGATAACGCCAAGAATACAGTGGTGCTGCAGATGAACTCCCTGA

AACCTGAGGACACAGCCCTGTACTATTGTGCCGCCGATCGGAAGAGCGTG

ATGAGCATTAGACCAGACTATTGGGGGCAGGGAACACAGGTGACCGTGAG

CAGC.

35. The method of claim 1, wherein the first BCMA binding moiety and the second BCMA binding moiety are connected to each other via a peptide linker.

36. The method of claim 35, wherein the peptide linker comprises the amino acid sequence of GGGGS (SEQ ID NO: 5).

37. The method of claim 1, wherein the CAR polypeptide further comprises a signal peptide located at the N-terminus of the polypeptide.

38. The method of claim 37, wherein the signal peptide is derived from CD8a.

39. The method of claim 38, wherein the signal peptide comprises the amino acid sequence of (SEQ ID NO: 6)
MALPVTALLLPLALLLHAARP.

40. The method of claim 38, wherein the signal peptide comprises a polypeptide encoded by the nucleic acid sequence of (SEQ ID NO: 7)
ATGGCTCTGCCCGTCACCGCTCTGCTGCTGCCTCTGGCTCTGCTGCTGCA

CGCTGCTCGCCCT.

41. The method of claim 1, wherein the transmembrane domain comprises the amino acid sequence of IYIWAPLAGTCGVLLLSLVITLYC (SEQ ID NO: 8).

42. The method of claim 1, wherein the transmembrane domain comprises a polypeptide encoded by the nucleic acid sequence of (SEQ ID NO: 9)
ATCTACATCTGGGCGCCCTTGGCCGGGACTTGTGGGGTCCTTCTCCTGTC

ACTGGTTATCACCCTTTACTGC.

43. The method of claim 1, wherein the intracellular signaling domain comprises a primary intracellular signaling domain of an immune effector cell.

44. The method of claim 1, wherein the intracellular signaling domain is derived from CD3ζ.

45. The method of claim 1, wherein the intracellular signaling domain comprises one or more co-stimulatory signaling domains.

46. The method of claim 45, wherein the intracellular signaling domain comprises the amino acid sequence of (SEQ ID NO: 10)
RVKFSRSADAPAYQQGQNQLYNELNLGRREEYDVLDKRRGRDPEMGGKPR

RKNPQEGLYNELQKDKMAEAYSEIGMKGERRRGKGHDGLYQGLSTATKDT

YDALHMQALPPR.

47. The method of claim 45, wherein the intracellular signaling domain comprises a polypeptide encoded by the nucleic acid sequence of (SEQ ID NO: 11)
AGAGTGAAGTTCAGCAGGAGCGCAGACGCCCCCGCGTACCAGCAGGGCCA

GAACCAGCTCTATAACGAGCTCAATCTAGGACGAAGAGAGGAGTACGATG

TTTTGGACAAGAGACGTGGCCGGGACCCTGAGATGGGGGGAAAGCCGAGA

AGGAAGAACCCTCAGGAAGGCCTGTACAATGAACTGCAGAAAGATAAGAT

GGCGGAGGCCTACAGTGAGATTGGGATGAAAGGCGAGCGCCGGAGGGGCA

AGGGGCACGATGGCCTTTACCAGGGTCTCAGTACAGCCACCAAGGACACC

TACGACGCCCTTCACATGCAGGCCCTGCCCCCTCGCTAA.

48. The method of claim 45, wherein the intracellular signaling domain comprises the amino acid sequence of (SEQ ID NO: 12)
KRGRKKLLYIFKQPFMRPVQTTQEEDGCSCRFPEEEEGGCEL.

49. The method of claim 45, wherein the intracellular signaling domain comprises a polypeptide encoded by the nucleic acid sequence of (SEQ ID NO: 13)
AAACGGGGCAGAAAGAAACTCCTGTATATATTCAAACAACCATTTATGAG

ACCAGTACAAACTACTCAAGAGGAAGATGGCTGTAGCTGCCGATTTCCAG

AAGAAGAAGAAGGAGGATGTGAACTG.

50. The method of claim 1, wherein the CAR polypeptide further comprises a hinge domain located between the C-terminus of the extracellular antigen binding domain and the N-terminus of the transmembrane domain.

51. The method of claim 50, wherein the hinge domain comprises the amino acid sequence of TTTPAPRPPTPAPTIASQPLSLRPEACRPAAGGAVHTRGLDFACD (SEQ ID NO: 15).

52. The method of claim 50, wherein the hinge domain comprises a polypeptide encoded by the nucleic acid sequence of (SEQ ID NO: 14)
ACCACGACGCCAGCGCCGCGACCACCAACACCGGCGCCCACCATCGCGTC

GCAGCCCCTGTCCCTGCGCCCAGAGGCGTGCCGGCCAGCGGCGGGGGCG

CAGTGCACACGAGGGGGCTGGACTTCGCCTGTGAT.

53. The method of claim 1, wherein the T cells are autologous T cells.

54. The method of claim 1, wherein the T cells are allogeneic T cells.

55. The method of claim 1, wherein the subject is human.

56. The method of claim 1, wherein the T cells comprise CD4+T cells and CD8+T cells and a ratio of the CD4+T cells to the CD8+T cells in the dose of the T cells is at a median of about 1.5.

57. The method of claim 1, wherein the T cells comprise CD4+T cells and CD8+T cells and a central memory T cell (Tcm) phenotype of the CD8+T cells is predominant in the CD8+T cells comprising the CAR polypeptide in the subject after administering to the subject the T cells.

58. The method of claim 57, wherein a ratio of the Tem CD8+T cells in the CD8+T cells comprising the CAR polypeptide in the subject ranges from about 29% to about 99%.

59. The method of claim 58, wherein the ratio of the Tem CD8+T cells in the CD8+T cells comprising the CAR polypeptide in the subject is at a median of about 90%.

60. The method of claim 57, further wherein an effector memory T cell (Tem) phenotype of the CD4+T cells in the CD4+T cells comprising the CAR polypeptide in the subject is predominant.

61. The method of claim 60, wherein a ratio of the Tem CD4+T cells in the CD4+T cells comprising the CAR polypeptide in the subject ranges from about 70% to about 98%.

62. The method of claim 61, wherein the ratio of the Tem CD4+T cells in the CD4+T cells comprising the CAR polypeptide in the subject is at a median of about 87%.

* * * * *